Nov. 12, 1963 A. E. W. JOHNSON ETAL 3,110,152
STARTING AND OPERATING CONTROL SYSTEM FOR FREE PISTON
ENGINE HYDRAULIC PUMP AS A POWER PLANT OF
A HYDROSTATIC DRIVEN VEHICLE
Filed May 1, 1961 12 Sheets-Sheet 1

Inventors:
Arnold E. W. Johnson
John F. Swift
Edwin A. Kariba
Paul O. Rippel Atty.

Nov. 12, 1963  A. E. W. JOHNSON ETAL  3,110,152
STARTING AND OPERATING CONTROL SYSTEM FOR FREE PISTON
ENGINE HYDRAULIC PUMP AS A POWER PLANT OF
A HYDROSTATIC DRIVEN VEHICLE

Filed May 1, 1961  12 Sheets-Sheet 2

Inventors:
Arnold E. W. Johnson
John F. Swift
Edwin A. Kariba

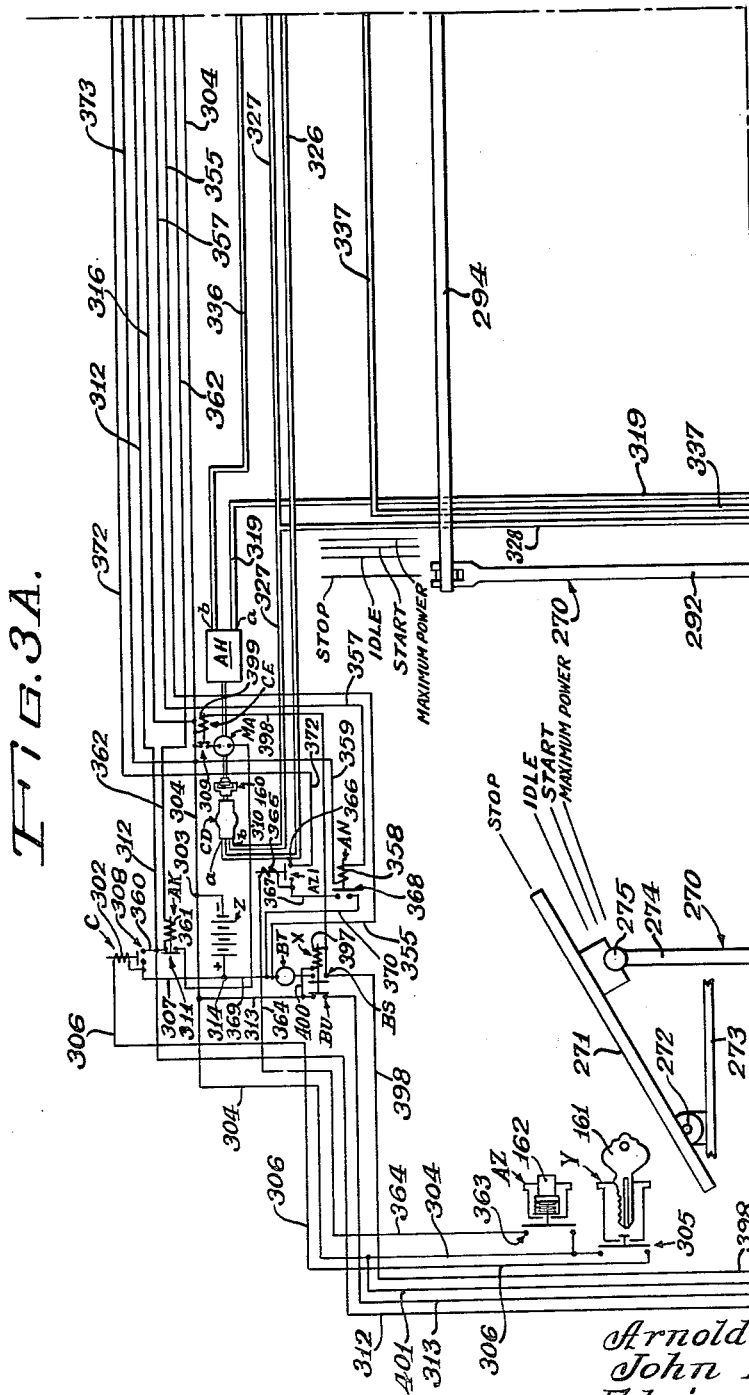

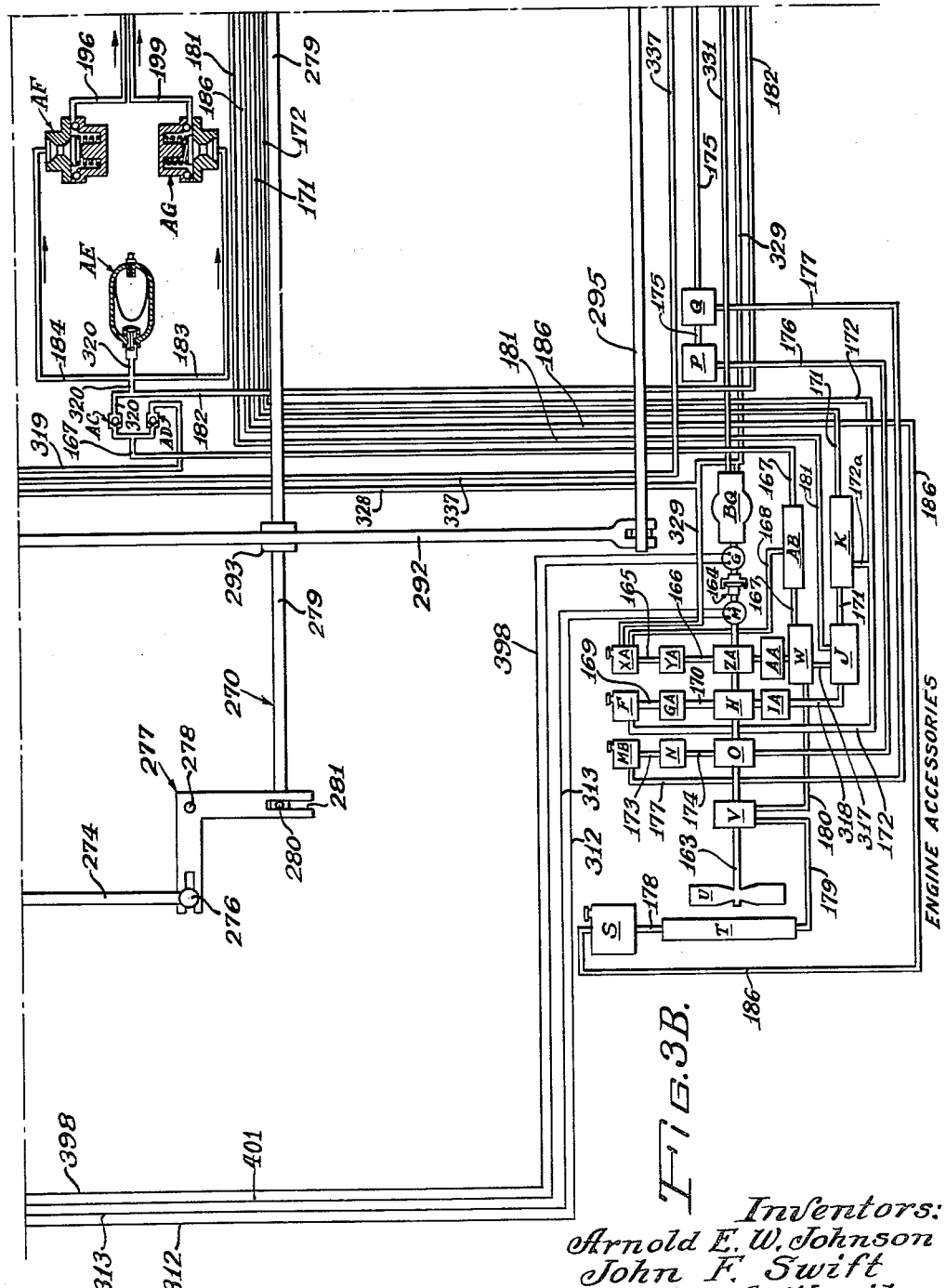

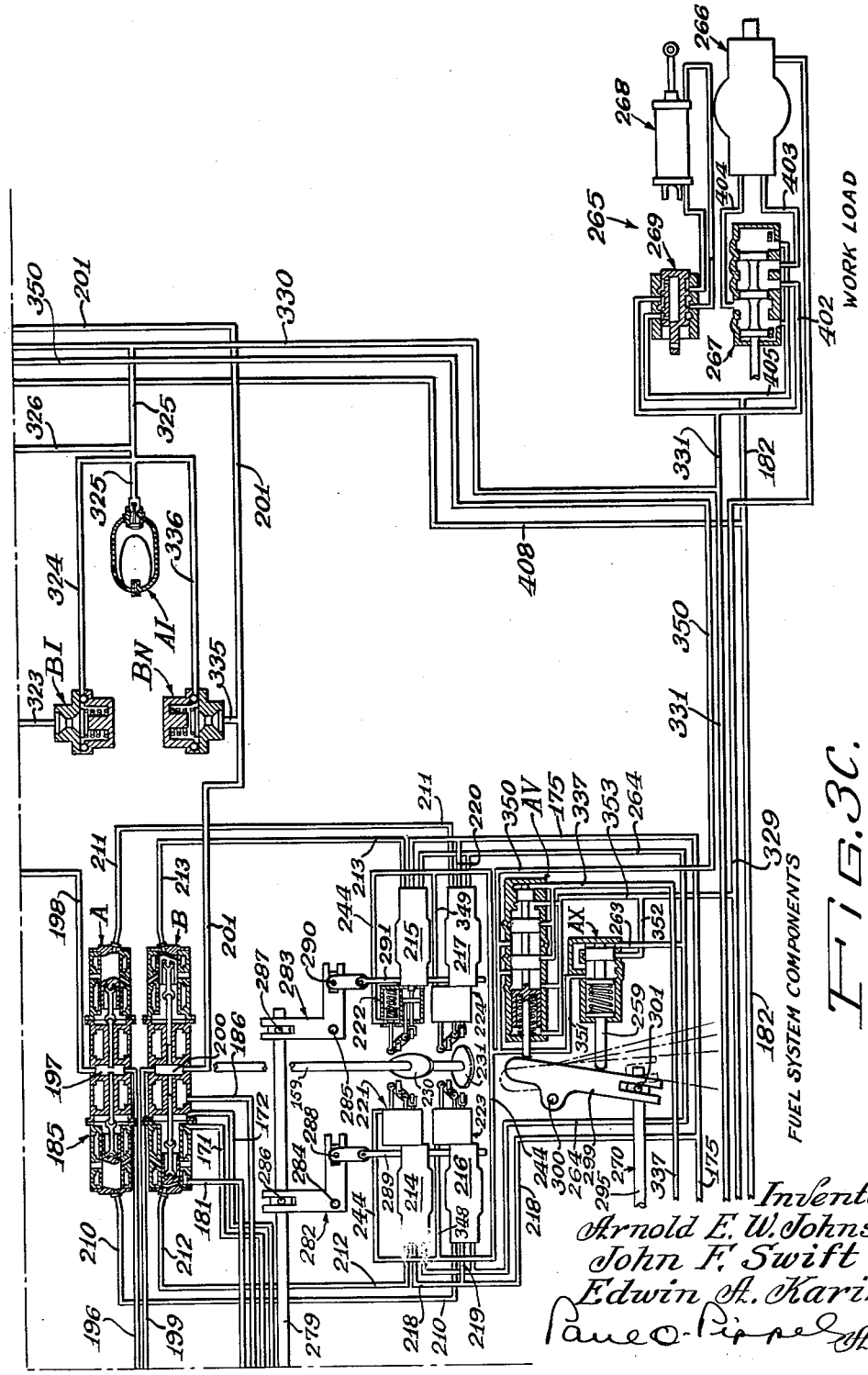

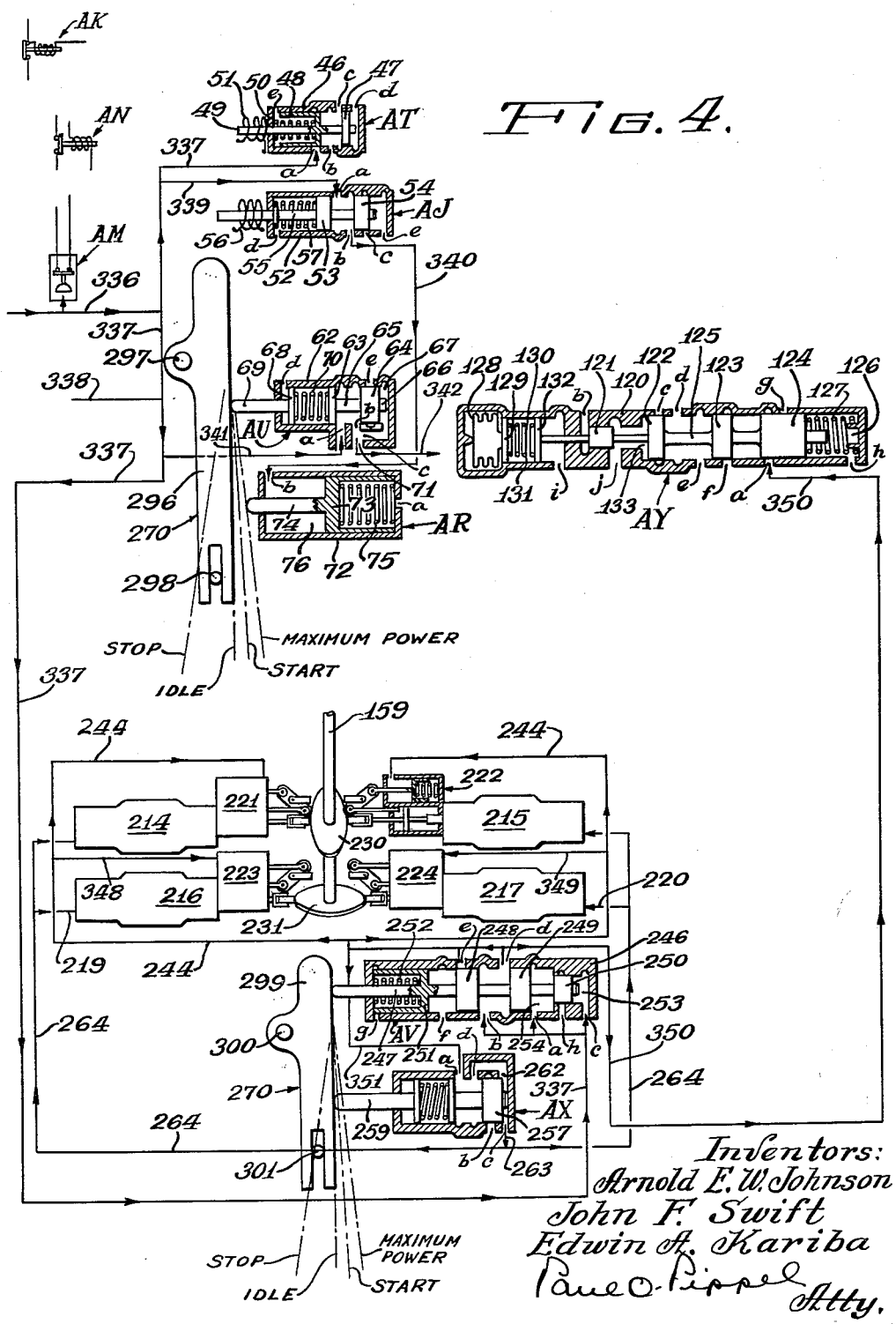

Inventors:
Arnold E. W. Johnson
John F. Swift
Edwin A. Kariba
Paul O. Pippel Atty.

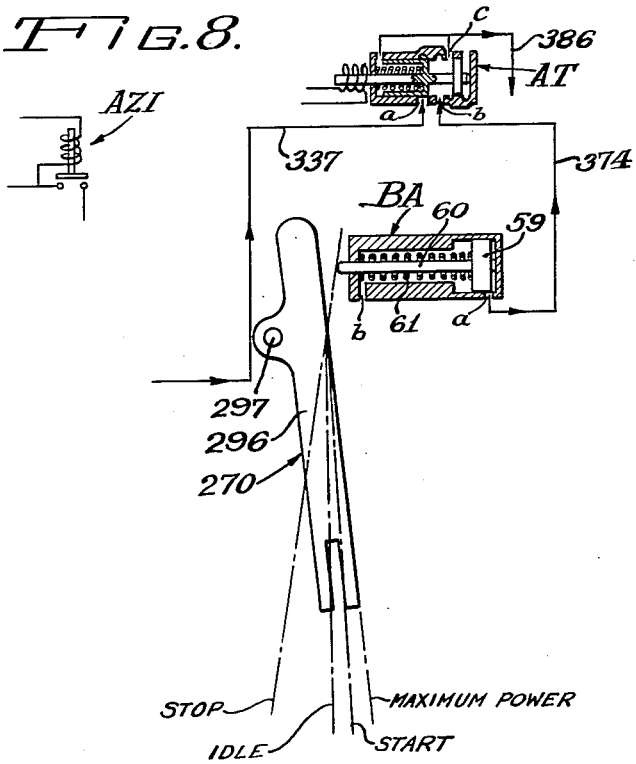
FIG. 8.
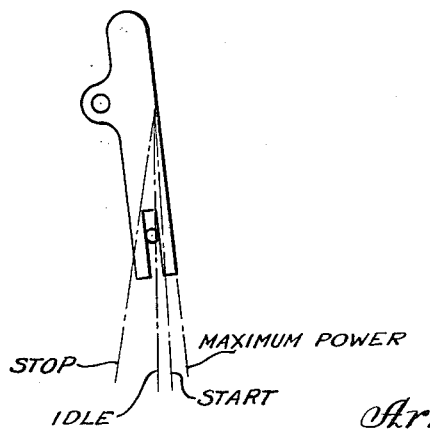

Nov. 12, 1963  A. E. W. JOHNSON ETAL  3,110,152
STARTING AND OPERATING CONTROL SYSTEM FOR FREE PISTON
ENGINE HYDRAULIC PUMP AS A POWER PLANT OF
A HYDROSTATIC DRIVEN VEHICLE
Filed May 1, 1961  12 Sheets-Sheet 11
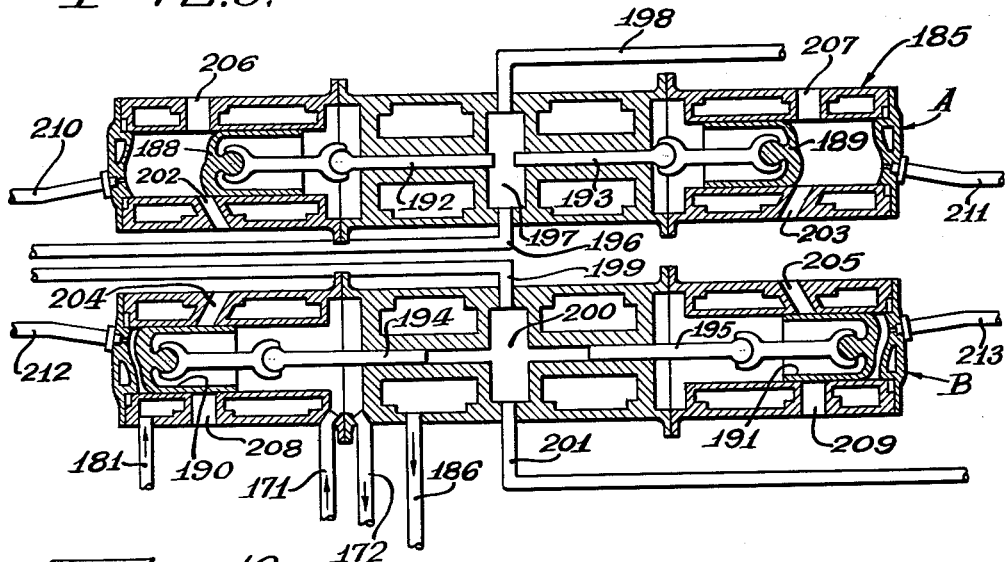
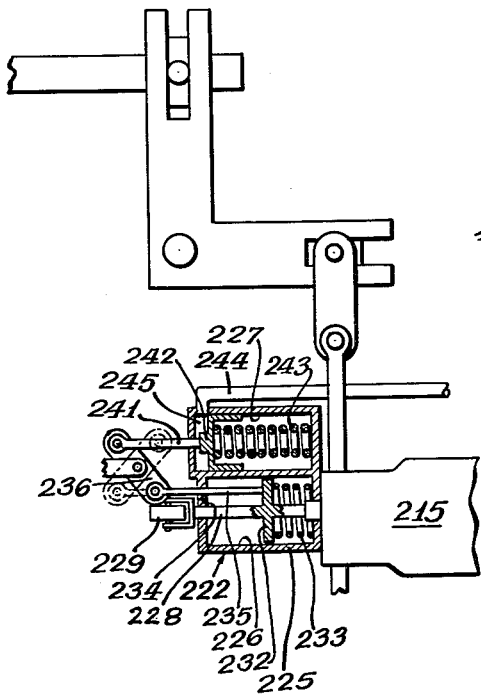
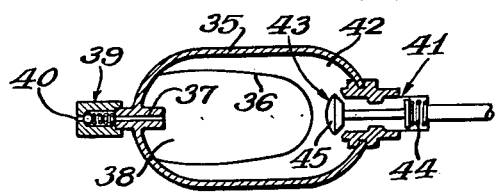
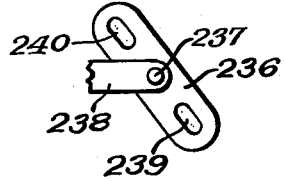
Inventors:
Arnold E. W. Johnson
John F. Swift
Edwin A. Kariba
Paul O. Pippel Atty.

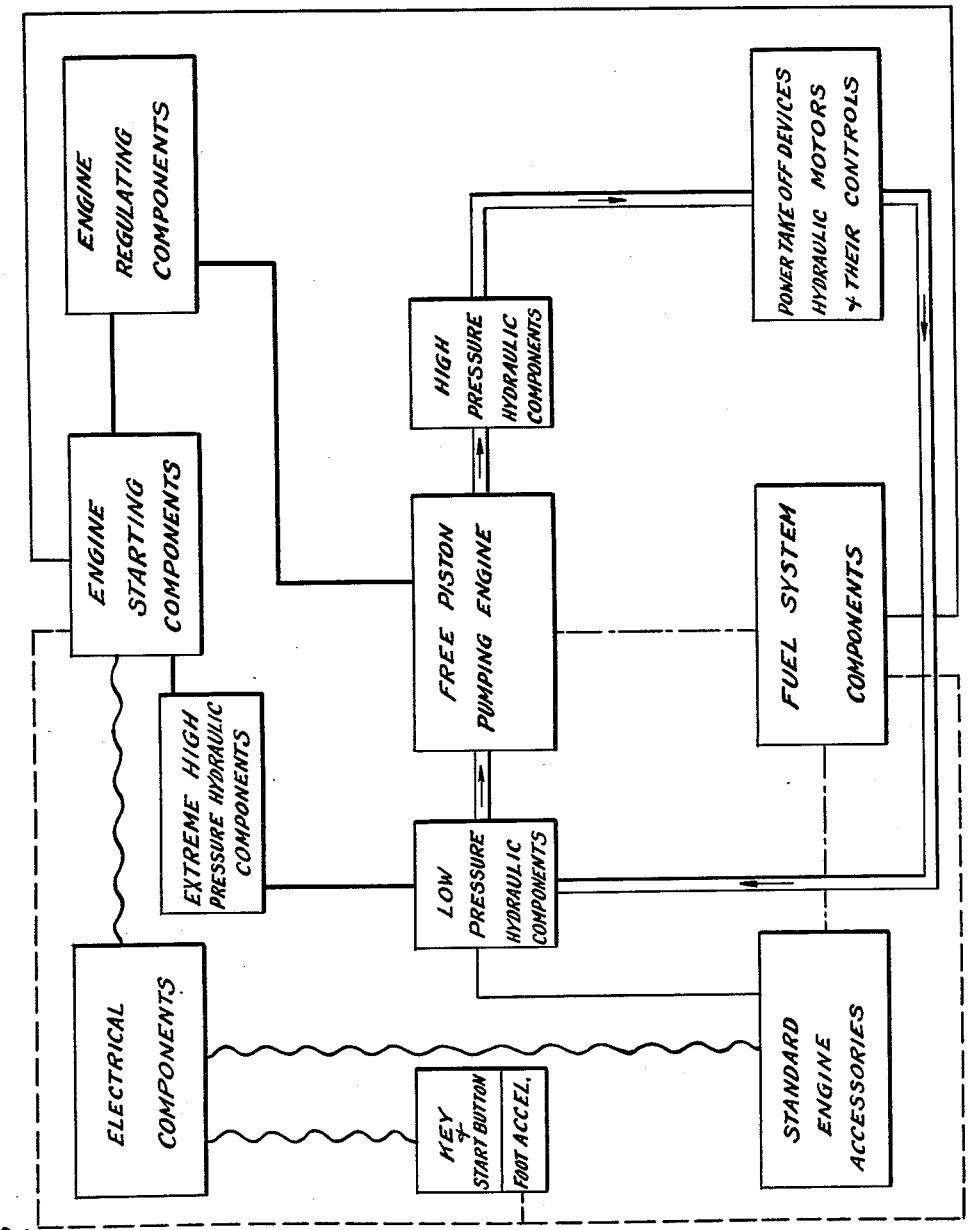

United States Patent Office 3,110,152
Patented Nov. 12, 1963

3,110,152
STARTING AND OPERATING CONTROL SYSTEM FOR FREE PISTON ENGINE HYDRAULIC PUMP AS A POWER PLANT OF A HYDROSTATIC DRIVEN VEHICLE
Arnold E. W. Johnson, Oak Park, and John F. Swift and Edwin A. Kariba, Chicago, Ill., assignors to International Harvester Company, Chicago, Ill., a corporation of New Jersey
Filed May 1, 1961, Ser. No. 106,969
22 Claims. (Cl. 60—14)

This invention relates to a control system for starting and operating a free piston engine hydraulic pump as a source of power for propelling a vehicle having a hydrostatic transmission including accessories therefor. More particularly this invention relates to control means for starting and operating a free piston engine hydraulic pump under variable load conditions wherein the requirements imposed upon the operator thereof are no greater than that required for a vehicle propelled by conventional internal combustion engines such as, for example, diesel engines.

In an application for Letters Patent filed by Arnold E. W. Johnson, Serial No. 71,949 filed November 28, 1960, assigned to the same assignor as that of the present application there is described a novel free piston engine hydraulic pump as a source of hydraulic power for propelling a vehicle having a hydrostatic power transmission. The present application is directed to a control means for starting and operating the free piston engine hydraulic pump, described in the above mentioned copending application, under variable load conditions wherein the complexities of operation by an operator are reduced to a magnitude not greater than that for operating a conventional vehicle such as an agricultural tractor.

A prime object of the present invention is to provide an integrated starting and operating control means for a free piston engine hydraulic pump as a source of power.

Another important object of the invention is to provide an electro-hydraulic means for starting and operating a free piston engine hydraulic pump as a source of power.

A further object of the present invention is to provide electro-hydraulic control means for operating a free piston engine hydraulic pump power plant under variable loading conditions.

A still further object of the present invention is to provide a means for modulating the pressure of fuel into a free piston engine hydraulic pump in accordance with the throttle position.

Another object of the invention is to provide hydraulic means for de-actuation of the fuel injectors for a free piston engine hydraulic pump.

Yet another object of the invention is to provide a reserve source of hydraulic fluid under pressure for immediate available power during a period between the time when the throttle is increased and the time when the free piston engine hydraulic pump attains the speed corresponding to the load and throttle position.

Still a further important object of the invention is to provide a means for modulating automatically the pumping of a free piston engine hydraulic pump during periods when the load demand is less than the available output at a given speed of the engine.

Another important object of the invention is to provide a starting and operating means for a free piston engine hydraulic pump as a source of hydraulic pressure for operating a vehicle propelled through a hydrostatic transmission wherein the requirements imposed upon an operator are of no greater complexity than required for operating a conventional internal combustion engine propelled vehicle.

These and other desirable and important objects inherent in and encompassed by the invention will be more readily understood from the ensuing description, the appended claims and the annexed drawings, wherein:

FIGURES 3, 3A, 3B and 3C represent, in schematic form, the general layout of the electro-hydraulic control system of this invention with longitudinal sectional views of the various individual components. FIGURE 3 is positioned at Quadrant I; FIGURE 3A is positioned at Quadrant II and is the leftward continuation of FIGURE 3; FIGURE 3B is positioned at Quadrant III and is the lower continuation of FIGURE 3A; and FIGURE 3C is positioned at Quadrant IV and is the rightward continuation of FIGURE 3B as well as the lower continuation of FIGURE 3. Thus FIGURES 3, 3A, 3B and 3C when positioned in the above mentioned relation forms the layout wherein all components are shown in the position when the free piston engine hydraulic pump is at rest.

FIGURE 4 is a portion of the components taken from FIGURES 3, 3A, 3B and 3C which are isolated to show the actuation of certain components occurring during the first stage of a series of stages for starting the free piston engine hydraulic pump.

Figure 5:
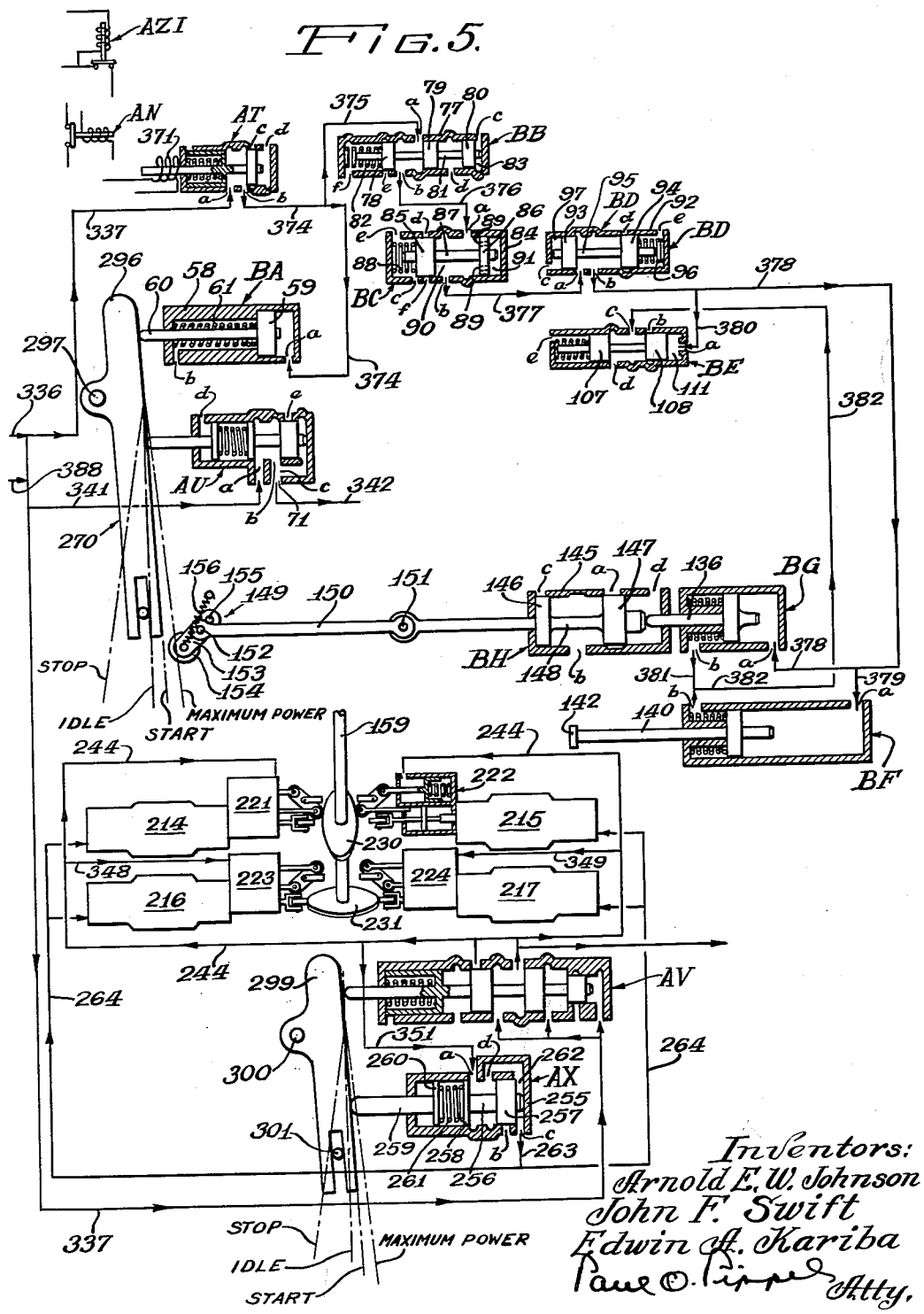

FIGURE 5 is a portion of the components taken from FIGURES 3, 3A, 3B and 3C which are isolated to show the changes in actuation of certain components occurring during the second stage of a series of stages for starting the free piston engine hydraulic pump.

Figure 6:
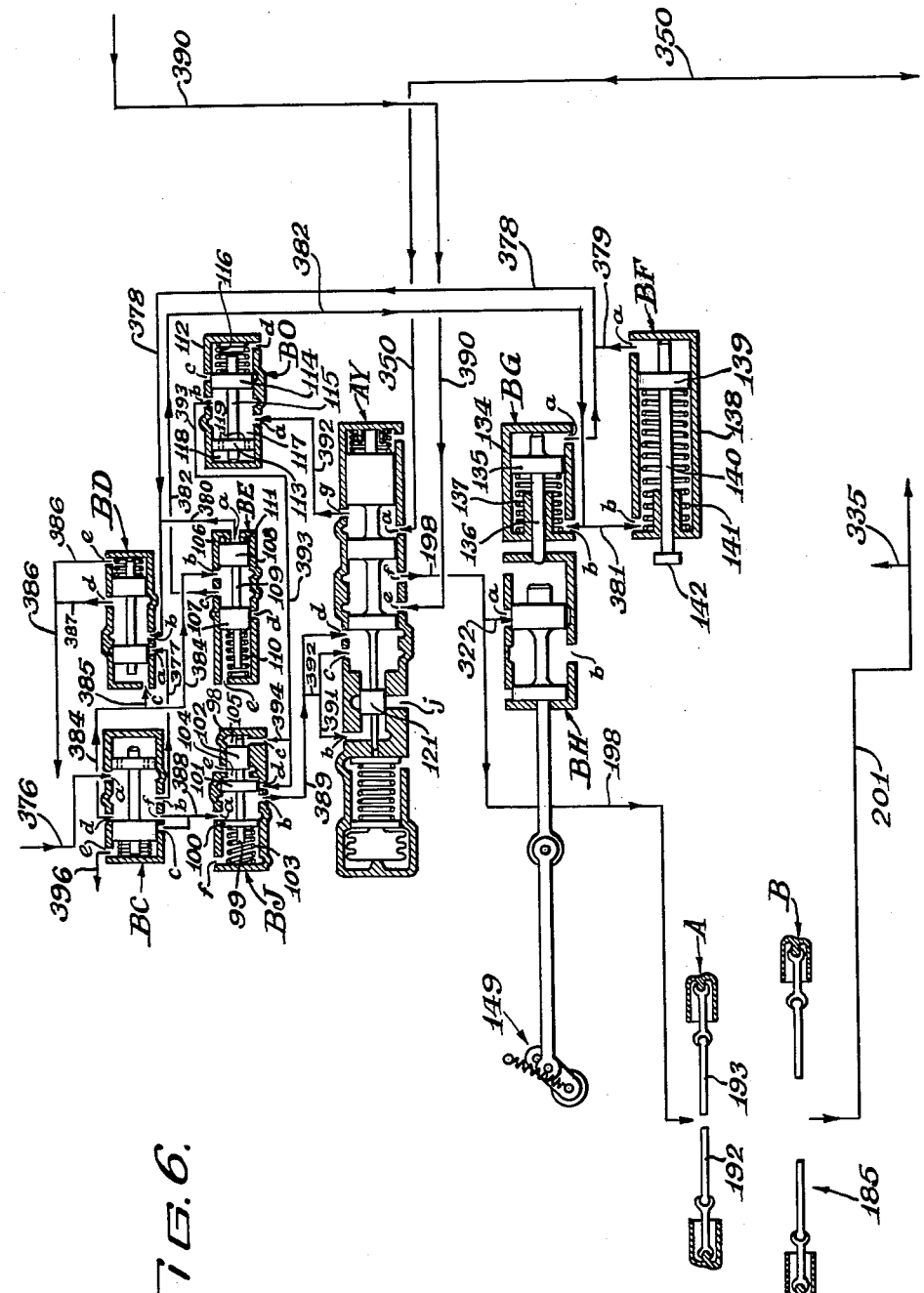

FIGURE 6 is a portion of the components taken from FIGURES 3, 3A, 3B and 3C which are isolated to show the changes in actuation of certain components occurring during the third stage of a series of stages for starting the free piston engine hydraulic pump.

Figure 7:
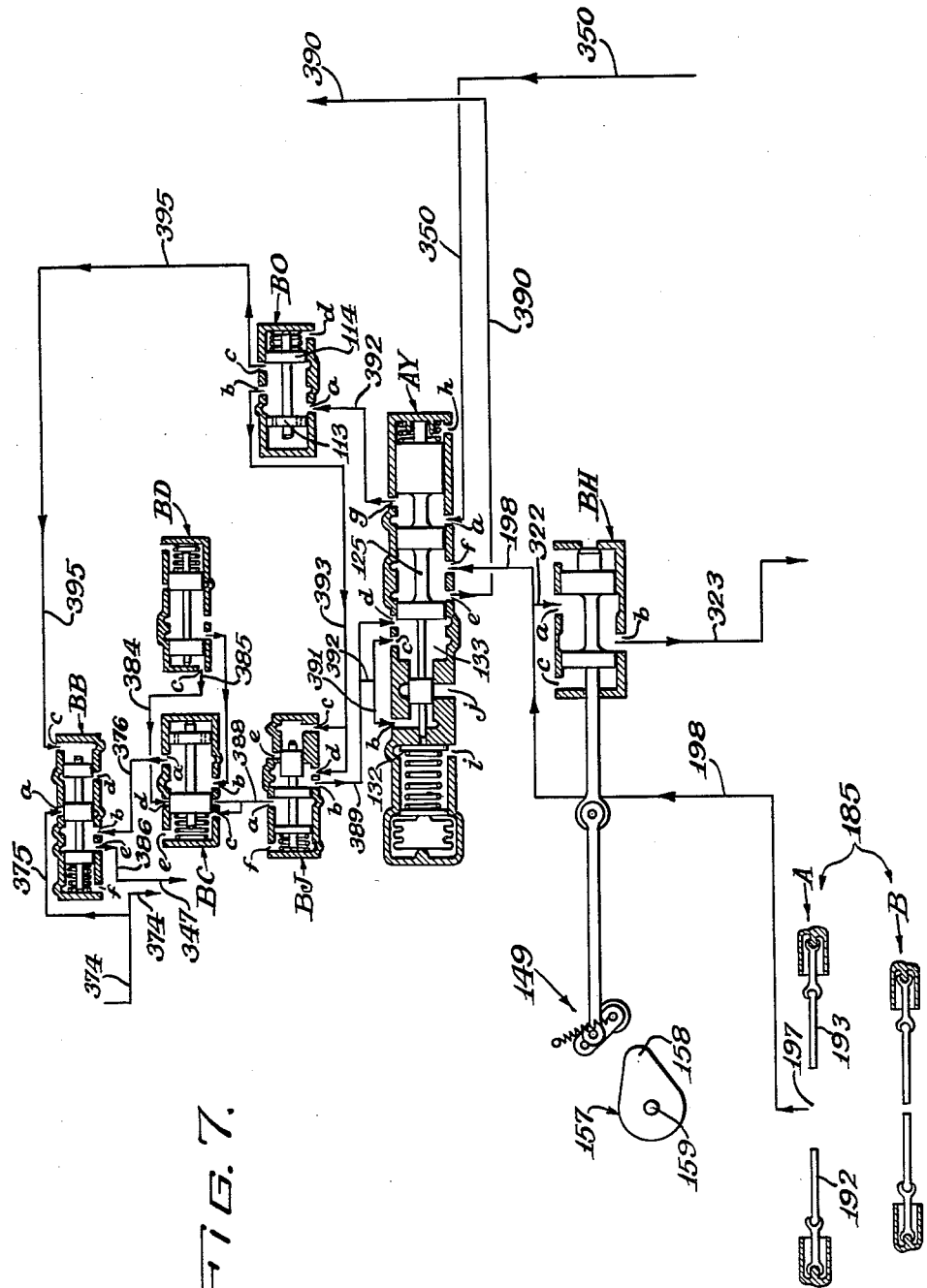

FIGURE 7 is a portion of the components taken from FIGURES 3, 3A, 3B and 3C which are isolated to show the changes in actuation of certain components occurring during the fourth stage of a series of stages for starting the free piston engine hydraulic pump.

FIGURE 8 is a portion of the components taken from FIGURES 3, 3A, 3B and 3C which are isolated to show the changes in actuation of certain components occurring during the fifth stage of a series of stages which the termination of the starting cycle stages and the free piston engine pump is thereafter in full operation.

FIGURE 9 is an enlarged side view, in section, of the free piston engine pump of FIGURE 3C.

FIGURE 10 is a side view, partly in section and partly broken away, of the hydraulic de-actuating mechanism of one fuel injector together with a portion of the fuel control linkage.

FIGURE 11 is an enlarged side view, partly broken away, showing the construction of one link of the de-actuating mechanism of FIGURE 10.

FIGURE 12 is a longitudinal cross-section, partly broken away, of a hydraulic accumulator of the pressurized gas bag type.

FIGURE 13 is a diagram illustrating the general arrangement of the electro-hydraulic control system of this invention.

Referring to the preferred embodiment shown in the drawings it will be seen that the individual components of the electro-hydraulic control system of this invention are mostly but not all of conventional construction. However, the first portion of this specification is confined to a detailed description of each component thereof and the second portion is confined to the starting, operating and stopping the engine. FIGURES 3, 3A, 3B and 3C illustrate the conditions when the free piston engine pump 185 and all components are at rest.

At this point it should be mentioned that the operating characteristics of the control system of this invention is predicated upon the employment of four different hydraulic pressure levels. The first pressure level is substantially equal to atmospheric pressure and comprises the drain circuit to the hydraulic fluid reservoir or sump. The second level is termed the "low pressure" level (e.g. 200 p.s.i.) and its primary purpose is to feed hydraulic fluid inlet to the free piston engine pump 185 under sufficient pressure to prevent cavitation in the engine pump 185 particularly when the engine pump 185 is operated at higher speeds. The third level is termed the "high pressure" level (e.g. 5000 p.s.i.). It will be seen later herein that the pressure differential between the "low pressure" and "high pressure" levels is the useful or working hydraulic pressure available for propelling the vehicle and its hydraulic accessories or other load. The fourth level is termed "extreme high pressure" (e.g. 10,000 p.s.i.) which pressure serves to pre-position the power pistons of the engine preparatory to starting and actuate many of hydraulic components. The volume capacity of the extreme high pressure circuit is small in relation to the capacity of the lower pressure and high pressure circuits.

Referring to FIGURE 3 there is shown two variable displacement control accumulators generally indicated at BK and CA which are of identical construction. The accumulator BK is comprised of a substantially inflexible cylindrically shaped housing 15 having an apertured end wall 16 and end wall 17. Within the housing 15 is disposed in slidable relation a major piston 18. Connected to the major piston 18 is a minor piston 19 which extends through the apertured end wall 16 in slidable relation similar to that of a connecting rod or work member of a conventional fluid operated cylinder or ram. The minor piston 19 protrudes or extends into an expansible spherically shaped accumulator 20. From this it can be seen that the accumulator BK has three hydraulic fluid pressurizable chambers BKa, BKb and BKc. The chamber BKa is charged and discharged through port 21 in the casing 15. The chamber BKb is charged and discharged through port 22 and chamber BKc of the sphere 20 is charged and discharged through port 23. It will be seen that the fluid volume displacement or capacity of the chamber BKc of the sphere 20 is reduced when the minor piston 19 is moved leftwardly as shown in dotted lines. The expansibility of the sphere 20 is such that no substantial expansion occurs until the fluid pressure in chamber BKc exceeds the high pressure level (e.g. over 5,000 p.s.i.) and in addition will safely withstand fluid pressures exceeding the extreme high pressure level (e.g. 10,000 p.s.i.).

Conventional bleed means (not shown) may be provided to exhaust air from all chambers of accumulators BK and CA to avoid air cavitation.

The purpose of the minor piston 19 is to vary the fluid volume capacity of the sphere 20. When the hydraulic fluid employed in the system is ordinary automatic transmission oil used commercially in automotive vehicles, an applied pressure of 5,000 p.s.i. will reduce its volume about 2 percent and at 10,000 p.s.i. its volume reduces about 4 percent. Thus under the influence of "high pressure" and "extreme high pressure" the hydraulic fluid exhibits an appreciable degree of compressibility. When the free piston engine hydraulic pump 185 is operating at a constant load the pistons 18 and 19 of the variable displacement control accumulator BK move to the right thereby increasing the fluid capacity of the sphere 20 to its maximum. If the load requirement or demand is suddenly increased the major piston 18 immediately begins to move leftwardly and the consequent reduction in fluid volume capacity of the sphere 20 displaces oil which is available to meet the increased load demand during the period when the free piston engine hydraulic pump 185 is accelerating to meet the demand. The accumulator BK also performs an additional function when the speed or output of the free piston hydraulic pump 185 is greater than the load demand which will be explained later in detail.

As mentioned previously the accumulator CA with its chamber CAa, CAb and CAc is constructed identical with that of accumulator BK and chamber BKa, BKb and BKc respectively, and the elements thereof bear the same numeral designations except they are primed.

Referring again to FIGURE 3 there are four hydraulic surge valves BP, BZ, CB and CC all of which are of the same general construction. Surge valve BP will be described and it will be understood that surge valves BZ, CB and CC are of identical construction therewith.

The surge valve BP comprises a casing 24 having ports 25 and 26 as shown. Disposed centrally within the casing 24 is a wall or partition 27 having a small calibrated restrictive passage or orifice 28 therethrough in communication with ports 25 and 26. Thus hydraulic fluid passing between ports 25 and 26 in either direction is modulated in the rate of flow due to the restriction of the orifice 28. The purpose of surge valves BP and BZ is to prevent rapid movement of the piston 18 of the accumulator BK. Likewise the purpose of surge valves CB and CC is to prevent rapid fluctuating movements of piston 18' of accumulator CA.

In FIGURE 3 there is shown a check valve CH having an inlet port 29 and an outlet port 30. The purpose of the check valve CH is to provide a means for draining hydraulic fluid from the low pressure and high pressure hydraulic circuits when the free piston engine hydraulic pump is shut down after operation. This will be explained later in detail.

A fluid pressure operated single pole electric switch AO (FIGURE 3) of conventional construction is provided for the purpose of preventing the extreme high pressure hydraulic circuit from exceeding a maximum predetermined limit (e.g. 10,500 p.s.i.) prior to or during the operation of starting the free piston engine hydraulic pump 185. The switch AO is normally open circuit and when the extreme high pressure maximum limit of hydraulic pressure at its port 31 is reached the switch is actuated to close the electric contacts thereof. When the switch AO is actuated it functions to terminate the power source for obtaining extreme high pressure hydraulic fluid prior to and during starting operations which will be described later herein in detail.

Another pressure operated single pole electric switch AM (FIGURE 3) is also provided which is constructed identically with that of the above described switch AO except that it actuates to closed position when the minimum limit of the extreme high pressure hydraulic circuit (e.g. 9500 p.s.i.) at port 32 is reached. The switch AM functions to prevent the operation of starting the free piston engine hydraulic pump 185 until the extreme high pressure hydraulic circuit has attained a predetermined minimum pressure. When the free piston engine hydraulic pump 185 is operating the switches AO and AM serve no function except to keep extreme high pressure accumulator AQ charged in case a quick restart is ever desired as will be evident later herein.

A conventional safety relief valve AP is provided to relieve the extreme high pressure hydraulic circuit from excessive pressure which might occur particularly during operation of the free piston engine hydraulic pump 185. When the valve AP is actuated (e.g. 11,000 p.s.i.) it bleeds extreme high pressure hydraulic fluid from its inlet port 33 to its outlet port 34, the latter being communicatively connected to the hydraulic drain circuit as will be shown later herein.

As illustrated in FIGURE 3 there is an extreme high pressure hydraulic accumulator AQ which may be of conventional construction. It will be seen later that there are two additional accumulators AE and AI having the same general construction as that of accumulator AQ in the hydraulic system of this invention except that they function at different pressure levels. An enlarged view of the accumulator AQ is shown in FIGURE 12. In FIGURE 12 each accumulator, such as AQ, is provided with a rigidly constructed tank 35 having a flexible bag 36 positioned therein as shown. One end of the tank 35 is provided with a port 37 therethrough in communication with the inside of the flexible bag 36 or chamber 38. Mounted externally on the tank 35 is a check valve 39. The outlet side of the check valve 39 is positioned for communication with port 37 and chamber 38. The inlet port 40 is connectable to a source (not shown) of gas under pressure (e.g. air, nitrogen, etc.) for charging the gas chamber 38. It is preferable to use an inert gas in the chamber 38 to avoid unnecessary deterioration of the flexible bag 36. The pressure of the gas charged into the chamber 38 should be commensurate with the hydraulic pressure level to which the accumulator is to function as a hydraulic fluid accumulating means.

On the other end of the tank 35 is an hydraulic port 41 which communicates the hydraulic chamber 42 with the hydraulic circuit to which the accumulator is to function. Thus hydraulic fluid may pass through the port 41 in either direction freely. When hydraulic fluid enters the accumulator the volume of the hydraulic chamber 42 increases thereby decreasing the volume of the captive gas in the chamber 38 by compression of the gas therein to equalize the pressure in the two chambers. When the hydraulic pressure of the operating circuit decreases hydraulic fluid in the chamber 42 is discharged through port 41 and the volume of the gas chamber 38 increases with a corresponding decrease in volume of the chamber 42.

Now in order to prevent damage to the flexible bag 36 when the pressure in the hydraulic chamber 42 falls below a minimum level, an automatic shutoff valve 43 is disposed in the port 41. The valve 43 is urged toward open position by a spring 44. However, when the pressure in the hydraulic chamber is decreased to a point where the volume of the gas chamber 38 has increased sufficiently, the flexible bag 36 engages the valve element 45 and compresses the spring 44 whereby the valve element 45 seats and thus prevents further discharge of hydraulic fluid from the chamber 42. From this it can be seen that the accumulator does not function until the operating pressure of the hydraulic circuit to which it is connected exceeds the minimum pressure in the chamber 42 at which pressure the shutoff valve 43 will open.

Referring again to FIGURE 3 there is shown an electric solenoid start valve AT in de-actuated position which valve is also shown enlarged in FIGURES 4 and 8. In FIGURE 5 the start valve AT is shown enlarged in the actuated position. The purpose of the start valve AT is to admit extreme high pressure hydraulic fluid to energize the sequentially operated mechanism for starting systematically the free piston engine pump 185 as will be seen later in detail. In FIGURE 4 it will be seen that the start valve AT comprises a housing 46 having a spool type slidable valve element therein. The spool valve element is comprised of a pair of longitudinally spaced lands 47 and 48 connected to a stem 49 slidable in the housing 46. The housing 46 is provided with ports a and e registrable with land 48 and port b registrable with land 47. The hollow portion of the land 48 is provided with a compression spring 50 which urges the valve spool to the position shown in FIGURES 3, 4 and 8. The ports d and e are vents to permit movement of the valve spool in either direction and may conveniently be connected to the hydraulic drain line to recover leakage hydraulic fluid as will be evident later.

The stem 49 of the start valve AT extends into an electric solenoid coil 51 the terminals of which are electrically connected as shown in FIGURES 3 and 3A. When the solenoid 51 of the start valve AT is de-energized (FIGURES 3, 4 and 8) the port a is closed and port b is in communication with port c. When the start valve AT is actuated (FIGURE 5) by energizing the solenoid 51 the port a communicates with port b and port c is closed.

In FIGURE 3 immediately below the above described start valve AT is an electric solenoid run-valve AJ in de-actuated position which valve is also shown enlarged in FIGURE 4 in actuated position. The purpose of the run-valve AJ is to control the admittance of extreme high pressure hydraulic fluid in a manner to enable the free piston engine hydraulic pump starting mechanism to function as well as operating the free piston engine hydraulic pump 185 after it has been started, which will be explained in detail later.

Referring to FIGURE 4 it will be seen that the run-valve AJ comprises a housing 52 having a slidable spool valve element therein. The valve element comprises a pair of longitudinally spaced lands 53 and 54 connected to a stem 55. The housing 52 is provided with a port a registerable with land 53 and port c registerable with land 54 while port b is in continuous registery with the circumferential groove between lands 53 and 54 as shown. Ports d and e are vents to permit free movement of the spool valve element and may conveniently be connected to the hydraulic drain circuit to accommodate hydraulic fluid leakage.

The stem 55 of the spool valve of run-valve AJ extends through an aperture in the housing 52 into a solenoid coil 56. Also a compression spring 57 is positioned in the housing 52 for urging the spool valve element rightwardly toward the de-actuated position illustrated in FIGURE 3. Thus when the run-valve AJ is de-actuated (FIGURE 3) port b communicates with port c while port a is closed. When the run-valve AJ is electrically energized to its actuated position (FIGURE 4) port a communictaes with port b while port c is closed.

Referring to FIGURE 3 directly below the above described run-valve AJ is a start position holder ram BA shown in its de-actuated position which is also shown enlarged in FIGURE 8. In FIGURE 5 the holder ram BA is illustrated in its actuated position. The purpose of the holder ram BA is to shift a mechanical linkage device 270 to the position required for starting the free piston engine hydraulic pump 185 which will be described subsequently.

Referring to FIGURE 5 it will be seen that the holder ram BA is a one-way acting, spring-loaded in a retractive direction, hydraulic cylinder. It will also be noted that the stroke of the holder ram BA is short. The construction of the holder ram BA is conventional. It comprises a casing 58 having a slidable piston 59 connected to a work member 60. A compression spring 61 is provided to urge the piston 59 and its work member 60 retractively as shown in FIGURES 3 and 8. The casing 58 is provided with a port a communicable with a source of hydraulic pressure for actuating expansively the holder ram BA. Port b in the casing 58 is a vent to allow free movement of the piston 59 and may be connected to the hydraulic drain circuit to accommodate hydraulic fluid leakage.

Referring again to FIGURE 3 directly below the start position holder ram BA above described is a pressure regulator valve AU which is also illustrated in enlarged views in FIGURES 4 and 5. The purpose of the pressure regulator valve AU is to control the movement of pistons 18 and 18' of the previously described variable displacement control accumulators BK and CA.

The pressure regulator valve AU comprises a casing 62 having a slidable spool valve element positioned therein. The spool valve element comprises a pair of lands 63 and 64 in longitudinal spaced relation connected together by pin 65. The outer side of land 64 is provided with a boss 66 which prevents the land 64 from abutting the rear end of the casing 62 forming a pressurizable chamber 67. A third land 68 slidable in the casing 62 is connected to a protruding stem 69. Disposed between lands 63 and 68 is a compression spring 70 as shown. The casing 62 is provided with ports a, b, c, d and e. Port a is the inlet for extreme high pressure hydraulic fluid and port b is the outlet therefor. Port c communicates chamber 67 with port b. Port d is a vent which may be communicatively connected with the drain circuit to accommodate leakage of hydraulic fluid. Port e is in communication with the drain circuit.

In operation the pressure regulator valve AU throttles the flow of fluid into port b. Fluid under pressure entering port a passes into ports b and c. The fluid port c pressurizes chamber 67 which pressure acts to move the land 64 of the spool valve element leftwardly which throttles the flow of fluid from port a into port b and may completely close port b if the pressure is sufficiently high. As the land 64 approaches closed position with respect to port b the land 64 throttlingly uncovers port e which permits a throttled discharge of fluid from the chamber 67 through port e to the drain circuit. Thus port b is never completely closed but may reach a condition where all of the hydraulic fluid passing into port b will flow through port c and chamber 67 into drain circuit through port e. Now when the stem 69 is fully extended as in FIGURE 3 the compressive force of the spring 70 will be at its minimum and therefore the fluid pressure in chamber 67 required to move the land 64 of the spool valve element will be at a minimum value. However as the stem 69 is moved retractively in a progressive manner as shown in FIGURES 4 and 5 the land 68 further compresses the spring 70 which correspondingly increases the hydraulic pressure required in chamber 67 to move the land 64 of the spool valve element in a leftward direction. From this it can be seen that as the stem 69 is moved retractively the hydraulic pressure discharged through the opening 71 is progressively increased. The function of the pressure regulator valve AU during operation of the free piston engine pump will be further described in detail later herein.

Directly beneath the pressure regulator valve AU in FIGURE 3 is a stop actuator ram AR in its de-actuated position. In FIGURE 4 an enlarged view of the stop actuator ram AR in actuated position is illustrated. The purpose of the stop actuator ram AR, when de-actuated, is to move and hold in "stop" position a mechanical linkage device 270 later described. When the stop actuator ram AR is actuated it enables operative movement of the above mentioned mechanical linkage device 270 and thus must be actuated during the starting and operating of the free piston engine pump 185.

Referring to FIGURE 4 it will be seen that the stop actuator ram AR is a one-way acting spring-loaded hydraulic ram. Actuation of the stop actuator ram AR retracts the ram while de-actuation thereof expands it under the influence of its spring loading. The stop actuator ram AR comprises a casing 72 (FIGURE 4) having a slidable piston 73 connected to a protruding work member 74 positioned for abutting engagement with a portion of a mechanical control linkage device 270 described later.

Within the casing 72 of the stop actuator ram AR is a strong compression spring 75 positioned to urge the piston 73 and associated work member 74 in expansive direction. It is emphasized that the compressive characteristics of the spring 75 should be high for, as will be evident later, when the ram AR is de-actuated the spring 75 must exert a force sufficient to overcome certain counter forces. The casing 72 is provided with ports a and b; the port a being communicatively connected to the hydraulic drain circuit and port b is for pressurizing the chamber 76 to actuate the ram AR retractively.

In FIGURE 3 positioned to the immediate right of the solenoid start valve AT is a shut-off valve BB. The purpose of the shut-off valve BB is to terminate the flow of extreme high pressure hydraulic fluid to certain other valves, later described, and communicating these other valves with the hydraulic drain circuit. The shut-off valve BB is shown de-actuated in FIGURES 3 and 5 and actuated in FIGURE 7.

The shut-off valve BB comprises a housing 77 (FIGURE 5) having a slidable spool valve element therein. The spool valve element has three lands 78, 79 and 80 in longitudinal spaced relation on stem 81 as shown in FIGURE 5. A compression spring 82 is positioned to urge the lands 78, 79 and 80 with the stem 81 in a rightward direction as viewed in FIGURE 5. The housing 77 is provided with ports a, b, c, d, e and f. The land 78 is registerable with port e and land 79 is registerable with port a while land 80 is registerable with port d. Port c leads to chamber 83 which chamber when pressurized actuates the shut-off valve BB to the position illustrated in FIGURE 7. The port f is a vent and may be connected to the hydraulic drain circuit to accommodate leakage. In the de-actuated position shown in FIGURE 5 port a communicates with port b while port e is closed. In the de-actuated position no fluid flow occurs in port d because it is not in communication with any other port. The port d is connected to the hydraulic drain circuit to remove any fluid leakage at the land 79 as otherwise such leakage may also leak past land 80 thereby pressurizing the chamber 83 and prematurely actuate the shut-off valve BB. In the actuated position in FIGURE 7 port e communicates with port b while port a is closed.

Positioned immediately below the shut-off valve BB in FIGURE 3 is a first sequence valve BC in de-actuated position. It is also shown in the de-actuated position in FIGURE 7. FIGURE 5 illustrates the sequence valve BC after it has begun to actuate but insufficient to alter flow communication through its ports from that of its completely deactuated position. In FIGURE 6 the sequence valve BC is completely actuated. At this time it is pointed out that the actuation of sequence valve BC requires the elapse of an appreciable time for reasons explained later herein. The purpose of the sequence valve BC is to provide a time differential to allow certain components to actuate and perform their respective functions prior to the actuation of certain other components which will be discussed later in detail.

Referring to FIGURE 5 the sequence valve BC comprises a housing 84 having a spool type slidable valve element. The spool valve element comprises a pair of lands 85 and 86 mounted in longitudinal spaced relation on stem 87 as shown. A compression spring 88 is positioned for urging the valve element in the rightward direction as viewed in FIGURE 5. The housing 84 is provided with ports a, b, c, d, e and f as shown. In the de-actuated position port a communicates with port b while port c communicates with port e and ports d and f are closed. Port e communicates with the hydraulic drain circuit. In the actuated position (FIGURE 6) port c is closed while port a communicates with ports b, d and f.

Referring back to FIGURE 5 it will be seen that the land 86 of sequence valve BC is provided with longitudinal holes or orifices 89 extending therethrough. The orifices 89 thus communicate chamber 90 with chamber 91. Thus when the chamber 90 is pressurized fluid passes through the orifices 89 and pressurizes chamber 91. The pressurizing of chamber 91 will move the valve element leftwardly to further compress the spring 88. The number and diameter of the orifices 89 in the land 86 are important and should be chosen in accordance with the viscosity and pressure of the hydraulic fluid to govern the rate which the fluid passes through the orifices into chamber 91. The objective here is to permit a predetermined minimum time elapse after pressurizing chamber 90 before the valve element alters the port communications. Thus in effect the sequence valve BC is a time delay valve.

In FIGURE 3 to the right of the above described sequence valve BC is a drain valve BD shown in its de-actuated position. It is also shown in de-actuated position in FIGURES 5 and 7 but actuated in FIGURE 6. The purpose of the drain valve BD is to permit a pair of one-way acting rams, not yet described, to de-actuate after their respective functions have been performed which will be described more in detail later.

Referring to FIGURE 5 the drain valve BD comprises a casing 92 having a spool type slidable valve element disposed therein. The valve element comprises a pair of longitudinally spaced lands 93 and 94 mounted on a stem 95. A compression spring 96 is mounted within the drain valve BD positioned for urging its valve element in a leftward direction as viewed in FIGURE 5. The casing 92 is provided with ports a, b, c, d and e. When the drain valve BD is de-actuated port a communicates with port b while port d is closed. Port e is a vent. The valve BD is actuated by pressurizing chamber 97 through port c and when actuated (FIGURE 6) port b communicates with port d while port a is closed.

In FIGURE 3 directly beneath the previously described sequence valve BC is a snap action lock valve BJ shown in its de-actuated position. The valve BJ is also shown de-actuated in FIGURE 6 and actuated in FIGURE 7. The purpose of the lock valve BJ is to maintain in actuated position the thermo-compensated valve AY (later to be described) while the free piston engine hydraulic pump 185 is in running operation. Thus the lock valve BJ will be in actuated position when the engine pump 185 is running.

Referring to FIGURE 6 the lock valve BJ comprises a casing 98 having a spool type slidable valve element disposed therein. The valve element comprises a stem 99 having three longitudinally spaced lands 100, 101 and 102 as shown. A compression spring 103 is positioned to urge the valve element in a rightward direction as viewed in FIGURE 6. It will be observed that the land 102 is smaller in diameter than lands 100 and 101. Likewise the bore in the casing 98 slidably supporting the land 102 is smaller than the bore supporting lands 100 and 101. The casing 98 is provided with ports a, b, c, d, e and f as shown. Ports e and f communicate with the hydraulic drain circuit. When the lock valve BJ is de-actuated port a communicates with port b and port d is closed. Port e communicates with chamber 104 and port c communicates with chamber 105. When the chamber 105 is pressurized through port c the valve element shifts leftwardly to the actuated position illustrated in FIGURE 7 wherein port b communicates with port d and port e is closed. When the lock valve BJ is actuated, port a has no fluid flow because it is not in communication with any other port of the lock valve BJ.

In the actuation of lock valve BJ the pressurized fluid in chamber 105 acts on the small land 102 as a piston which then moves the valve element in a leftward direction. When the valve element has moved leftward sufficiently to close port e and open port d the chamber 104 becomes pressurized which in turn acts on the larger diameter land 101 to impart a greater impetus for complete actuation. Thus it requires a higher fluid pressure at port c to initiate actuation than required to maintain the valve in actuated position once it has been actuated. Furthermore when the land 101 uncovers port d the rate of leftward movement of the valve element is greatly accelerated and thus a "snap action" result occurs.

Referring again to FIGURE 3 positioned to the right of the above described snap action lock valve BJ is a hydraulic ram return valve BE in de-actuated position also illustrated in FIGURE 6. In FIGURE 5 the return valve BE is shown in actuated position. The purpose of the return valve BE is to permit a pair of one-way acting hydraulic rams, described later, to retract to de-actuated position when their respective functions have been accomplished.

Referring to FIGURE 6 the return valve BE is of the slidable spool type comprising a casing 106 having a slidable valve element therein. The valve element comprises a pair of longitudinally spaced lands 107 and 108 supporting a stem 109. A compression spring 110 is disposed in the casing 106 positioned to urge the valve element rightwardly as shown. The casing 106 is provided with ports a, b, c, d, and e as shown. The port a is the inlet means for pressurizing the chamber 111 whereby the valve element is actuated to a leftward position illustrated in FIGURE 5. When the return valve BE is de-actuated (FIGURE 6) port b communicates with port c while port d is closed by the land 107. Port e is a vent communicatively connected to the hydraulic drain which permits free movement of the slidable valve element. When the return valve BE is actuated (FIGURE 5) the port c communicates with port d while port b is closed by the land 108. When fluid pressure in chamber 111 is relieved the compression spring 110 returns the valve element to its de-actuated position shown in FIGURE 6.

Referring back to FIGURE 3 to the right of the above described hydraulic return valve BE is another sequence valve BO shown in de-actuated position which, except for location of its ports, is constructed similar to the sequence valve BC previously described. The sequence valve BO is also shown in FIGURE 6 in de-actuated position while FIGURE 7 illustrates it in actuated position. The purpose of the sequence valve BO is to maintain the previously described lock valve BJ in actuated position while the free piston engine hydraulic pump 185 is in running operation and also controls actuation of the previously described shut-off valve BB.

Referring now to FIGURE 6 the sequence valve BO comprises a housing 112 having a spool type valve element slidable therein. The valve element comprises a pair of longitudinally spaced lands 113 and 114 supporting a stem 115 as shown. The housing 112 is provided with ports a, b, c and d as shown. When the sequence valve BO is de-actuated (FIGURE 6) port a communicates with port b while port c is closed by the land 114. When the sequence valve BO is actuated (FIGURE 7) ports a, b and c are in communication with each other as shown. Port d is a vent in communication with the hydraulic drain circuit to facilitate free movement of the valve element and to accommodate hydraulic fluid leakage which may occur. The compression spring 116 in the housing 112 is positioned to urge the valve element toward de-actuated position illustrated in FIGURE 6. Now the land 113 is provided with at least one longitudinal passage 119 therethrough for communicating chamber 117 with chamber 118. Similar as that already described for sequence valve BC when fluid pressure in chamber 117 increases it seeps into chamber 118 through passages 119 thus elevating the fluid pressure in chamber 118. As the pressure rises in chamber 118 it acts on the lands 113 and 114 to move the valve element rightwardly from the de-actuated position shown in FIGURE 6 to the actuated position shown in FIGURE 7. However, the rate of movement of the valve element is relatively slow which, as in the case of sequence valve BC previously described, allows an appreciable time period to elapse after the start of actuation until port communications are altered. It will be seen later that this time delay period serves an important function and for this reason the aggregate cross-sectional area of the passages 119 in land 113 should be carefully chosen.

In FIGURE 3 directly below the above described hydraulic ram return valve BE is a snap action thermo-compensated valve AY shown in de-actuated position. It is also shown in de-actuated position in FIGURE 4 and in actuated position in FIGURES 6 and 7. The primary purpose of the thermo-compensated valve AY when actuated is to communicate the chamber BKc with the free piston engine hydraulic pump 185 whereby extreme high pressure hydraulic fluid delivers an impulse for starting the engine. The secondary purpose of the valve AY is to actuate the previously described lock valve BJ as will be described later in detail.

Referring to FIGURE 4 the thermo-compensated valve AY is of the slidable spool type comprising a housing 120 having a slidable spool valve element disposed therein. The valve element comprises four lands 121, 122, 123 and 124 as shown. The land 121 is of relatively small diameter slidable in a small bore of the housing 120 while lands 122, 123 and 124 are of larger diameter slidable in a large bore in the housing 120. The lands 121 to 124 are positioned in longitudinal spaced relation by the stem 125. Disposed in the chamber 126 of the housing 120 is a large compression spring 127 positioned for urging the valve element leftwardly as viewed in FIGURE 4.

Disposed in the leftward end portion of the housing 120 of the thermo-compensated valve AY is a conventional gas bellows 128 which bellows urge a slidable piston 129 in a rightward direction. Disposed within the chamber 130 in the housing 120 is a small compression spring 131 which urges the slidable piston 132 in a rightward direction. The housing 120 is provided with ports $a$, $b$, $c$, $d$, $e$, $f$, $g$, $h$, $i$ and $j$ as shown. When the valve AY is de-actuated port $d$ communicates with port $e$ while ports $a$ and $g$ are closed by land 124, port $f$ is closed by land 123 and port $c$ is closed by land 122. Ports $h$, $i$, and $j$ are in communication with the hydraulic drain circuit at all times. When the valve AY is actuated (FIGURE 7) port $c$ communicates with port $d$; port $e$ communicates with port $f$ and port $a$ communicates with port $g$ while port $j$ is closed by the land 121.

Actuation of the thermo-compensated valve AY is accomplished in a similar manner as that previously described for lock valve BJ. In the valve AY extreme high pressure is admitted through port $b$ and hydraulically acts on the small diameter land 121. As soon as the valve element has moved rightwardly sufficiently the land 121 closes port $j$ and the land 122 begins to uncover port $c$. Extreme high pressure hydraulic fluid thus enters chamber 133 and acts on the land 122 which quickly moves the valve element into its actuated position as illustrated in FIGURE 7. From this it is apparent that a higher fluid pressure is required to actuate the valve AY than that required to maintain it in actuated position after initial actuation. Furthermore the port communications are shifted rapidly.

The valve AY is also designed such that the fluid pressure required for actuation varies inversely with that of the ambient temperature. The force exerted by the gas pressure in the bellows 128 plus the compressive force of spring 131 offsets a portion of the force exerted by the spring 127. Since gas expands with a temperature rise, the gas pressure in the bellows correspondingly rises which then moves the piston 129 rightwardly (FIGURE 4) to further compress the spring 131. This further compression of the spring 131 correspondingly increases the force on piston 132 which bears upon the leftward end of stem 125 of the valve element. The resulting increased force on the stem 125 offsets a portion of the opposing force by the spring 127. The net effect is that where the ambient temperature is elevated the pressure of the hydraulic fluid entering port $b$ required to initiate actuation of the valve element will be less than that required to initiate actuation when the ambient temperature is lowered. It will be observed in comparing the valve AY in FIGURE 4 (deactuated) with that of FIGURE 7 (actuated) the piston or plate 132 bears against the leftward end of the stem 125 until the land 122 begins to open port $c$ at which point the plate 132 abuts the housing 120.

As stated above, the actuation of the thermo-compensated valve AY permits the delivery of extreme high pressure hydraulic fluid impulse for starting the free piston engine hydraulic pump 185. Since it is common that an internal combustion engine requires a greater amount of energy for starting in cold weather than that required for warm weather, the thermo-compensated valve AY automatically performs the function of requiring a higher hydraulic fluid pressure for cold weather starting than that for warm weather. Thus it is apparent that the characteristics of the springs 127 and 131 as well as that for the bellows 128 should be carefully chosen so that the valve AY will function throughout the temperature range under which the engine pump 185 may be started. When the engine pump 185 is in running operation the valve AY is in actuated position at which time the thermal characteristics are of no effect.

In FIGURE 3 directly beneath the above described thermo-compensated valve AY is a pair of hydraulic rams BG and BF in de-actuated position. The rams BG and BF are also shown in de-actuated position in FIGURE 6 while FIGURE 5 illustrates them in actuated position. The hydraulic rams BF and BG are conventional one-way acting springloaded in a retractive direction. The hydraulic ram BG herein is the hydraulic ram 158 shown in FIGURE 8 of the above mentioned copending application. Likewise the hydraulic ram BF herein is the hydraulic ram 148 shown in FIGURE 4 of the aforesaid copending application.

Referring now to FIGURE 6 of the present application the hydraulic ram BG comprises a housing 134 having a slidable piston 135 connected to work member 136 as shown. A compression spring 137 is positioned in the housing 134 for urging the piston 135 and its associated work member 136 in a retractive direction. The housing 34 is provided with ports $a$ and $b$ as illustrated. Hydraulic pressure entering port $a$ actuates the ram BF expansibly. Port $b$ is primarily a vent but, as will be seen later, may be pressurized to make certain that the ram BG is retracted when the free piston engine hydraulic pump 185 starts. The purpose of the hydraulic ram BG is to close the start cycle control valve BH, later described, and cock a toggle device 149 also later described.

The hydraulic ram BF when actuated serves to preposition the power pistons of the free piston engine hydraulic pump 185 preparatory to starting. The ram BF comprises a casing 138 having a slidable piston 139 connected to a work member 140 as shown. A compression spring 141 is disposed in the casing 138 positioned to urge retractively the piston 139 and its associated work member 140 as shown. The casing 138 is provided with ports $a$ and $b$ as illustrated. Hydraulic pressure entering the port $a$ actuates the ram BH expansively to the position shown in FIGURE 5. The port $b$ is primarily a vent but may be pressurized to make certain the ram BF is retracted as will be described later. The rams BF and BG are hydraulically connected in parallel as will be evident later herein. When the ram BF is actuated the externally protruding end 142 of the work member 140 abuttingly engages a rack member 143 in FIGURE 3 (also shown as rack member 143 in FIGURE 4 of the aforesaid copending application. The rack member 143 is in meshed relation with the pinion 144 (illustrated as pinion 142 in FIGURE 4 of the aforesaid copending application) which pinion is connected to the synchronizing mechanism for the power pistons of the free piston engine hydraulic pump 185. Actuation of the ram BF thus pre-positions the power pistons of the free piston engine hydraulic pump 185 preparatory to starting as fully described in the aforesaid copending application, reference thereto being had.

In FIGURE 3 immediately to the left of the above described hydraulic ram BG is a start cycle control valve BH in de-actuated or open position. In FIGURES 5 and 6 the valve BH is shown in actuated or closed position.

The purpose of the start cycle control valve BH is to prevent communication of hydraulic fluid between the upper unit A of the free piston hydraulic pump 185 and the hydraulic working circuit during the period when an impulse of extreme high pressure hydraulic fluid is delivered to start the engine pump 185. The valve BH is the same as the valve 138 illustrated in FIGURE 8 of the aforesaid copending application.

Referring to FIGURE 5 the start cycle control valve BH comprises a housing 145 having a slidable spool type valve element therein. The valve element comprises a pair of longitudinally spaced lands 146 and 147 connected to a stem 148 as shown. The valve BH is positioned in axial alignment with hydraulic ram BG previously described. The housing 145 is provided with a longitudinal bore adapted to accommodate slidably the work member 136 of the ram BG for abutting engagement with the rightward end of the stem 148 as shown in FIGURE 5. The housing 145 is provided with ports $a$ and $b$, the port $a$ being an inlet port and port $b$ being an outlet port. Ports $c$ and $d$ in the housing 145 are vents and if desired may be connected to the hydraulic drain circuit to accommodate hydraulic fluid leakage. When the valve BH is actuated as shown in FIGURE 6 the land 147 closes the inlet port $a$ and thus no fluid flows out through the outlet port $b$. In the de-actuated position of the valve BH as shown in FIGURE 3 the inlet port $a$ communicates with the outlet port $b$.

In FIGURE 3 at 149 is indicated a toggle device in the de-actuated or uncocked position. In FIGURES 5 and 6 the toggle device 149 is shown in the actuated or cocked position. The toggle device 149 functions in the same manner as the toggle device 174 in FIGURE 8 of the aforesaid copending application.

Referring to FIGURE 5 the toggle device 149 may conveniently comprise a rod 150 having one end thereof pivotally connected at 151 to the protruding portion of the stem 148 of the start cycle control valve BH. Pivotally connected at 152 on the other end of the rod 150 is a toggle lever 153 having a roller 154 mounted on one end thereof as shown. The other end of the toggle lever 153 is pivotally connected at 155 to a stationary member (not shown). A tension spring 156 is provided having one end connected to the lower portion of the toggle lever 153 and the other end connected to a stationary member (not shown).

The toggle device 149, start cycle control valve BH and the hydraulic ram BG are mounted in alignment as shown in FIGURE 3. From the uncocked position in FIGURE 3 the ram BG is actuated to the position shown in FIGURE 5 which pushes the stem 148 of the valve BH thereby closing communication between ports $a$ and $b$ thereof. In turn the stem 148 of the valve BH pushes the toggle lever 153 of the toggle device 149 to move the roller 154 to the left of dead center with reference to the tension spring 156. Thereafter the hydraulic ram BG retracts leaving the valve BH in closed position and the toggle device 149 in cocked position. As viewed in FIGURE 6 it can be seen that if the roller 154 of the toggle device 149 is moved rightwardly to a point just past dead center with reference to the spring 156, the valve BH will be opened by snap action, due to the force of the spring 156, to the position illustrated in FIGURE 3. Means will now be described for tripping the cocked toggle device 149 to the uncocked position.

In FIGURE 3 adjacent the toggle device 149 is a cam 157 having a lobe 158 mounted on a shaft 159. The cam 157 corresponds to the cam 184 illustrated in FIGURE 4 of the aforesaid copending application. The shaft 159 is part of the mechanism for synchronizing the movement of the power pistons in the free piston engine hydraulic pump 185 which mechanism is described in detail in the aforesaid copending application reference thereto being had. It is sufficient to say that in starting the engine pump 185 when the upper pair of power pistons moving on initial fuel-air compression stroke reaches ignition position (i.e. initial firing) the lobe 158 of the cam 157 will have moved into engagement with roller 154 of the toggle device 149 and shifted the toggle lever 153 sufficiently beyond dead center position thereby tripping the toggle device 149 back to the uncocked position illustrated in FIGURE 3. Further details of the toggle device 149 will be described later herein.

Referring now to FIGURE 3A there is a conventional rotary type hydraulic motor CD having its output shaft connected to the input element of a conventional overrunning clutch 160. The output element of the clutch 160 is connected to the shaft of a conventional electric motor MA. The shaft of the electric motor MA is also connected in drive relation with a conventional extreme high pressure hydraulic pump AH. The inlet for the pump AH is at port $a$ and the outlet is at port $b$ thereof. The inlet for the tydraulic motor CD is at port $a$ thereof and the outlet is at port $b$. It should be apparent that if the electric motor MA is energized it drives the extreme high pressure hydraulic pump AH but does not drive the hydraulic motor CD due to automatic disengagement of the overrunning clutch 160. However, when the hydraulic motor CD is pressurized from the high pressure hydraulic circuit through port $a$ the clutch engages thereby driving the extreme high pressure hydraulic pump AH through the electric motor MA which electric motor is then de-energized as will be further explained later. The purpose of the pump AH is to provide the source for extreme high pressure hydraulic fluid required for starting and operating the free piston engine hydraulic pump 185 according to this invention. It is also pointed out that the capacity output in volume of the pump AH need not be large as will be evident later herein.

Figure 1:
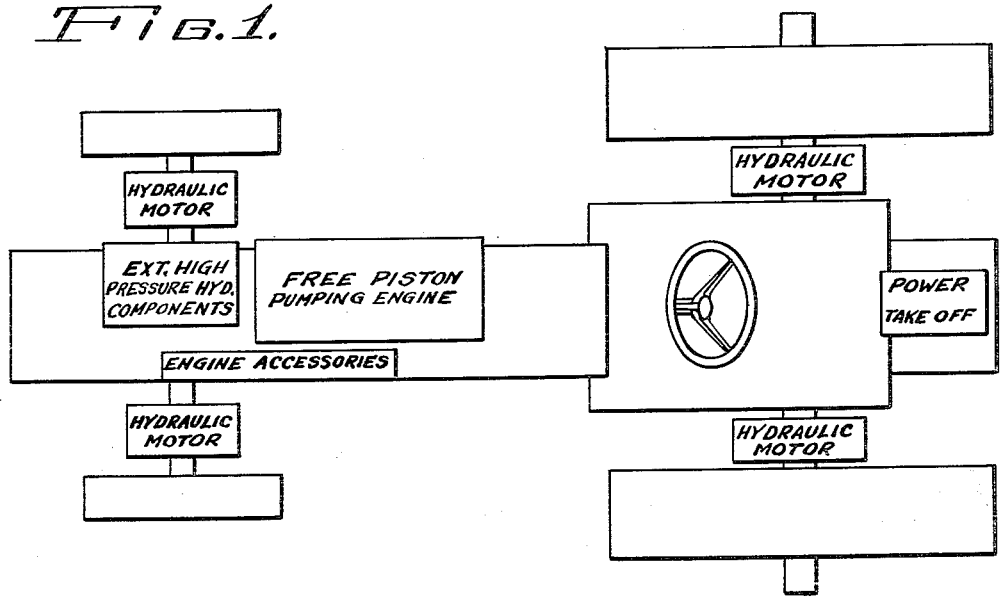
FIGURE 1 is a plan view, in diagrammatic form, of an agricultural tractor powered by a free piston engine hydraulic pump illustrating the general location of component assemblies of the hydraulic system of this invention.
Figure 2:
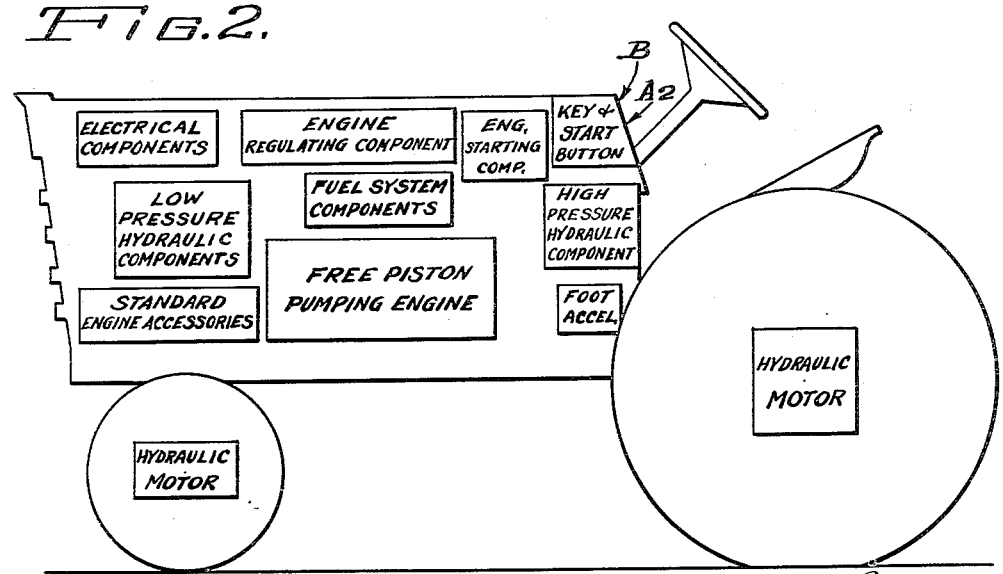
FIGURE 2 is a side view, in diagrammatic form, of the tractor of FIGURE 1 further illustrating the general location of component assemblies of the hydraulic system of this invention.

In FIGURE 3A the start key switch Y is a conventional single pole electric switch which is mounted on the instrument panel of the tractor (FIGURE 2) positioned for convenient access to the operator. The switch Y may only be closed electrically by the insertion of the key 161 and thereafter rotating same in a similar manner as that of a conventional ignition switch employed on most motor vehicles. Thus, as will be evident later herein, the tractor of FIGURES 1 and 2 is inoperative unless the switch Y is closed by the insertion and operation of the key 161 therein. As will be described later in detail, when the start key switch Y is closed it serves to energize the single pole normally open start key relay switch C to its electrically closed position. Closing of switch C energizes the electric motor MA and actuates the solenoid run valve AJ previously described. In addition it also energizes the electric motor M (FIGURE 3B) for driving the free piston engine pump accessories described later.

Immediately above the start key switch B in FIGURE 3A is a single pole normally open start button switch AZ. The switch AZ is mounted near the switch Y on the tractor as indicated in FIGURE 2. When the button 162 is depressed by the operator at the proper time the switch AZ electrically closes which serves to energize the start button relay switch AZI. The relay switch AZI is a single pole normally open switch. When energized it closes which in turn energizes the solenoid start valve AT in FIGURE 3 (previously described) to actuated position.

Also in FIGURE 3A is a conventional electric storage battery Z which provides the electric energy necessary to start and operate the free piston engine hydraulic pump 185 according to this invention. A conventional voltage regulator BT is provided to govern the electric charging of the battery Z by the generator G (FIGURE 3B) when the free piston engine pump 185 is in operation.

In FIGURE 3A there is a single pole normally closed motor cutout relay switch AK. The relay switch AK is energized to open position when the high pressure switch AO in FIGURE 3, previously described, is actuated to closed position. The purpose of relay switch AK is to de-energize the motor MA when the extreme high pressure hydraulic circuit reaches a pre-determined upper limit set by the high pressure switch AO.

Also in FIGURE 3A is a low pressure cutout relay switch AN. The relay switch AN is a single pole normally open switch. The relay switch AN is energized to closed position when the low pressure switch AM in FIGURE 3 (previously described) is closed. The purpose of relay switch AN is to prevent energizing the solenoid start valve AT when the hydraulic pressure in the extreme high pressure circuit is below the limit set for actuation of the low pressure cutout switch AM. In effect this prevents the operator from attempting to start the free piston engine hydraulic pump 185 when the fluid pressure in the extreme high pressure hydraulic circuit is insufficient and is accomplished by opening the electric circuit, through relay switch AN, to the start button switch AZ.

In FIGURE 3A is a relay switch X having single pole normally closed contacts BU and single pole normally open contacts BS as shown. In the de-energized position shown the contacts BU are closed which condition permits energizing the motor M (FIGURE 3B) when the start key switch Y is closed. When the free piston engine hydraulic pump 185 has started the generator G rotates at a speed sufficient to deliver a voltage high enough to charge the battery Z, the charging voltage from the generator G (FIGURE 3B) thereupon energizes the relay switch X to actuated position. In actuated positon the contacts BU open which de-energizes the motor M (FIGURE 3B). At the same time the contacts BS close which connects the generator G with the battery Z through the previously described voltage regulator BT. Thus when the free piston engine pump 185 is in running operation the battery Z is re-charged.

Also in FIGURE 3A is an extreme high pressure pump motor cutout relay switch CE. The relay switch CE is a single pole normally closed switch. The relay switch CE is energized to open position by the generator G (FIG. 3B) and is actuated at the same time as that of the above described relay switch X. The purpose of the relay switch CE is to de-energize the motor MA when the free piston engine hydraulic pump 185 is in running operation.

Grouped together in FIGURE 3B are the accessories for the free piston engine hydraulic pump 185. An electric motor M, powered by the battery Z may be connected conveniently in drive relation by means of common shaft 163 to a hydraulic charge pump ZA, lubricating oil pump H, fuel pump O, coolant water pump V, and fan U as shown. The pumps ZA, H, O and V may be of any suitable conventional design. The motor M and shaft 163 are also drivenly connected to the output element of an over-running clutch 164. An electric generator G is drivingly connected to the input side of the clutch 164 and the output shaft of a rotary type hydraulic motor BQ. Thus when the electric motor M is energized it drives the pumps ZA, H, O, V and fan U but does not drive the generator G or de-energized hydraulic motor BQ. When, however, the free piston engine hydraulic pump 185 is in running operation, the hydraulic motor BQ becomes energized, as will be explained later, which then drives the generator G as well as pumps ZA, H, O, V and fan U. Thus as the hydraulic motor BQ overtakes the motor M the generator G actuates, as will be recalled previously, the relay switch X which actuation de-energizes the electric motor M and thereafter the engine accessories are powered by the hydraulic motor BQ.

The purpose of the hydraulic charge pump ZA is to fill the entire hydraulic system with hydraulic fluid and to replenish hydraulic fluid lost from the various circuits through leakage or otherwise. Thus the capacity of the hydraulic charge pump ZA need not be large but must be capable of delivering hydraulic fluid at a pressure somewhat greater than that of the low pressure hydraulic circuit (e.g. 200 p.s.i.). The hydraulic charge pump ZA receives hydraulic fluid from the hydraulic fluid sump XA through a primary hydraulic filter YA by means of conduits 165 and 166 as shown. The outlet side of the hydraulic charge pump ZA communicates to the conduit 167 through a secondary hydraulic fluid filter AA and hydraulic fluid heat exchanger W (for heating or cooling the hydraulic fluid as may be desirable). A conventional pressure relief valve AB is connected to the conduit 167 for the purpose of limiting the discharge pressure of the pump ZA which permits the by-passing of excess fluid pressure back to the sump ZA through the conduit 168.

The conduit 167 from the charge pump ZA leads to the inlet sides of a pair of check valves AC and AD as illustrated in FIGURE 3B for purposes to be described later.

The lubricating oil pump H is a means for lubricating under pressure the free piston engine hydraulic pump 185. The pump H draws lubricating oil from the lubricating oil sump F through a primary oil filter GA by means of conduits 169 and 170 as shown in FIGURE 3B. The outlet side of the pump H communicates with conduit 171 through a filter IA and lubricating oil heat exchanger J (for cooling the oil). A conventional pressure relief valve K is provided to bypass lubricating oil at excessive pressure to the sump F through conduits 172a and 172 as shown. The relief valve K is thus a means for limiting the maximum pressure of lubricating oil delivered to the free piston engine pump 185.

The fuel pump O is a means for delivering fuel under pressure to the fuel injectors 214–217 (FIGURE 3C) of the free piston engine hydraulic pump 185. The fuel pump O draws fuel from the fuel tank MB through a filter N by means of conduits 173 and 174 as shown in FIGURE 3B. The outlet side of the fuel pump O communicates with the conduit 175 through conduit 176 and filter P. A conventional pressure relief valve Q is connected to the conduit 175 to limit the maximum fuel pressure delivered to the injectors 214–217 by bypassing fuel at excessive pressure back to the fuel tank MB by means of conduit 177.

The purpose of the water pump V is to provide means for circulating water to cool the above mentioned heat exchangers J and W and the coolant jackets in the free piston engine hydraulic pump 185. The water pump V draws water from the water tank S through a conventional radiator or air cooled heat exchanger T by means of conduits 178 and 179 as shown. The outlet side of the water pump V is connected to the conduit 180. The conduit 180 thus communicates cooled water into the serially connected conventional heat exchangers W and J to the conduit 181. The conduit 181 is connected to the inlet side of the coolant system in the free piston engine hydraulic pump 185 later described.

In FIGURE 3B there is shown a low pressure accumulator AE which is constructed similar to that of the extreme high pressure accumulator AQ (FIGURES 3 and 12) previously described except it is operative at the pressure of the low pressure hydraulic circuit (e.g. 200 p.s.i.). The low pressure accumulator AE is communicatively connected to conduits 182, 183 and 184 as shown. The purpose of the low pressure accumulator AE is to receive and store hydraulic fluid discharged from the various hydraulic motors (i.e. work load) energized by the high pressure hydraulic fluid and to return the fluid to the inlet side of the free piston engine hydraulic pump 185 under pressure (e.g. 200 p.s.i.). Also it serves to smooth or absorb pressure fluctuation and supply sudden demands for fluid.

The check valves AF and AG (FIGURE 3B) are provided to prevent reverse flow of hydraulic fluid in the conduits 183 and 184 which would otherwise occur when the pumps in the free piston engine hydraulic pump 185 are in fluid delivery stroke. Check valves for such purposes are necessary for any piston type pump as is conventionally known.

In FIGURE 3C there is shown an abbreviated view, in longitudinal section, of the free piston engine hydraulic pump 185 which is also shown in enlarged form in FIGURE 9. In FIGURE 9 engine pump 185 is shown in diagrammatic form without the synchronizing mechanism for maintaining the power pistons thereof in synchronized relation. The free piston engine hydraulic pump 185 is described in detail in the aforesaid copending application, reference thereto being had. With this in mind only the more essential details thereof which mostly are essential to the present invention will be referred to here.

In FIGURE 9 the conduit 171, communicatively connected with the outlet side of the lubricating oil pump H, provides an inlet means for lubricating the free piston engine hydraulic pump 185 under pressure. The outlet means provided for returning lubricating oil from the engine pump 185 to the lubricating oil sump F is through the conduit 172 to the sump F. It should be understood that the lubrication of the engine pump 185 is conventionally the same as for free piston engines and the drawing (FIGURE 9) is merely diagrammatic indicating cool lubrication oil under pressure being furnished to the engine pump 185 and return to the sump F in a conventional circulatory manner.

In a similar conventional manner to that of the lubrication means described above, the conduit 181, communicating with the outlet side of the water pump V, provides an inlet means for coolant water into the conventional cooling passages of the engine pump 185. After circulating through the engine pump 185 the coolant water is discharged to the water tank S through the conduit 186. Thus coolant water is circulated through the engine pump 185 in a manner conventional to free piston engines.

The free piston engine pump 185 comprises an upper unit A and a lower unit B as viewed in FIGURES 3C and 9. The upper unit A comprises a pair of power pistons 188 and 189 and the lower unit B also comprises a pair of power pistons 190 and 191 as indicated in FIGURE 9. The power pistons are maintained in synchronized relation by a synchronizing mechanism (not shown) described in detail in the aforementioned copending application. It is sufficient to say that the power pistons 188 and 189 of unit A are in opposed relation and also power pistons 190 and 191 of unit B are in opposed relation. However, the power pistons of unit A are in alternate firing relation with the power pistons of unit B.

The power pistons 188 and 189 of unit A are connected in drive relation with hydraulic pump pistons 192 and 193, respectively, as shown. Likewise, the power pistons 190 and 191 are connected in drive relation with hydraulic pump pistons 194 and 195, respectively, as shown.

Conduit 196 leading from the outlet side of check valve AF (FIGURE 3B) communicates with pump chamber 197 thus providing the upper unit A of the engine pump 185 with an inlet means for hydrualic fluid. Conduit 198 provides an outlet means for hydraulic fluid from the pump chamber 197 of the upper unit A of the engine pump 185.

Conduit 199 leading from the outlet side of check valve AG (FIGURE 3B) communicates with pump chamber 200 thus providing the lower unit B of the engine pump 185 with an inlet means for hydraulic fluid. Conduit 201 provides an outlet means for hydraulic fluid from the pump chamber 200 of the lower unit B of the engine pump 185.

It will be observed from FIGURE 9 that the free piston engine hydraulic pump 185 includes a free piston engine of the outboard firing type, that is to say, each power piston is provided with a separate combustion chamber in the outboard position. Thus the power stroke of each power piston occurs when the power piston moves in the inboard direction. Further, the hydraulic pumping stroke of the pump pistons occurs during inboard movement thereof. Thus it is clear that the hydraulic pumping stroke occurs when the power pistons are in power stroke. Conversely when the power pistons move outboardly (fuel-air compression stroke) the pump pistons also move outboardly on hydraulic fluid intake stroke.

The engine pump 185 includes the usual air intake ports indicated at 202, 203, 204 and 205 as well as exhaust ports indicated at 206, 207, 208 and 209. Conventional fuel inlets to the combustion chambers of the engine pump 185 are provided and fuel thereto conducted through conduits 210, 211, 212 and 213.

The engine pump 185 may include a conventional air compressor (not shown) for providing compressed air for use in the combustion chamber in a conventional manner. However, it will be observed that the engine pump 185 does not require resilient storing means commonly referred to as "bounce chambers." The alternate firing arrangement between the power pistons of unit A with respect to the power pistons of unit B negates any necessity for bounce chambers.

Now for providing fuel to the engine pump 185 fuel injectors 214, 215, 216 and 217 shown diagrammatically in FIGURE 3C are provided. The fuel injectors per se are of conventional construction, each having a fuel inlet, a fuel outlet and an hydraulic fluid pressure line for governing or regulating the fuel injection pressure to its associated power cylinder of the engine pump 185. Fuel under pressure in conduit 175 from the fuel pump O enters the injector 214 through fuel inlet conduit 218 and fuel enters the injector 216 through conduit 219 communicatively connected to conduit 218. In a similar manner fuel enters the injector 215 through conduit 175 and fuel enters the injector 217 through conduit 220 communicatively connected to conduit 175.

The fuel outlet from injector 214 is through conduit 212 leading to the left power cylinder of the lower unit B of engine pump 185 as viewed in FIGURE 3C. The fuel outlet from injector 216 is through conduit 210 leading to the left power cylinder of the upper unit A of the engine pump 185. Similarly the fuel outlet from injector 215 is through the conduit 213 leading to the right power cylinder of the lower unit B of the engine pump 185 while the fuel outlet from injector 217 is through conduit 211 leading to the right power cylinder of the upper unit A. Each of the fuel injectors 214–217 is provided with de-actuating devices indicated at 221, 222, 223 and 224. The de-actuating devices 221–224 are constructed in a similar manner and therefore only de-actuating device 222 will be described in detail.

Referring now to FIGURE 10 the fuel injector de-actuating device 222 is shown enlarged and longitudinally sectioned. The device 222 is in the form of an adapter mounted directly on the plunger end of the housing of fuel injector 215. The de-actuating device 222 comprises a housing 225 having a pair of longitudinally disposed cylinder bores 226 and 227 in adjacent parallel relation as shown in FIGURE 10. Extending axially through the bore 226 is a connecting rod 228 which rod serves to actuate the injector 215 in a conventional manner. Thus each time the rod 228 is moved retractively a predetermined distance the injector 215 charges a metered amount of fuel into the right power cylinder of the lower unit B of the engine pump 185. The outer end of the rod 228 is provided with a conventional roller 229 engageable with cam 230 (FIGURE 3C). The cams 230 and 231 are the cams 90 and 90′ respectively shown in FIGURE 4 of the aforementioned copending application.

Secured to the connecting rod 228 of the injector 215 (FIGURE 10) is a plate 232 slidable in the bore 226 which resembles a piston. A compression spring 233 is disposed in the bore 226 positioned to urge the plate 232 and connecting rod 228 expansively. Disposed in the housing 225 is a small bore 234 positioned to receive slidably a pin 235. The inner end of the pin 235 is abuttingly engageable with the plate 232 as shown. The outer or protruding end of the pin 235 is pivotally connected to one end of a link 236. The link 236 is shown enlarged in FIGURE 11. The link 236 is pivotally mounted at pin 237 to a stationary supporting element 238. The end portions of the link 237 are provided with elongated holes 239 and 240 for the purpose of permitting linear motion of pin 235 and piston rod 241 at their pivotal connections as the holes 239 and 240 move arcuately. Disposed within the bore 227 of the housing 225 is an hydraulic piston 242 connected to the piston rod 241 as shown in FIGURE 10. The outer or protruding end of the piston rod 241 is pivotally connected to the other end of the link 236 at the elongated hole 240 as shown. A compression spring 243 is disposed in the bore 227 positioned to urge the piston 242 expansively. The characteristics of the spring 243 should be of high compressive value so that it may easily overcome the compressive force of the spring 233.

A port is provided in the housing 225 for communicatively connecting conduit 244 with chamber 245 for pressurizing the chamber for retracting the piston 242.

In FIGURE 10 the de-actuating device 222 is in its de-actuated position and thus there is no hydraulic pressure in the conduit 244 or chamber 245. The compressive force of the spring 243 maintains the piston 242 and its associated piston rod 241 in the expanded position as shown. The link 236 and pin 235 thus maintains the plate 232 and its associated connecting rod 228 in retracted position whereby the roller 229 is disengaged from the cam 230 (FIGURE 3C). In this condition the connecting rod 228 does not reciprocate and thus the fuel injector 215 delivers no fuel to the combustion chamber of the lower right power cylinder (FIGURE 3C) of the engine pump 185. Assuming all four de-actuating devices are in the de-actuated position as shown in FIGURES 3C and 10, the engine pump 185 may not operate by reason of lack of fuel injection thereto.

When the chamber 245 is pressurized through the conduit 244 the piston 242 and its associated connecting rod 241 retracts to compress the spring 243. The link 236 moves to the position shown in dotted lines in FIGURE 10 which in effect withdraws the pin 235 from the plate 232 thereby allowing the compressed force of the spring 233 to move the roller 229 into constant engagement with the cam 230. Thereafter rotative movement of the cam 230 reciprocates the connecting rod 228 which actuates the injector 215 for injecting fuel into the combustion chamber of the lower right power cylinder (unit B) of the engine pump 185.

Now with reference to FIGURE 3C it will be appreciated by those skilled in the art that the movement of cams 230 and 231 control the fuel injection into the combustion chambers for the power cylinders of the engine pump 185 and therefore must be in timed relation. To accomplish this the cams 230 and 231 are mounted on shaft 159 (FIGURES 3, 4 and 5) which shaft corresponds to shaft 88 of FIGURE 4 in the above referred to copending application. Likewise cams 230 and 231 correspond to cams 90 and 90' of FIGURE 4 in the referred to copending application. For purposes herein it is sufficient to say that the shaft 159 forms part of the synchronizing mechanism for governing the movement of each power piston of the engine pump 185 in relation to the other power pistons which is fully described in the aforesaid copending application. It will be noted that the cam 157 of FIGURE 3 is also mounted on shaft 159 as previously mentioned which is also further described in the said copending application.

In FIGURE 3C there is shown a stop valve AV in its de-actuated position. In FIGURES 4 and 5 the stop valve AV is shown in the actuated position. The purpose of the stop valve AV is to make available extreme high pressure hydraulic fluid for pressurizing the fuel charges to the engine pump 185 at the fuel injectors 214–217 and to maintain actuation of certain hydraulic components shown in FIGURE 3 during operation of the engine pump 185. The stop valve AV is always in actuated position during the starting and running of the engine pump 185.

Referring now to FIGURE 4 the stop valve AV comprises a casing 246 having a slidable spool type valve plunger therein. The valve plunger comprises a stem 247 having a pair of large lands 248 and 249 and a small land 250 mounted thereon as shown. On the leftward portion of the stem 247 is mounted a skirted piston 251. Within the hollow portion formed by the skirt of the piston 251 is compression spring 252 of low force characteristics but sufficient to urge the plunger element rightwardly to the position shown in FIGURE 3C when the hydraulic actuating mechanism is de-energized. The casing 246 is provided with hydraulic fluid ports a, b, c, d, e, f, g and h as shown. The ports f, g and h are in communication with the hydraulic drain circuit and ports a, b and c communicate with the extreme high pressure hydraulic circuit. The communication of ports d and e will be described later.

In the de-actuated position of stop valve AV (FIGURE 3C) the ports a and b are closed and all other ports are open with respect to lands 248, 249 and 250. In the actuated position ports e and h are closed and no fluid flow occurs through port f as it is not in communication with any other port. Port b communicates with port d in actuated position and port a is opened to pressurize the chamber 254. In actuating the stop valve AV extreme high pressure hydraulic fluid enters port c thereby pressurizing chamber 253 which pressure urges the spool valve plunger leftwardly to compress the spring 252. Leftward movement of the spool valve element closes port h by registration with land 250. Further leftward movement opens port a thereby pressurizing the chamber 254. The pressurizing of chamber 254 hydraulically acts on the large diameter land 249 which then moves the valve plunger to its leftward limit quickly (snap action) which opens port b and closes port e. Thus it requires less hydraulic pressure to maintain the stop valve AV in actuated position than that required to initially actuate it. The skirt of the piston 251 limits the leftward movement of the spool valve element as the distance of the protruding left end of the stem 247 is important as will be evident later herein.

Directly beneath the above described stop valve AV (FIGURE 3C) is a fuel injector pressure modulator valve AX also shown in FIGURES 4 and 5. The modulator valve AX is constructed similar to the pressure regulator valve AU previously explained. The purpose of the modulator valve AX is to regulate the pressure of the fuel injection to the engine pump 185 at the fuel injectors 214–217. In other words as the fuel throttle (later described) is increased the fuel injection pressure is also correspondingly increased.

Referring now to FIGURE 5 the modulator valve AX comprises a housing 255 having a slidable spool valve element disposed therein. The spool valve element comprises a stem 256 having a land 257 and a plate 258 in axial spaced relation as shown. A second stem 259 having one end protruding from the housing 255 and a second plate 260 connected to the other end. Disposed between the plates 258 and 260 is a compression spring 261 which spring urges the stems 258 and 260 toward the position illustrated in FIGURE 5.

The housing 255 is provided with ports a, b, c, and d as illustrated in FIGURE 5. Extreme high pressure hydraulic fluid enters port a of modulator valve AX and pressurizes chamber 262 through port d and also pressurizes conduit 263 through port c. Conduit 263 communicates with conduit 264 which latter conduit communicates with fuel injectors 214–217 as shown. At this point it should be mentioned that no fluid flow occurs in conduit 264 as the fluid pressure applied to the injectors 214–217 merely exerts pressure to increase the fuel pressure delivered to the engine pump in a conventional manner. The purpose of the modulator valve AX is to regulate the fluid pressure in conduit 264 corresponding to the fuel throttle position.

In FIGURE 3C there is shown a high pressure accumulator AI which is constructed similar to that of accumulators AE and AQ previously described in detail as shown in FIGURE 12 except that it is operable in the range of the high pressure hydraulic fluid (e.g. 5000 p.s.i.). The purpose of the high pressure accumulator AI is to provide a resilient reservoir for the hydraulic fluid pumped by the engine pump 185 and is a component of the hydraulic working circuit. The hydraulic fluid volume capacity of the accumulator AI should be large as is the accumulator AE in comparison with the relatively small capacity of the accumulator AQ.

In FIGURE 3C there is shown a pair of discharge valves BI and BN. These discharge valves BI and BN are conventionally constructed similar to the inlet valves AF and AG previously described, all being check valves. The purpose of discharge valve BI is to permit one-way flow of high pressure hydraulic fluid from the upper unit A of the engine pump 185 to the high pressure accumulator AI of the hydraulic working circuit. Likewise the discharge valve BN permits one-way flow of high pressure hydraulic fluid from the lower unit B of the engine pump 185 to the high pressure accumulator AI of the hydraulic working circuit.

In the lower right portion of FIGURE 3C indicated at 265 is a group of components which aggregately is the useful work load applied to the hydraulic working circuit of the hydraulic system for this invention. The numeral 266 indicates a rotative hydraulic motor representing the hydraulic motors for propelling the tractor diagrammatically illustrated in FIGURES 1 and 2 and the control valve therefore indicated at 267 in FIGURE 3C. Also a hydraulic linear motor is indicated at 268 and control valve 269 therefore as illustrative of other hydraulic accessories on the vehicle such a conventional bulldozer attachment (not shown) on the tractor of FIGURES 1 and 2. Thus the components of the useful work load 265 forms no part of the invention as it merely illustrates an example of how the hydraulic fluid under pressure obtained from the system of this invention may be usefully applied.

In the assembly of FIGURES 3, 3A, 3B and 3C to form a single schematic view as previously described there is shown a mechanical control linkage device indicated by the numeral 270. The linkage device 270 comprises a foot operated pedal 271 (FIGURE 3A) pivotally mounted at 272 to a stationary support 273 on the vehicle. The pivot 272 may, if desired, be fitted with a spring urging the pedal 271 in an upward direction so that it operates similar to that of a conventional throttle accelerator pedal found in most vehicles propelled by internal combustion engines. A rod 274 has one end thereof pivotally connected at 275 to the upper portion of the pedal 271 such that when the pedal 271 is depressed by the operator's foot the rod 274 descends and, conversely, when the operator elevates the pedal 271 either by its spring loading or for force applied at the portion leftward of the pivot 272, the rod 274 elevates correspondingly. The other end of the rod 274 is pivotally connected at 276 to one arm of a rock arm 277 (FIGURE 3B). The rock arm 277 is pivotally mounted at 278 to a stationary portion of the vehicle. The other arm of the rock arm 277 is pivotally connected to rod 279 (FIGURE 3B and 3C) at 280. Since the rod 279 moves linearly in a horizontal direction as shown the associated arm of the rock arm 277 is provided with a slot or groove 281 to accommodate arcuate movement thereof.

In FIGURE 3C a pair of rock arms 282 and 283 are pivotally mounted respectively at 284 and 285 to a stationary portion of the vehicle. The upwardly extending leg of rock arm 282 is pivotally connected at 286 to the rod 279. Similarly the upwardly extending leg of rock arm 283 is pivotally connected at 287 to the rod 279. The horizontal leg of the rock arm 282 is pivotally connected at 288 to the throttle control rod 289 for the fuel injectors 214 and 216. Likewise the horizontal leg of the rock arm 283 is pivotally connected at 290 to the throttle control rod 291 for the fuel injectors 215 and 217. The legs of the rock arms 282 and 283 at pivots 286, 287, 288 and 290 are slotted to accommodate the arcuate movement of the rock arms 282 and 283 in relation to the linearly movable rods 279, 289 and 291.

The throttle control rods 289 and 291 are conventional means for varying the metered quantity of fuel discharged by known types of fuel injectors such as the injectors 214–217. Thus when the pedal 271 (FIGURE 3A) is depressed by the operator the rod 279 moves in a rightward direction as viewed in FIGURES 3B and 3C. Rightward movement of the rod 279 depresses the throttle control rods 289 and 291 which increases the metered quantity of fuel discharged by the fuel injectors 214–217 thereby correspondingly increasing the fuel rate supplied to the engine pump 185.

Now referring back to FIGURES 3A and 3B there is shown a cross-arm 292 rigidly connected to the rod 279 by connector element 293. Thus the vertically disposed cross-arm 292 moves horizontally with the rod 279. Rigidly connected to the upper end of the cross-arm 292 is a horizontally disposed rod 294 (FIGURES 3 and 3A) in generally parallel relation with respect to rod 279. Likewise connected rigidly to the lower end of cross-arm 292 is another horizontal rod 295 also in generally parallel relation with the rod 279. It will be apparent that rods 279, 294, 295 with the cross-arm 292 form a fork-like structure which is shiftable in a horizontal direction as the operator manipulates the pedal 271.

In FIGURE 3 is an upper lever 296 pivotally mounted at 297 to a stationary portion of the vehicle. The bottom end of the lever 296 is pivotally connected at 298 to the rightward end of the rod 294. The slotted portion on the bottom of the lever 296 is to accommodate the arcuate movement thereof in relation to the linear movement of the rod 294. It will be observed that the lever 296 is positioned so that one side thereof is abuttingly engageable with the protruding end of stem 69 of the start position holder ram BA (FIGURE 5) above the pivot 297. In addition, as best seen in FIGURE 4, the pressure regulator AU and stop actuator ram AR are also in alignment with the same side of the upper lever 296 but the ends of the protruding stem 69 and work member 74 are positioned below the pivot 297 of lever 296. Thus when the stop actuator ram AR de-actuates the large spring 75 pushes piston 73 and its work member 74 leftwardly into abutting relation with lever 296 to move lever 296 into "stop" position with sufficient force that the operator cannot shift pedal 271 away from the "stop" position. The stem 69 of the pressure regulator AU is always in abutting relation with lever 296.

Now in FIGURE 3C it will be seen that there is a lower lever 299 constructed and mounted similar to that of the above described upper lever 296. The lower lever 299 is pivotally mounted at 300 to a stationary portion of the vehicle. The bottom end portion of lever 299 is pivotally connected at 301 to the rightward end of the rod 295. The bottom portion of the lever 299 is slotted to accommodate arcuate movement thereof in relation to the linear movement of the rod 295. The stop valve AV and the fuel injector pressure modulator valve AX are positioned in alignment with one side of the lever 299 as shown. In FIGURES 4 and 5 it will be seen that the protruding end of the stem 247 of the stop valve AV is engageable abuttingly with the lever 299 above the pivot 300. On the other hand the protruding end of the stem 259 of the modulator valve AX abuts at all times with the lever 299 below the pivot 300.

The various components of the starting and control system of a preferred embodiment of this invention for operating the free piston engine hydraulic pump 185 have now been described. The operation of the system will now be discussed.

*Operation*

FIGURE 13 represents a simplified or condensed version of combined FIGURES 3, 3A, 3B and 3C. The dotted lines represent the mechanical control linkage device 270. The full double lines represent the hydraulic working circuit. The wavy lines indicate electrical circuits and the single full lines indicate hydraulic extreme high pressure and drain lines. However FIGURE 13 should be regarded as being very general as it will be seen later that some overlapping exists. The purpose of FIGURE 13 is therefore to show the general layout of components in FIGURES 3, 3A, 3B and 3C in condensed form. Referring now to assembled or combined drawing (FIGURES 3, 3A, 3B and 3C) the starting, operating, and stopping the free piston engine hydraulic pump 185, in that order will now be described.

*Starting the Engine Pump*

The composite drawing (FIGURES 3, 3A, 3B and 3C) illustrate the components of the control system of this invention when the engine pump 185 is stopped or at rest condition. It will be assumed that all of the hydraulic fluid lines are filled with hydraulic fluid, i.e. no air pockets. In addition it is assumed that the fuel, lubrication and water coolant systems are filled. Further, it is assumed that the control valves 267 and 269 of the work load 265 are in closed position.

*First Stage*

After insertion of the key 161 (FIGURE 3A) the operator initiates the first stage by closing the start key electric switch Y which immediately actuates the start key relay switch C. The start key switch Y must be closed during all phases of starting and operating the engine pump 185. When the key switch Y is closed it serves to close the electric circuit between the battery Z and the operating coil 302 of relay switch C in the following manner. Current from the positive terminal 314 of the battery Z passes through coil 302 of the start key relay switch C, thence through conductor 306 across the contacts 305 of the start key switch Y, thence through conductor 304 to the negative terminal 303 of the battery Z, thus completing the circuit for actuating the relay switch C from a normally open position to closed position. Actuation of the relay switch C to close its contacts 308 immediately energizes the electric motor MA (FIGURE 3A) for driving the extreme high pressure hydraulic pump AH, energizes the electric motor M (FIGURE 3B) for driving the engine accessories, and energizes the solenoid run valve AJ to the position shown in FIGURE 4, all being accomplished as described below.

When the contacts 308 of relay switch C are closed, current from the positive terminal 314 of battery Z flows through conductor 307 across the closed contacts of actuated relay C, thence through conductor 360 across the normally closed contacts 311 of de-actuated relay switch AK (motor cutout relay switch) and conductor 310 to the electric motor MA. From the motor MA the current flows across the normally closed contacts 309 of de-actuated relay switch CE (extreme high pressure pump electric motor cutout relay switch) and conductor 304 to the negative terminal 303 of the battery Z. The circuit thus closed energizes electric motor MA for driving the extreme high pressure hydraulic pump AH.

When the contacts 308 of relay switch C are closed current from the positive terminal 314 of battery Z flows through conductor 307, across the closed contacts 308 of actuated relay switch C, thence through conductors 360 and 312 to the electric motor M (engine accessories drive motor, FIGURE 3B). From the electric motor M the current flows through conductor 313, through closed contacts BU of switch X to conductor 304 and thence to the negative terminal 303 of battery Z. The circuit thus closed energizes the electric motor M (FIGURE 3B) for driving the hydraulic charge pump ZA, lubricating oil pump H, fuel pump O, water pump V and fan U all shown in FIGURE 3B.

When the contacts 308 of relay switch C are closed current from the positive terminal 314 of the battery Z flows across the contacts 308 of relay switch C and through conductor 360 to conductor 312, thence to the solenoid coil 315 (FIGURE 3) of the solenoid run valve AJ. From the solenoid coil 315 the current flows through conductor 316 into conductor 304 and thence to the negative terminal 303 of battery Z. The circuit thus closed energizes the solenoid coil 315 to actuate the solenoid run valve AJ from the de-actuated position illustrated in FIGURE 3 to the actuated position illustrated in FIGURE 4.

Energizing of the electric motor M actuates the water pump V (FIGURE 3B) which pumps coolant water through conduit 180 to the hydraulic fluid heat exchanger W, thence through conduit 317 into the lubricating oil heat exchanger J. From the heat exchanger J the water flows to the coolant water inlet port of the engine pump 185 through conduit 181. Discharge water from the coolant water outlet port of the engine pump 185 flows through conduit 186 to the water tank S. From the water tank S the coolant water flows through heat exchanger or radiator T through conduit 178. From the heat exchanger T the coolant water flows to the inlet side of the water pump V through conduit 179. Thus coolant water circulates through the engine pump 185.

The electric motor M also drives the fan U and fuel pump O. Fuel from the tank MB flows into the filter N through conduit 173. From the filter N the fuel flows to the inlet side of the fuel pump O through conduit 174. Fuel under low pressure from the fuel pump O flows into filter P through conduit 176. From the filter P the fuel flows through conduit 175 to fuel injector 215 (FIGURE 3C). Also fuel flows to fuel injector 217 from conduit 220 communicatively connected to conduit 175. Fuel flows to fuel injector 214 through conduit 218 communicatively connected to conduit 175. Also fuel flows to fuel injector 216 through conduit 219 communicatively connected to the aforesaid conduit 218. It should be borne in mind however that until the engine pump 185 is started there is actually no flow of fuel through the injectors 214–217 but the fuel circuit is discussed here to show that the fuel under low pressure is available to the injectors 214–217. Since no fuel flows through the injectors 214–217 in the first stage the pressure relief valve Q (FIGURE 3B) will open to bypass the fuel from conduit 175 back to the fuel tank MB through the conduit 177.

The energized electric motor M also drives the lubricating oil pump H (FIGURE 3B). Lubricating oil from the sump F flows into the oil filter GA through conduit 169. From the oil filter GA the lubricating oil enters the inlet side of the lubricating oil pump H through conduit 170. Lubricating oil under pressure from the pump H flows through oil filter IA into the heat exchanger J through conduit 318. From the heat exchanger J the lubricating oil flows to the lubricating oil inlet port of the engine pump 185 through conduit 171. From the lubricating oil outlet port of the engine pump 185 the lubricating oil flows back to the sump F through conduit 172. In the event that the pressure in conduit 171 becomes excessive the pressure relief valve K (FIGURE 3B) opens to bypass lubricating oil at excessive pressure back to the sump F through conduits 172a and 172. Thus lubricating oil under pressure is circulated through the engine pump 185.

The energized electric motor M also drives the hydraulic charge pump ZA. Hydraulic fluid flows from the sump XA into the filter YA through conduit 165. From the filter YA the hydraulic fluid enters the inlet side of hydraulic pump ZA through conduit 166. Hydraulic fluid under pressure flows from the hydraulic pump ZA into filter AA. From the filter AA the hydraulic fluid flows into the heat exchanger W. From the heat exchanger W the hydraulic fluid flows to the inlet sides of check valves AC and AD (FIGURE 3B) through conduit 167. The hydraulic fluid pump ZA should maintain the fluid in conduit 167 at the selected low pressure level (e.g. 200 p.s.i.). Excessive pressure in conduit 167 is discharged to sump XA through relief valve AB and conduit 168. The outlet side of check valve AD communicates with the inlet side (port $a$) of the extreme high pressure hydraulic pump AH (FIGURE 3A) through conduit 319. Thus hydraulic fluid is furnished to the extreme high pressure hydraulic pump AH.

Hydraulic fluid from the outlet side of check valve AC (FIGURE 3B) is communicated to the low pressure accumulator AE through conduit 320. Hydraulic fluid also flows from check valve AC to the inlet side of inlet valve AF through conduits 320 and 184. From the outlet side of the inlet valve AF low pressure hydraulic fluid flows into pump chamber 197 in upper unit A of the engine pump 185 through conduit 196 (FIGURE 3C). From the pump chamber 197 the low pressure hydraulic fluid through conduit 198 is communicated with port $f$ of the de-actuated thermo-compensated valve AY which port is blocked by registration with land 123 as shown in FIGURE 4. However in FIGURE 3 the conduit 198 also communicates low pressure hydraulic fluid to conduit 323 through conduit 322 and de-actuated start cycle control valve BH which is now open. The conduit 323 communicates with the inlet side of discharge valve BI but since, at this time, there is no pressure in the high pressure accumulator AI (FIGURE 3C) the discharge valve BI will open and thus low pressure hydraulic fluid flows into conduit 324. The conduit 324 in turn communicates with conduit 325. The conduit 325 communicates with the high pressure hydraulic accumulator AI but since the hydraulic pressure in conduit 325 is in the low pressure order (e.g. 200 p.s.i.) and thus far below the operating range for accumulator AI it does not function now as an accumulator.

From FIGURE 3C it will be seen that the above mentioned conduit 325 is also communicatively connected to conduit 326 leading to the inlet side of the extreme high pressure hydraulic motor CD (FIGURE 3A). The low pressure hydraulic fluid may cause some rotation of the hydraulic motor CD which is, in the first stage, under no load condition because of the overrunning clutch 160 and energized electric motor MA. The outlet side of the hydraulic motor CD is in communication with the hydraulic fluid sump XA (FIGURE 3B) through conduits 327, 328 and 329.

Returning to FIGURE 3C it will be seen that conduit 325 also communicates with conduit 330. The conduit 330 communicates with the inlet side of the hydraulic accessory drive motor BQ (FIGURE 3B) through conduit 331. The low pressure hydraulic fluid may cause some rotation of the hydraulic motor BQ which is, in the first stage, under no load condition because of the overrunning clutch 164 and energized electric motor M. The outlet side of the hydraulic motor BQ is in communication with the hydraulic fluid sump XA through conduit 329 as shown.

Referring now to FIGURE 3 it will be seen that the conduit 330 also communicates with port 22 and chamber BK$b$ of the variable displacement control accumulator BK through surge valve BP and conduit 332. Likewise the conduit 330 also communicates with port 22′ and chamber CA$b$ of the variable displacement accumulator CA through conduit 333, surge valve CC and conduit 334 as shown. However, as will be described later, in the first stage the pistons 18 and 18′ of accumulators BK and CA move leftwardly to their limit because chambers BK$a$ and CA$a$ are being charged with hydraulic fluid from the extreme high pressure hydraulic pump AH (FIGURE 3A).

The foregoing discussion indicated the flow of low pressure hydraulic fluid passing through the inlet check valve AF (FIGURE 3B) from conduits 320 and 184. The flow of low pressure hydraulic fluid through inlet check valve AG will now be described.

Low pressure hydraulic fluid from the conduit 320 is communicated to the inlet side of check valve AG through conduit 183. The outlet side of the check valve AG communicates with conduit 199 leading to the pump chamber 200 of the lower unit B of engine pump 185. From the pump chamber 200 the low pressure hydraulic fluid path communicates with port 23′ and accumulator chamber CA$c$ of the variable displacement control accumulator CA through conduit 201. However the fluid pressure being far below the operating pressure range of the spherical accumulator 20′ no fluid will enter the chamber CA$c$. Thus the fluid in conduit 201 enters the inlet side of discharge check valve BN through conduit 335. The flow of low pressure hydraulic fluid from the outlet side of discharge valve BN communicates with conduit 336 which merges with the conduit 325. The flow of low pressure hydraulic fluid in conduit 325 has been discussed previously for the first stage and thus is not repeated here.

The foregoing describes the path of travel of low pressure hydraulic fluid pumped by the hydraulic charge pump ZA (FIGURE 3B) during the first stage. A description of the extreme high pressure hydraulic system during the first stage will now be undertaken.

Extreme high pressure hydraulic fluid discharged from the extreme high pressure pump AH (FIGURE 3A) flows into conduit 337 through conduit 336 (FIGURE 3) as shown. Conduit 337 leads to port $a$ of solenoid start valve AT (FIGURE 4) which port is closed during the first stage and thus no hydraulic fluid flows therethrough. Conduit 337 also communicates with the extreme high pressure hydraulic accumulator AQ (FIGURE 3) through conduit 338 which is thus charged during the first stage operation.

Conduit 337 also communicates with port $a$ of actuated solenoid run valve AJ through connecting conduit 339 as indicated in FIGURE 4. With continued reference to FIGURE 4, the extreme high pressure hydraulic fluid entering port $a$ of the solenoid run valve AJ discharges from port $b$ thereof into conduit 340. The conduit 340 communicates with port $b$ and chamber 76 of the hydraulic ram AR which actuates the ram AR retractively as indicated in FIGURE 4. Thus the protruding stem 74 of the ram AR withdraws from abutting relation with upper lever 296 of the mechanical linkage device 270.

The conduit 337 also communicates with port $a$ of the pressure regulator AU (FIGURES 3 and 4) through connecting conduit 341. Extreme high pressure hydraulic fluid entering port $a$ of regulator AU discharges into conduit 342. The conduit 342 communicates with port 21 and chamber BK$a$ of the variable displacement accumulator BK through surge valve BZ and connecting conduit 343 as shown in FIGURE 3. The conduit 342 also communicates with port 21′ and chamber CA$a$ of variable displacement accumulator CA through connecting conduit 344, surge valve CB and connecting conduit 345 as shown. The extreme high pressure hydraulic fluid entering chambers BK$a$ and CA$a$ moves, respectively, pistons 18 and 18′ leftwardly to their limit. When the leftward limit of the strokes of pistons 18 and 18′ has been reached the hydraulic fluid pressure at port $c$ and chamber 67 of the regulator valve AU increases which now moves the land 64 leftwardly (FIGURE 4). The land 64 ultimately settles in throttling relation between port $b$ and port $e$ (port $e$ is connected to drain) and thus port $b$ may not completely close depending upon balance of oil pressure versus spring pressure. Thus hydraulic fluid throttled through port b passes into the chamber 67 through port c and is throttled out the drain port e. The drain port e of pressure regulator valve AU communicates with the hydraulic fluid sump XA in the following manner.

In FIGURE 3 the port e of regulator valve AU communicates with conduit 346. The conduit 346 in turn communicates with conduit 347 which merges with conduit 327. As previously explained the conduit 327 communicates with the hydraulic fluid sump XA (FIGURE 3B) through conduits 328 and 329. Thus it can be seen that the pressure of the hydraulic fluid in chambers BKa and CAa of the variable displacement accumulators BK and CA (FIGURE 3) will be governed by the compressive force of the compression spring 70 in the pressure regulator valve AU (FIGURE 4) and the position of accelerator pedal 271.

It will also be observed that extreme high pressure hydraulic fluid in the conduit 337 communicates with ports a, b and c of the stop valve AV (FIGURE 3C) which actuates the valve AV to the position illustrated in FIGURE 4. In actuated valve AV the chambers 253 and 254 thereof are pressurized which moves the stem 247 leftwardly to the limit provided by the skirt of piston 251. Movement of the stem 247 causes it to engage abuttingly the lower lever 299 of the mechanical control linkage device 270 whereby to shift the entire linkage 270 the pedal 271 (FIGURE 3A), upper lever 296 and lower lever 299 are moved to "idle" position indicated in FIGURE 4. The actuated stop valve AV by its stem 247 provides a stop means for preventing the mechanical control linkage device 270 from any shift toward "stop" position from the "idle" position by the operator manipulating the pedal 271 during operation of the engine pump 185.

Actuation of the stop valve AV communicates port b with port d thereof as evident from FIGURE 4. This introduces extreme high pressure hydraulic fluid into conduit 244 through conduits 350 and 351, which now energizes de-actuators 221 and 222 of fuel injectors 214 and 215, respectively. Likewise deactuator 223 is energized through connecting conduit 348 and de-actuator 224 is energized through connecting conduit 349, both being in communication with conduit 244. Thus the energized de-actuators 221, 222 permits the engagement of the plunger rollers of fuel injectors 214 and 215 with cam 230. Likewise the energized de-actuators 223, 224 permit the engagement of the plunger rollers of fuel injectors 216, 217 with cam 231. Thus the fuel injectors 214–217 are now enabled to be operated by the cams 230, 231 on shaft 159.

Extreme high pressure hydraulic fluid in conduit 350, from port d of actuated stop valve AV, communicates with port a of the thermo-compensated valve AY (FIGURE 4) but this port is closed by land 124 as the valve AY is not actuated during the first stage.

Extreme high pressure hydraulic fluid in conduit 350 is now communicated through conduit 351 to port a of the fuel injector pressure modulator AX (FIGURE 4). From port a the hydraulic fluid flows into chamber 262 through port d and pressurizes conduit 263. Conduit 264 is therefore pressurized by communication with conduit 263. Pressurized conduit 264 leads to fuel injectors 214 and 215 and fuel injectors 216 and 217 are pressurized respectively by connecting conduits 219 and 220 communicating with conduit 264. It will be recalled that hydraulic fluid pressure in conduit 244 governs the pressure of the fuel delivered by the fuel injectors 214–217 to the engine pump 185. This is accomplished as follows.

It will be recalled that there is substantially no flow of hydraulic fluid in the conduit 244 for reasons already discussed herein although some fluid movement in both directions is acknowledged as is conventionally known. Thus it is apparent that fluid pressure in chamber 262 of modulator valve AX builds up immediately which acts to move the land 257 leftwardly in throttling relation with port d. At such position it also throttles port b which port is in drain communication. The drain communication of port b of modulator valve AX is accomplished in the following manner. Port b of modulator valve AX communicates with conduit 353 through connecting conduit 352 as shown in FIGURE 3C. Conduit 353 merges with conduit 329 which latter conduit leads to the hydraulic fluid sump XA (FIGURE 3B). Thus it can be seen that the compressive force of the spring 261 (FIGURE 5) in the modulator valve AX governs the pressure in conduit 264 which in turn governs the pressure of the fuel delivered to the engine pump 185 by the fuel injectors 214–217. Thus as shown in FIGURE 4 the fuel injection pressure is at idling speed for the engine pump 185 as may be evident from the position of the stem 259, of modulator valve AX, in abutting relation with the lower lever 299 of the mechanical linkage control device 270.

As soon as the hydraulic pressure in the extreme high pressure accumulator AQ has reached the minimum value set by the low pressure cutout switch AM (FIGURE 3) the switch AM closes. Closing of the switch AM energizes to closed position the low oil pressure cutout relay switch AN (FIGURE 3A). Closing of the relay switch AN is required to enable the start button switch AZ (FIGURE 3A) to function electrically for initiating the second stage later discussed.

When the pressure of the extreme high pressure hydraulic circuit is sufficient to close the low pressure cutout switch AM, the low pressure cutout relay switch An is energized to closed position in the following manner. Current from the positive terminal 314 of the battery Z passes into conductor 369, thence through conductor 355 and the closed contacts 356 of the pressure switch AM. From the closed contacts 356 of the pressure switch AM the current flows through conductor 357 to one side of the coil 358 of relay switch AN. Current from the other side of the coil 358 flows through conductor 359 to conductor 304, thence to the negative terminal 303 of the battery Z. Thus the circuit is closed to energize relay switch AN from its normally open position to closed position. As will be evident later the relay switch AN must be energized to closed position in order to proceed with the second stage.

The control system of this invention is now ready for initiating the second stage of the starting cycle. However it should be mentioned at this point that in the event the operator delays the initiating of the second stage the pressure in the extreme high pressure hydraulic circuit may increase to the upper limit set by the high pressure switch AO (FIGURE 3). If the hydraulic pressure in the accumulator AQ rises sufficiently to close the normally open pressure switch AO the electric motor MA now driving the extreme high pressure hydraulic pump AH will be deenergized. This occurs in the following manner.

Current flows from the positive terminal 314 of the battery Z through the closed contacts 308 of the energized relay C (previously explained), thence through conductor 360 to one side of the coil 361 of the extreme high pressure pump motor relay switch AK (FIGURE 3A). From the other side of the coil 361 the current flows through conductor 362, thence through the closed contacts of the actuated pressure switch AO to conductor 304. The conductor 304 is connected to the negative terminal 303 of the battery Z and thus the circuit is closed for energizing the coil 361 of relay switch AK thereby opening the contacts 311 thereof. Opening of the contacts 311 interrupts the current flowing to the motor MA and thus the motor MA ceases to drive the extreme high pressure hydraulic pump AH.

Summarizing at the end of the first stage, as indicated in FIGURE 4, the following major changes described above in the control system of this invention from that shown in FIGURES 3, 3A, 3B and 3C are as follows:

(1) The low pressure hydraulic circuit has been pressurized.

(2) The extreme high pressure hydraulic circuit has been pressurized.

(3) The solenoid run valve AJ and stop valve AV have been actuated.

(4) The hydraulic ram AR has been actuated.

(5) The de-actuating devices 221–224 have been pressurized for engaging the fuel injectors 214–217 with cams 230 and 231 as shown.

(6) The mechanical control linkage device 270 has been shifted from "stop" position to "idle" position.

(7) Pistons 18 and 18' of accumulators BK and CA have been moved to their extreme leftward limit of stroke.

(8) Hydraulic pressure is provided to the fuel injectors 214–217 for pressurizing fuel injections.

*Second Stage*

The second stage is initiated at will by the operator upon completion of the events of the first stage by closing the start button switch AZ (FIGURE 3A). When the operator depresses button 162 of the switch AZ the contacts 363 thereof are closed. Closing of switch AZ initiates a series of events occurring in sequential relation with respect to time. Certain of these events occur in the second stage and later certain events occur which are described in the third stage, and still later further events occur which are described in the fourth stage. The events occurring in the second stage are illustrated in FIGURE 5 which result in (1) shifting the mechanical control device 270 from "idle" position to "start" position, and (2) closes the start cycle control valve BH and cocks the toggle device 149, (3) increases the hydraulic pressure to the fuel injectors 214–217 and (4) increases the hydraulic pressure in chambers BKa and CAa of accumulators BK and CA. These results are systematically accomplished as follows:

Closing of the start button switch AZ energizes the start button relay switch AZI from a normally open position to a closed position. Current from the positive terminal 314 of the battery Z flows through conductor 369, thence through conductor 370 and across closed contacts 368 of the previously energized relay switch AN. From the contacts 368 the current flows through conductor 367 to one side of the coil 365 of relay switch AZI. From the other side of the coil 365 the current flows through conductor 364 and across the now closed contacts 363 of start button switch AZ. From the contacts 363 the current flows through conductor 304 to the negative terminal 303 of the battery Z thus energizing the coil 365 of relay switch AZI to actuate it from a normally open position to closed position. Closing of the relay switch AZI now energizes the solenoid coil 371 of the solenoid start valve AT in the following manner.

Current from the positive terminal 314 of battery Z flows through conductor 369 and thence through the conductor 370 and across the closed contacts 368 of the previously actuated relay switch AN. From the contacts 368 the current flows through conductor 367 and across closed contacts 366 of the previously actuated relay switch AZI. From the contacts 366 the current flows to one side of the solenoid coil 371 of the solenoid start valve AT through conductor 372. From the other side of the solenoid coil 371 the current flows through conductor 373 and thence through conductor 304 to the negative terminal 303 of the battery Z. Thus the solenoid coil 371 is energized which actuates the solenoid start valve AT from the position shown in FIGURE 3 to the position shown in FIGURE 5. Actuation of the solenoid start valve AT admits extreme pressure hydraulic fluid to certain components for purposes now to be described.

Referring now to FIGURE 5 port a of the actuated solenoid start valve AT is opened while port c is closed. Extreme high pressure hydraulic fluid in conduit 337, previously described, enters port a of the start valve AT and discharges through port b into conduit 374. Conduit 374 communicates with port a of the start position holder ram BA. Thus the ram BA is actuated to the position shown in FIGURE 5. The stem 60 of the ram BA engages the upper lever 296 to move it in counter-clockwise direction which movement shifts the entire mechanical control linkage device 270 from "idle" position to "start" position as illustrated in FIGURE 5. It will be observed that the shift of the device 270 to "start" position also shifts the valve element of the pressure regulator AU which increases the hydraulic pressure in chambers BKa and CAa of accumulators BK and CA and, in addition, shifts the valve element of the fuel injector pressure modulator AX which increases the hydraulic pressure to the fuel injectors 214–217.

It will be observed from FIGURE 5 that extreme high pressure hydraulic fluid discharged from the actuated start valve AT into conduit 374 also communicates with port a of the shut-off valve BB through connecting conduit 375. Extreme high pressure hydraulic fluid entering port a of shut-off valve BB discharges through port b into conduit 376 which communicates with port a of sequence valve BC. The sequence valve BC will now begin to actuate slowly thus allowing an elapse of time before its porting changes (i.e. fully actuated position). When the sequence valve BC is fully actuated it initiates the third stage which will be discussed later. Meanwhile during the second stage the sequence valve BC will be presumed to be in de-actuated position since no porting changes in sequence valve BC occur during this stage.

Extreme high pressure hydraulic fluid entering port a of sequence valve BC is discharged through port b into conduit 377 which communicates with port a of drain valve BD. Extreme high pressure hydraulic fluid is discharged from the drain valve BD through port b into conduit 378 which communicates with port a of the push piston cylinder BG. Thus the cylinder BG is energized and the stem 136 thereof abuttingly engages the stem 148 of the start cycle control valve BH thereby moving it to closed position as shown in FIGURE 5. Leftward movement of the stem 148 of the start cycle control valve BH also shifts the toggle device 149 to its cocked position as shown in FIGURE 5.

At the same time the push piston cylinder BG is energized the hydraulic ram BF is actuated from the position shown in FIGURE 3 to the position shown in FIGURE 5. This is accomplished by the fact that conduit 379 is connected to pressurized conduit 378 and port a of the hydraulic ram BF. Actuation of the hydraulic ram BF expansively results in that the external end 142 of its work member 140 abuttingly engages the end of the rack member 143 (FIGURE 3) for moving it leftwardly. The leftward movement of rack member 143 rotates pinion 144 of the power piston synchronizing mechanism of the engine pump 185 which mechanism is fully described in the aforementioned copending application. It will suffice to say that when the ram BF is actuated to its fully extended position as viewed in FIGURE 5, the power pistons of the upper unit A of engine pump 185 will be at their inboard position as shown in FIGURES 3C and 9.

At the same time the push piston cylinder BG and hydraulic ram BF are actuated the hydraulic ram return valve BE is also actuated from the position shown in FIGURE 3 to the position shown in FIGURE 5. Extreme high pressure hydraulic fluid enters port a of return valve BE through conduit 380 communicatively connected to the presurized conduit 378 as shown in FIGURE 5. Thus the return valve BE is actuated from the position shown in FIGURE 3 to the position shown in FIGURE 5. Actuation of the return valve BE communicates port c with port d thereof and closes port b allowing discharge of hydraulic fluid from the spring-containing chambers of the push piston cylinder BG and hydraulic ram BF to hydraulic sump XA in the following described manner.

Hydraulic fluid discharged from port b of push piston cylinder BG and port b of hydraulic ram BF passes into connecting conduit 381. Communicatively connected to conduit 381 is conduit 382 leading to port c of actuated return valve BE as shown in FIGURE 5. The discharge fluid passes from port c of return valve BE through port d into conduit 383 (FIGURE 3), thence into conduit 384. From conduit 384 the discharge fluid passes into conduit 347 which communicates with conduit 327. From conduit 327 the discharge fluid passes into conduit 328 (FIGURE 3A), thence into conduit 329 to the hydraulic fluid sump XA (FIGURE 3B). Thus the port d of return valve BE, in communication with sump XA, drains the hydraulic fluid in the spring-chambers of push piston cylinder BG and hydraulic ram BF during actuation thereof.

Summarizing, during the second stage the power pistons of the upper unit A of the engine pump 185 have been moved to their extreme inboard position by the actuation of the ram BF; the start cycle control valve BH is closed and the toggle device 149 is moved to cocked position; the hydraulic pressure in chambers BKa and CAa of accumulators BK and CA has been increased; the hydraulic pressure to the fuel injectors 214–217 has been increased; and the mechanical control linkage mechanism 270 has been shifted from "idle" position to "start" position. Now at this time the valve element of sequence valve BC will have moved sufficiently to effect changes in its porting communications in the manner previously described. Thus the sequence valve BC becomes actuated which initiates the third stage now to be described.

Third Stage

FIGURE 6 illustrates the changes occurring in the third stage which stage is initiated when the sequence valve BC is actuated from the position shown in FIGURE 5 to the position shown in FIGURE 6. During the third stage the push piston cylinder BG and hydraulic ram BF are first retracted. Also the spherical chamber BKc of accumulator BK is charged with extreme high pressure hydraulic fluid. Thereafter the chamber BKc is suddenly communicated with the pump chamber 197 (FIGURE 3) of the upper unit A of engine pump 185. The charge of extreme high pressure hydraulic fluid to the pump chamber 197 drives the pump pistons 192 and 193 (FIGURE 9) outboardly which moves the associated power pistons 188 and 189 outboardly on compression stroke whereby they fire on compression-ignition thereby starting the engine pump 185. These movements are accomplished as follows.

When the sequence valve BC is fully actuated as shown in FIGURE 6, port d is opened and communicates with extreme high pressure hydraulic fluid entering port a as previously described. Extreme high pressure hydraulic fluid now discharges into conduit 384 through port d of sequence valve BC which conduit 384 communicates with port c of drain valve BD through connecting conduit 385, thus actuating the drain valve BD from the position shown in FIGURE 5 to the position shown in FIGURE 6. Actuation of the drain valve BD closes port a thereof which terminates flow of extreme high pressure hydraulic fluid therethrough and simultaneously communicates port b with the drain port d. This permits retraction or de-actuation of push piston cylinder BG and hydraulic ram BF as follows.

Hydraulic fluid discharges from port a of push piston cylinder BG into conduit 378 as shown in FIGURE 6. Likewise hydraulic fluid is also discharged from port a of hydraulic ram BF into conduit 378 through connecting conduit 379. From conduit 378 the discharge fluid passes into port b and discharges through port d of drain valve BD into conduit 386 through the connecting conduit 387. From conduit 386 the discharge fluid communicates with conduit 347 which conduit 347 is in communication with the hydraulic sump XA (FIGURE 3B) as previously explained. Thus the push piston cylinder BG and hydraulic ram BF are de-actuated and retract under urging of their respective compression springs 137 and 141.

Extreme high pressure hydraulic fluid now in conduit 384 communicates with open port b of now de-actuated return valve BE (FIGURE 6). Extreme high pressure hydraulic fluid entering port b is discharged through port c of return valve BE into conduit 382. The conduit 382 communicates with ports b of the push piston cylinder BG and ram BF through connecting conduit 381. Thus the spring chambers of the push piston cylinder BG and ram BF are pressurized which serves to hasten their retraction to de-actuated position and also to make certain that both are completely retracted.

Since the conduit 378 is now in drain communication (i.e. in communication with sump XA of FIGURE 3B) the return valve BE is de-actuated (FIGURE 6), the port a thereof communicates with conduit 378 through connecting conduit 380. Thus the return valve BE is de-actuated from the position shown in FIGURE 5 to the position shown in FIGURES 3 and 6. De-actuation of the return valve BE is necessary to pressurize conduit 382 from conduit 384 for energizing the push piston cylinder BG and ram BF retractively in the manner just described.

Extreme high pressure hydraulic fluid entering port a of actuated sequence valve BC also discharges through port f thereof into conduit 388 as shown in FIGURE 6. Since port c of actuated sequence valve BC is now closed, extreme high pressure hydraulic fluid in conduit 388 passes through open port a of deactuated lock valve BJ and discharges through port b thereof into conduit 389 as shown in FIGURE 6. Extreme high pressure hydraulic fluid in conduit 389 communicates with port d of thermo-compensated valve AY. However at this time the thermo-compensated valve AY will not have been actuated and thus will be in the position illustrated in FIGURES 3 and 4. Since the valve AY is still deactuated, extreme high pressure hydraulic fluid entering port d thereof can discharge only through port e thereof. Extreme high pressure hydraulic fluid from port e of the valve AY passes into conduit 390 which conduit leads to port 23 of the expandable spherically shaped accumulator dome 20 of the accumulator BK (FIGURE 3) and into the chamber BKc thereof.

At this point it will be recalled that the pistons 18 and 19 of accumulator BK as well as pistons 18' and 19' of accumulator CA are in their extreme leftward position as viewed in dotted lines of FIGURE 3. Thus the hydraulic fluid volume capacity of the chambers BKc and CAc are now at minimum volume. The chamber BKc is now charged with extreme high pressure hydraulic fluid and when the sphere 20 is fully charged the back pressure in conduits 389 and 390 rises to the point sufficiently high to actuate the thermo-compensated valve AY in the following manner.

Ports b and c of the thermo-compensated valve AY communicate with conduit 391 which conduit communicates with conduit 389 through connecting conduit 392 as shown in FIGURE 6. Extreme high pressure hydraulic fluid entering port b of the valve AY hydraulically acts on the small land 121. As soon as the valve element of the valve AY has moved sufficiently to close port j and open port c thereof, the chamber 133 will be pressurized with extreme high pressure hydraulic fluid. Fluid pressure in the chamber 133 hydraulically acts on large land 122 thereby rapidly shifting the valve element of valve AY to its actuated position shown in FIGURE 6.

The sudden completion of the actuation of the thermo-compensated valve AY as above explained effects communication of extreme high pressure hydraulic fluid in the charged spherical chamber BKc of accumulator BK with the pump chamber 197 of the upper unit A of the engine pump 185 through ports e and f of valve AY and conduit 193. The surge of extreme high pressure hydraulic fluid into the pump chamber 197 hydraulically acts on the associated pump pistons 192, 193 moving them from the inboard position shown in FIGURES 3 and 6 toward the outboard position indicated in FIGURE 7. Thus the power pistons of upper unit A of the engine pump 185 are moving outboardly on fuel-air compression stroke. In other words the impulse for starting the engine pump 185 is now being delivered. When the power pistons of upper unit A reach outboard position, firing by compression-ignition occurs which drives the power pistons inboardly on power stroke. The power pistons of lower unit B of the engine pump 185 move outboardly on fuel-air compression stroke during the power stroke of the power pistons of unit A. The engine pump 185 thus is in running operation as explained in the aforesaid co-pending operation.

Returning now to the actuated thermo-compensated valve AY as shown in FIGURE 6 it will be seen that port a now communicates with port g thereof. Port a of the valve AY is connected to conduit 359 which conduit is charged with extreme high pressure hydraulic fluid from the actuated stop valve AV as previously explained. Extreme high pressure hydraulic fluid from port a of actuated valve AY discharges through port g thereof into conduit 392 which conduit communicates with open port a of de-actuated sequence valve BO. The valve element of the sequence valve BO now beings to move rightwardly as viewed in FIGURE 6. When the sequence valve BO is fully actuated (i.e. when porting changes occur) the fourth stage is initiated which will be discussed later. Thus during the third stage the effect of the sequence valve BO is as though it was completely de-actuated as a delayed time elapse occurs before it actuates to shift its porting communications. During this time elapse the remainder of the third stage is completed.

Extreme high pressure hydraulic fluid from port g of valve AY to port a of sequence valve BO through conduit 392 is now communicated through port b to conduit 393. Conduit 393 leads to closed port d of de-actuated lock valve BJ. The conduit 393 also communicates with port c and chamber 105 of de-actuated lock valve BJ through connecting conduit 394 which pressurizes chamber 105. Pressurizing the chamber 105 thus actuates the lock valve BJ from the position shown in FIGURE 6 to the position shown in FIGURE 7.

Actuation of the lock valve BJ disconnects the source of extreme high pressure hydraulic fluid to port b from port a and immediately connects port b with the extreme high pressure hydraulic fluid from the now open port d as shown in FIGURE 7. Extreme high pressure hydraulic fluid is thus maintained in conduit 389 which in turn maintains the thermo-compensated valve AY in actuated position. In other words the actuation of the thermo-compensated valve AY is no longer maintained by extreme high pressure hydraulic fluid feeding through the actuated solenoid start valve AT (FIGURE 3) but instead the valve AY is maintained in actuated position by extreme high pressure hydraulic fluid from the actuated stop valve AV (FIGURE 3C).

The time elapse for changing the porting communications of sequence valve BO is now about to expire. Thus the sequence valve BO actuates to its fully actuated position which initiates the fourth stage.

*Fourth Stage*

When the starting impulse is delivered to the upper unit A of the engine pump 185 the power pistons of unit A move outboardly on fuel-air compression stroke as above explained, firing by compression-ignition occurs. At this point the lobe 158 of cam 157 (FIGURES 3 and 7) trips the toggle device 149 to its de-actuated position which opens the start cycle control valve BH. At this point it is mentioned that in the event initial firing of the upper unit A of engine pump 185 does not move cam 157 sufficiently to trip the toggle device 149 no harm results for the fluid in pump chamber 197 of unit A merely oscillates to and from the spherical chamber BKc of accumulator BK as the pump pistons 192 and 193 reciprocate. Normally the toggle device will be tripped for opening the start cycle control valve BH either on the first or second firing of the upper unit A of the engine pump 185.

Referring to FIGURE 7 the actuated sequence valve BO opens port c thereof which now discharges extreme high pressure hydraulic fluid from port a to port c thereof and into conduit 395. Conduit 395 leads to port c of shut-off valve BB thus actuating the shut-off valve BB from the position shown in FIGURE 3 to the position shown in FIGURE 7. Extreme high pressure hydraulic fluid flowing from actuated solenoid start valve AT through conduits 374 and 375 to port a of shut-off valve BB is terminated as port a of the shut-off valve is now closed.

Port b of actuated shut-off valve BB now communicates with port e thereof. Port e of shut-off valve BB is connected to conduit 386 which communicates with hydraulic sump XA (FIGURE 3B) by way of conduits 347, 327, 328 and 329 as previously explained. From this it is apparent that conduit 376 connected to port b of shut-off valve BB is now in drain communication with sump XA.

Since conduit 376 is connected to port a of sequence valve BC which now drains it, and thus the sequence valve BC de-actuates to the position shown in FIGURE 7. However, since the valve element of sequence valve BC moves slowly fluid drains from port c of drain valve BD into conduit 376 through conduits 385 and 384 into the still open port d of sequence valve BC and out through port a thereof into conduit 376 which latter conduit now communicates with sump XA as previously explained. Thus the drain valve BD is de-actuated. De-actuation of drain valve BD has no effect at this time because all of its ports are now in communication with sump XA as previously explained.

After de-actuation of drain valve BD the sequence valve BC becomes de-actuated thereby closing its ports d and f and opens communication of port c with port e. Port e of sequence valve BC is in communication with sump XA through conduits 396, 347, 327, 328 and 329. Port c of deactuated sequence valve BC now in communication with drain port e thereof which communicates conduit 388 with drain (sump XA). Conduit 388 is in comunication with port a of actuated lock valve BJ which port is not in communication with any other port thereof.

*Fifth Stage*

The engine pump 185 is now running and the operator may now release the start button switch AZ (FIGURE 3A) thereby opening the electric circuit to the solenoid start button relay AZI (FIGURE 3A). De-energizing of start button relay AZI opens the circuit to the solenoid start valve AT and thus the solenoid start valve AT is deactuated as shown in FIGURE 8.

De-actuation of solenoid start valve AT at this time has only one effect, namely, it permits de-actuation of the start position holder ram BA as indicated in FIGURE 8. This is accomplished as follows.

When the solenoid start valve AT is de-actuated its port a is closed which terminates flow of extreme high pressure hydraulic fluid therethrough. Simultaneously port c is opened to communication with port b thereof. Port c of start valve AT is in drain communication with sump XA through conduits 386, 347, 327, 328 and 329.

Port *b* of start valve AT communicates with port *a* of start position holder ram BA through conduit 374. Thus the ram BA retracts to its de-actuated position shown in FIGURES 3 and 8. Deactuation of the ram BA now permits the operator to shift at will the mechanical linkage control device 270 between "idle" position and "maximum power" position. In the event the engine pump 185 fails to start the operator merely releases the start button switch AZ and waits a few seconds until the sequence valves BC and BO return to their deactuated position shown in FIGURE 3. He then repeats beginning with the second stage.

*Engine Pump Running*

The running engine pump 185 now pumps high pressure hydraulic fluid into the high pressure accumulator AI (FIGURE 3C) as follows.

When the power pistons of the upper unit A of the engine pump 185 moves outboardly the pump chamber 197 draws (intake) hydraulic fluid from the low pressure accumulator AE (FIGURE 3B) through conduits 320 and 184; thence through inlet check valve AF and conduit 196. Subsequently when the power pistons of the upper unit A move inboardly on power stroke, reverse flow of hydraulic fluid in conduit 196 does not occur because of inlet check valve AF. Hydraulic fluid in the pump chamber 197 discharges under high pressure from the pump chamber 197 through conduits 198 and 322; thence through the open start cycle control valve BH and conduit 323; thence through the discharge valve BI, conduits 324 and 325 and into the high pressure accumulator AI (FIGURE 3C).

In a similar manner as above stated when the power pistons of the lower unit B of the engine pump 185 move outboardly the pump chamber 200 draws (intake) hydraulic fluid from the low pressure accumulator AE (FIGURE 3B) through conduits 320 and 183; thence through inlet check valve AG and conduit 199. Subsequently when the power pistons of the lower unit B move inboardly on power stroke, reverse flow in conduit 199 does not occur because of inlet check valve AG. Hydraulic fluid in the pump chamber 200 discharges under high pressure through conduit 201, thence through discharge valve BN, conduits 336 and 325 into the high pressure accumulator AI.

From the above it can be seen that both units A and B charge the high pressure accumulator AI. However at the same time the upper unit A of the engine pump 185 charges the chamber BKc of the expandable spherically shaped dome 20 of the accumulator BK. The conduit 198 leading from the pump chamber 197 of the upper unit A also communicates with conduit 390 through open ports *f* and *e* of the actuated thermo-compensated valve AY, and conduit 390 communicates with port 23 of the expandable spherically shaped dome 20 of the accumulator BK as seen best in FIGURES 3 and 7. Similarly the pump chamber 200 of the lower unit B of the engine pump 185 communicates with port 23' of the expandable dome 20' of accumulator CA through conduit 201. Thus chamber BKc of accumulator BK is in communication with pump chamber 197 of the upper unit A and the chamber CAc of the accumulator CA is in communication with the pump chamber 200 of the lower unit B.

Now when the hydraulic pressure in the high pressure accumulator AI (FIGURE 3C) reaches the high pressure level (e.g. 5000 p.s.i.) the back pressure on the discharge valves BI and BN (FIGURE 3C) prevents them from opening. The hydraulic fluid in the pump chamber 197 of the upper unit A oscillates to and from chamber BKc of accumulator BK and fluid in the pump chamber 200 of the lower unit B oscillates to and from chamber CAc of accumulator CA. The hydraulic fluid, such as the well known automatic transmission fluid SAE type A (Society of Automotive Engineers) having a viscosity of about SAE 10, will compress to about 97.5% of its normal volume when subjected to a pressure of 5000 p.s.i. (high pressure level). Thus the compressibility of the hydraulic fluid and the expansibility of domes 20 and 20' of accumulators BK and CA permits the oscillation of hydraulic fluid when the high pressure accumulator AI is fully charged. This feature is of particular importance for when the high pressure accumulator AI is fully charged the fuel consumption of the engine pump 185 will be low. This is primarily due to the fact that the pump chambers 197 and 200 are pressurized and thus assist the compression stroke of the power pistons which serve to lower the fuel requirement. In other words in such condition the engine pump 185 is performing no work except overcoming friction. It is mentioned here that until the fluid pressure in the high pressure accumulator AI approaches the high pressure level there is by reason of their construction proportional expansion of the domes 20 and 20' of the accumulators BK and CA depending on pressure, and volume of fluid determined by the position of pistons 19 and 19'.

High pressure fluid from the accumulator AI is communicatively connected to the hydraulic motor CD (FIGURE 3A) for driving the extreme high pressure hydraulic pump AH and the hydraulic motor BQ (FIGURE 3B) for driving the engine accessories in the following manner.

Hydraulic fluid from the high pressure accumulator AI (FIGURE 3C) flows through conduits 325, 330 and 331 to the inlet side of hydraulic motor BQ (FIGURE 3B). The energized hydraulic motor BQ now overtakes the overrunning clutch 164 thus driving the engine accessories. The discharge fluid from the hydraulic motor BQ flows into the sump XA through conduit 329.

Hydraulic fluid from the high pressure accumulator AI also flows through conduits 325 and 326 to the inlet side of hydraulic motor CD (FIGURE 3A). The energized hydraulic motor CD overtakes the overrunning clutch 160 (FIGURE 3A) thus driving the extreme high pressure hydraulic pump AH. The discharge fluid from the hydraulic motor CD flows to the hydraulic fluid sump XA through conduits 327, 328 and 329.

Energizing of hydraulic motor BQ also drives the generator G (FIGURE 3B). The generator G now energizes coil 397 of the generator output relay switch X (FIGURE 3A) thereby actuating it to open contacts BU and close contacts BS thereof. This is accomplished in the following manner.

Current from one side of the generator G flows through conductor 398 to one side of coil 397 of relay switch X and also to one side of coil 399 of relay switch CE. The other side of coil 397 of relay switch X is connected to the other side of the generator G through conductors 400, 313, 304 and 401. The other side of the coil 399 of relay switch CE is connected to the other side of the generator G through conductors 304 and 401. Energizing of coil 399 of relay switch CE actuates it to open its contacts 309 which interrupts the electric circuit to the electric motor MA which now deenergizes the motor MA. Energizing of the coil 397 of relay switch X actuates it to open its normally closed contacts BU which interrupts the electric circuit to the electric motor M (FIGURE 3B) and thus de-energizes it. From this it can be seen that the hydraulic motor CD now assumes the load formerly carried by the electric motor MA and hydraulic motor BQ assumes the load previously carried by the electric motor M.

Actuation of relay switch X also closes its contacts BS which connects the generator G to the battery Z in series relation with the conventional voltage regulator BT (FIGURE 3A) in the following manner.

One side of the generator G is connected to the positive terminal 314 of battery Z through conductor 398, across the closed contacts BS of actuated relay X, voltage regulator BT, and conductor 369. The other side of the generator G is connected to the negative terminal 303 of battery Z through conductors 401 and 304. Thus the generator G is now in charge relation with the battery Z.

The engine pump 185 and the control system is now in full running operation. The operator may now utilize the hydraulic pressure from the high pressure accumulator AI to operate the work load 265 such as one or more hydraulic motors 266 (FIGURE 3C) for propelling the vehicle or operate the vehicle accessories (e.g. bulldozer blade) by one or more hydraulic rams 268. The operation of an example work load such as hydraulic motors 266 will now be described in relation to the control system of this invention.

*Engine Pump Running Under Load*

The operator shifts the conventional hydraulic valve 267 (FIGURE 3C) for communicating fluid under pressure from the high pressure accumulator AI to the hydraulic motor 266. High pressure hydraulic fluid from accumulator AI flows through conduits 325, 330, 331 and 402 into the inlet side of the open valve 267. From the discharge side of the valve 267 the hydraulic fluid enters the hydraulic motor 266 through the conduit 403 thus energizing the motor 266. Hydraulic fluid discharged from the motor 266 flows into the valve 267 through conduit 404. The discharge fluid flowing through the open valve 267 communicates with the low pressure accumulator AE (FIGURE 3B) through conduits 405, 182 and 320. The flow of fluid from the low pressure accumulator AE through engine pump 185 to the high pressure accumulator AI has been previously described. From this it can be seen that the working pressure is the pressure differential between the high pressure in accumulator AI and the low pressure in the accumulator AE. In the example previously indicated in the present case the working pressure differential is about 4900 p.s.i.

Now if the engine pump 185 is operating at reduced or idling speed and the hydraulic pressure in the accumulator AI is at high pressure level the pistons 18 and 19 of accumulator BK (FIGURE 3) as well as pistons 18' and 19' of accumulator CA will slowly move rightwardly or retractively until fully retracted. This is accomplished as follows:

The spherical domes 20 and 20' of accumulators BK and CA will be charged with hydraulic fluid at the high pressure level for they are in communication with pump chambers 197 and 200, respectively, as previously explained. The chamber BK*b* of accumulator BK is in communication with the high pressure accumulator AI through conduits 325, 330, surge valve BP and conduit 332. Thus the chamber BK*b* is charged with high pressure hydraulic fluid from accumulator AI. Likewise the chamber CA*b* of accumulator CA is in communication with the high pressure accumulator AI through conduits 325, 330, 333, surge valve CC and conduit 334. Thus chamber CA*b* is also charged with high pressure hydraulic fluid from accumulator AI. Now since the engine pump 185 is operating at low or idling speed the hydraulic fluid pressure in chamber BK*a* will be lower than the high pressure level in chambers BK*c* and BK*b* and thus the pistons 18 and 19 retract thereby increasing the fluid volume in the chamber BK*c*. This retractive movement of pistons 18 and 19 is brought about by reducing the fluid pressure in chamber BK*a* in the following manner.

When the engine pump 185 is at reduced or idling speed the upper lever 296 (FIGURE 3) of the mechanical linkage control device 270 permits expansive movement of abutting stem 69 (FIGURE 4) of the pressure regulator AU (FIGURE 3) in an expansive direction. This expansive movement of the stem 69 relaxes the compression spring 70 in the pressure regulator AU thereby correspondingly reducing the fluid pressure required in the chamber 67 for establishing throttle relation between ports *b* and *e* thereof. Reduction of required pressure in chamber 67 correspondingly reduces the pressure in conduit 342 which conduit communicates with chamber BK*a* through surge valve BZ and connecting conduit 343. Thus as the pistons 18 and 19 retracts fluid in the chamber BK*a* is discharged to the sump XA (FIGURE 3B) through conduit 343, surge valve BZ, conduit 342, port *c* of regulator AU, chamber 67 and drain port *e* of regulator AU, conduits 346, 347, 327, 328, and 329. The pistons 18' and 19' of accumulator CA will retract simultaneous with that of pistons 18 and 19 of accumulator BK as chamber CA*a* also communicates with conduit 342 through conduit 345, surge valve CB and conduit 344. The purpose of the surge valves BP, BZ, CB and CC is to prevent chattering or rapid movement of the pistons 18, 19, 18' and 19'.

Now suppose the volumetric demand for high pressure hydraulic fluid is increased such as when the operator desires to increase rapidly the speed of the vehicle. Similar as in the case of vehicles powered by conventional internal combustion engines, the operator suddenly depresses the pedal 271 to its limit thus shifting the mechanical linkage control device 270 to "maximum power" position as indicated in the drawings. Several changes in the control system of this invention take place immediately which changes are individually described below.

First the stem 69 (FIGURE 4) of the pressure regulator AU is retracted by counterclockwise movement of the abutting upper lever 296 of the mechanical control linkage device 270. Retractive movement of the stem 69 compresses the spring 70 in the regulator AU which immediately moves the land 64 to close port *e* and open port *b* thereof. Extreme high pressure hydraulic fluid at port *a* of the regulator AU discharges through port *b* into conduit 342 which conduit is in communication with chambers BK*a* and CA*a* of accumulator BK and CA. Extreme high pressure hydraulic fluid in chambers BK*a* and CA*a* act on pistons 18 and 18', respectively, thereby moving them expansibly. Expansive movement of pistons 18 and 18' moves pistons 19 and 19' into domes 20 and 20' respectively thus decreasing the fluid volume capacities of chambers BK*b*, BK*c*, CA*b* and CA*c* and the displacement of fluid therefrom is directed to the high pressure accumulator AI. The displaced fluid is thus made available to the work load 265 immediately to meet temporarily the increased demand while the engine pump 185 is accelerating its speed. Fluid displacement from each of the above mentioned four chambers in accumulators BK and CA is accomplished as follows.

Fluid displaced from the chamber BK*c* discharges at high pressure to the high pressure accumulator AI through conduit 390 into port *e* of actuated thermo-compensated valve AY and out port *f* thereof into conduit 198, thence through conduit 322, open start cycle control valve BH, conduit 323, discharge valve BI, conduits 324 and 325 to accumulator AI or work load 265 therefrom.

Fluid displaced from chamber BK*b* discharges at high pressure through conduit 332, surge valve BP, conduits 330 and 325 or work load 265 therefrom.

Fluid discharged at high pressure from chamber CA*c* flows through conduits 201 and 335, discharge valve BN, conduits 336 and 325 to accumulator AI or work load 265 therefrom.

Fluid discharged at high pressure from chamber CA*b* flows through conduit 334, surge valve CC, conduits 333, 330 and 325 to accumulator AI or work load 265 therefrom.

The shifting of the mechanical linkage control device 270 to maximum power position moves the rod 279 thereof in a rightward direction as viewed in FIGURE 3C which rotates the rock arms 282 and 283 clockwise. Clockwise movement of the rock arms 282 and 283 moves the throttle control rods 289 and 291 of the fuel injectors 214–217 downwardly which increases the rate of fuel injected into the engine pump 185 in the manner previously described. At the same time the lower lever 299 of the mechanical linkage control device 270 (FIGURE 3C) is moved counterclockwise. The counterclockwise movement of the lower lever 299 moves the abutting stem 259 of the fuel injector pressure modulator AX in a retractive direction. Retractive movement of the stem 259 causes the modulator AX to increase the hydraulic pressure to the fuel injectors 214–217 in the manner previously described which serves to increase the pressure of the fuel injected into the engine pump 185. Thus the increased fuel rate at increased injection pressure above described accelerates the engine pump 185 thereby increasing its volumetric output of hydraulic fluid at the high pressure level.

From the foregoing it can be seen that the operator may at will vary the power output of the engine pump 185 by merely operating the foot pedal 271 of the control system of this invention. It will be noted however that during operation of the running engine pump 185 the operator can shift the pedal 271 only between "idle" position and "maximum power" position. This is because the lower lever 299 (FIGURE 3C) abuttingly engages the stem 247 of the actuated stop valve AV when the lever 299 is in "idle" position. Thus the stem 247 of actuated stop valve AV serves as a stop means for the mechanical linkage control device 270 so that during operation of the engine pump 185 the device 270 cannot be shifted by the operator to a position between "idle" position and "stop" position. The procedure and sequence of events occurring in the control system of this invention when the engine pump 185 is stopped by the operator will now be described.

*Stopping the Engine Pump*

When the operator desires to stop the engine pump 185 he needs only to turn the start key switch Y to "off" position whereby the electrical contacts 305 thereof are electrically opened. Opening of the contacts 305 of the key switch Y electrically opens the circuit to coil 302 of the normally open start key relay C thereby de-energizing the coil 302. The de-energized start key relay C de-actuates it to its normally open position thus opening the contacts 308 thereof. Opening of contacts 308 of the start key relay switch C opens the circuit to the coil 315 of the solenoid run valve AJ (FIGURE 3) thereby de-energizing it. De-energizing of the solenoid run valve AJ causes it to de-actuate to the position shown in FIGURE 3.

When the solenoid run valve AJ de-actuates port *a* thereof is closed which terminates the flow of extreme high pressure hydraulic fluid from conduit 339 therethrough. De-actuation of the run valve AJ communicates port *b* with drain port *c* thereof. This permits de-actuation of the stop actuator ram AR as port *b* thereof is now in communication with sump XA through conduit 340, port *b* to port *c* of run valve AJ, conduits 406, 347, 327, 328 and 329. Thus the stop actuator ram AR is de-actuated and its piston 73 and work member 74 (FIGURE 4) move expansively to the position shown in FIGURE 3. At this point it will be recalled from the previous description thereof, the compression spring 75 in the stop actuator ram AR is large and strong as compared with compression springs in the other hydraulic valves and rams of the control system.

De-actuation of the stop actuator ram AR results in the abutting engagement of its work member 74 with the upper lever 296 of the mechanical control linkage device 270 and by the urging of the strong spring 75 forcibly moves the upper lever 296 clockwise thus forcing the entire device 270 into "stop" position shown in FIGURE 3. The force applied by the stop actuator ram AR to the upper lever 296 such that the lower lever 299 (FIGURE 3C) forcibly deactuates the stop valve AV despite the resistance of the extreme high pressure hydraulic fluid tending to maintain it actuated. Thus the stop valve AV is forcibly de-actuated to the position illustrated in FIGURE 3C.

Forcible de-actuation of the stop valve AV closes ports *a* and *b* thereof which terminates flow of extreme high pressure hydraulic fluid therethrough. At the same time port *e* is opened to communication with drain port *f* of the stop valve AV. This permits de-actuation of the de-actuating devices 221–224 which retracts the plungers of the fuel injectors 214–217 from the cams 230–231 (FIGURE 3C). Thus the fuel injector 214–217 cease to operate and fuel supply to the engine pump 185 terminates. Since no further fuel is supplied to the engine pump 185 it obviously stops. Also the forcible de-actuation of the stop valve AV terminates hydraulic fluid pressure to the fuel injector pressure modulator AX (FIGURE 3C) and hydraulic fluid pressure to the fuel injectors 214–217. These changes occur in the following manner.

Fuel injector de-actuating devices 221 and 222 both communicate with conduit 244 and de-actuators 223 and 224 both communicate with conduit 244 through conduits 348 and 349 respectively. Conduit 244 communicates with conduit 350 through a portion of conduit 351. Conduit 350 communicates with open port *e* of de-actuated stop valve AV and hydraulic fluid therefrom discharges through port *f* thereof into conduit 353. Conduit 353 communicates with conduit 329 leading directly to the sump XA. Thus the chamber 245 (FIGURE 10) of each of the de-actuating devices 221–224 are now in communication with sump XA which permits the spring 243 of each de-actuator device 221–224 to expand thus de-actuating the fuel injectors 214–217 by completing dis-engagement from cams 230 and 231.

At the same time hydraulic fluid pressure conduit 264 in communication with the fuel injectors 214–217 is also discharged into sump XA through conduit 263, port *c*, chamber 262, port *d* and port *a* of the fuel injector pressure modulator AX, conduit 351, port *e*, port *f* of de-actuated stop valve AV, conduit 353 and 329 to sump XA. Thus hydraulic pressure for governing the fuel injection pressure at the fuel injectors 214–217 is terminated by drain communication.

It was seen from the foregoing description that when the stop valve AV is in de-actuated position the conduit 350 is in communication with the sump XA as explained. The conduit 350 also leads to port *a* of actuated thermo-compensated valve AY (FIGURE 3). Thus port *a* of actuated thermo-compensated valve AY is now in communication with sump XA. Since the sequence valve BO is still actuated both the lock valve BJ and shut-off valve BB (FIGURE 3) will immediately de-actuate in the following manner.

Fluid in chamber 83 (FIGURE 5) of shut-off valve BB flows out port *c* of shut-off valve BB into conduit 395 (FIGURE 7) which communicates with open port *c* of the still actuated sequence valve BO. Port *c* of sequence valve BO is still in communication with port *a* thereof. Port *a* of sequence valve BO communicates with port *g* of actuated thermo-compensated valve AY through conduit 392 which communicates with port *a* thereof and port *a* as above explained is now in communication with the sump XA. De-actuation of the shut-off valve BB at this time has no effect because all of its ports except port *c* were in communication with sump XA as previously explained.

De-actuation of the lock valve BJ (FIGURE 6 and FIGURE 7) occurs because fluid is now drained from chambers 104 and 105. Fluid from chamber 104 temporarily passes through port *d* thereof into conduit 393. Chamber 105 also discharges into conduit 393 through connecting conduit 394. Discharge fluid in conduit 393 flows through open port *b* of sequence valve BO and thence through open port *a* thereof into conduit 392. Conduit 392 communicates with port *g* of actuated thermo-compensated valve AY and thence to port *a* of valve AY which port *a* is in communication with sump XA as above explained. When the lock valve BJ (FIGURE 6) is thus deactuated the chamber 104 thereof communicates with now open drain port *e*. The drain port *e* of the lock valve BJ communicates (FIGURE 3) with sump XA through conduits 407, 347, 327, 328 and 329.

When the lock valve BJ is deactuated it permits deactuation of the thermo-compensated valve AY. Fluid from the actuating chambers of the valve AY (FIGURE 6) discharges into conduit 391 through ports *b* and *c* thereof. Discharge fluid in the conduit 391 flows into conduit 389 through connecting conduit 392. The discharge fluid flows from conduit 389 through ports *b* and *a* of deactuated lock valve BJ into conduit 388. From conduit 388 the discharge fluid flows through open port *c* of the previously deactuated sequence valve BC. From port *c* the fluid flows through port *e* of sequence valve BC, thence into conduit 396. Conduit 396 is in communication with sump XA through conduits 347, 327, 328 and 329. Thus the thermo-compensated valve AY is now deactuated.

Deactuation of the thermo-compensated valve AY terminates hydraulic fluid communication between the pump chamber 197 of the upper unit A of the engine pump 185 from the chamber BK*c* of accumulator BK. Simultaneously the chamber BK*c* is communicated with sump XA through conduit 390, port *e* to port *d* of the deactuated valve AY, conduit 389, port *b* to port *a* of deactuated lock valve BJ, conduit 388, port *c* to port *e* of deactuated sequence valve BC, conduits 396, 347, 327, 328 and 329. Thus the chamber BK*c* of accumulator BK is in drain communication with sump XA.

When the engine pump 185 is stopped, hydraulic pressure in the high pressure accumulator AI is discharged to the sump XA by two routes. First it continues to energize the hydraulic motor BQ thereby driving the engine pump's accessories until exhausted. Second, it continues to energize the extreme high pressure pump hydraulic motor CD. The discharge fluid from both motors BQ and CD returns to the sump XA. Thus when the high pressure accumulator AI is exhausted both motors BQ and CD will stop. The low pressure accumulator AE (FIGURE 3B) also discharges itself to the sump XA through conduits 320, 182 and 408 (FIGURE 3C), through check valve CH (FIGURE 3) conduit 409 which communicates with conduit 390. As previously explained the chamber BK*c* is now in drain communication through conduit 390. Thus the low pressure accumulator AE is drained to the sump XA. It is also pointed out that after the high pressure accumulator AI is drained the low pressure accumulator AE may then drain through inlet check valves AF and AG, through pump chambers 197 and 200 of engine pump 185, and through discharge valves BI and BN to the high pressure accumulator AI which is drained as previously explained.

When the engine pump 185 is stopped the extreme high pressure hydraulic circuit does not drain but remains trapped and thus, except for leakage, the accumulator AQ remains charged with extreme high pressure hydraulic fluid. The fluid from accumulator AQ cannot escape through the deactuated start valve AT because the port *a* thereof is closed. Similarly it cannot escape through the deactuated run valve AJ because port *a* thereof is also closed. Likewise the fluid cannot discharge through conduit 337 leading to the previously described forcibly deactuated stop valve AV for there are no open flow ports in the deactuated valve VA in communication with conduit 337. A limited amount of fluid from the extreme high pressure accumulator AQ will flow into chambers BK*a* and CA*a* of accumulators BK and CA which drives the pistons 18 and 18′ to their leftward limit as viewed in dotted lines of FIGURE 3. Since the other chambers of accumulators BK and CA are now in drain connection with the sump XA little pressure in chambers BK*a* and CA*a* is required to drive the pistons 18 and 18′ to their respective leftward limit. The chambers BK*a* and CA*a* are pressurized from the extreme high pressure accumulator AQ through conduits 338, 337 and 341, through pressure regulator AU, conduit 342 to surge valve BZ and to surge valve CB through connecting conduit 344. Surge valve BZ communicates with chamber BK*a* through conduit 343 and surge valve CB communicates with chamber CA*a* through conduit 345. Obviously when the pistons 18 and 18′ of accumulators BK and CA reach their leftward or expanded limit no additional hydraulic fluid is discharged from the accumulator AQ therethrough.

However the amout of extreme high pressure hydraulic fluid from the accumulator AQ expended to chamber BK*a* and CA*a* as explained above is at least partly offset by the fact that the hydraulic motor CD continues to drive the extreme pressure hydraulic pump AH for a period of time, after the engine pump 185 is stopped, when the high pressure accumulator AI is exhausting its charge which was also explained previously.

Ultimately when the hydraulic motor CD stops because of lack of energizing pressure from the exhausted high pressure accumulator AI, extreme high pressure hydraulic fluid in accumulator AQ cannot discharge through conduits 338 and 337 into conduit 336 (FIGURE 3) leading to the output side of the extreme high pressure pump AH (FIGURE 3A) for driving the pump AH in reverse direction as a motor because the inlet side of the pump AH communicates with conduit 319 and the conduit 319 leads to the outlet side of check valve AD (FIGURE 3B) which prevents reverse flow of fluid from conduit 319 across the check valve AD. Thus the pump AH cannot be energized for driving it in reverse direction as a motor from fluid under pressure in conduit 336.

From the foregoing it is seen that except for leakage the extreme high pressure hydraulic fluid in the charged accumulator AQ is not drained but instead retained when the engine pump 185 is stopped. Thus when the operator desires to re-start the engine pump 185 he merely repeats the process beginning with the first stage as previously explained. However, unless the engine pump 185 had been stopped for a long period wherein leakage eventually drained the accumulator AQ, the operater will find that the extreme high pressure circuit will be at least partly pressurized at the time of commencement with the first stage operation previously described.

It should be mentioned that at any time the extreme high pressure circuit reaches a predetermined upper limit, the excess is discharged through relief valve AP (FIGURE 3) into the sump XA through conduits 327, 328 and 329. The high pressure accumulator AI, as explained previously, does not become charged with excessive fluid pressure for when the pressure reaches a pre-determined upper limit the back pressure on the discharge valves BI and BN maintains them in closed position and the fluid pumped by the engine pump 185 oscillates to and from the chambers BK*c* and CA*c*. The condition of increased pressure in the low pressure accumulator AE will now be discussed.

There are certain conditions of operation of a vehicle, such as the tractor in FIGURES 1 and 2, wherein the work load 265 operates under a negative load. An example of such condition is where the vehicle is moving down hill on a long hill having a fairly steep slope. In such case the hydraulic motors 266 are being driven by the vehicle rolling down the hill. The operator in such case may likely operate the engine pump 185 at "idle" speed. Thus the flow of fluid discharging from the high pressure accumulator AI may be at considerably higher rate than the rate of input from the idling engine pump 185. From this it can be seen that the fluid pressure in the high pressure accumulator AI will fall. Now the discharge side of the hydraulic motors 266 will discharge fluid into the low-pressure accumulator AE at a greater rate than that accepted by the inlet side of the engine pump 185 and therefore the pressure in the low pressure accumulator AE rises. Should the steep sloped hill be sufficiently long the condition may be reached where the fluid pressure in the low pressure accumulator AE equals or slightly exceeds the fluid pressure in the high pressure accumulator AI. This reversed slight differential pressure in the hydraulic fluid from the low pressure accumulator AE passes through the inlet check valves AF and AG, thence through the pump chambers 197 and 200 of the engine pump 185, and through discharge check valves BI and BN to the high pressure accumulator AI. The vehicle will then coast fully and without resistance except that of the motors 266, acting as pumps, for pumping the hydraulic fluid through the circuit just described. In such instance the engine pump 185 will not be driven by the hydraulic fluid passing therethrough and thus the engine pump 185 will not exhibit a braking effect on the coasting vehicle. However, since the hydraulic pressure in the low pressure accumulator AE in this instance rises to a level substantially above its normal operating pressure, the construction of the accumulator AE should be of sufficient strength to withstand the increased pressure without damage.

Reference is now made to the diagram of FIGURE 13. This diagram is a much abbreviated view of combined drawings FIGURES 3, 3A, 3B and 3C. The dotted lines in FIGURE 13 represents the mechanical linkage control device 270. The dot-dash lines represent the fuel system. The thin or light full lines indicate low pressure lines exclusive of the working circuit. The heavy or thick full lines indicate the extreme high pressure system. And the double lines in full indicate the working hydraulic circuit wherein the working hydraulic pressure is the differential pressure between the high pressure level and the low pressure level. All of this has been previously explained but FIGURE 13 illustrates a general way how the groups of various components in combined FIGURES 3, 3A, 3B and 3C are related to each other.

Having thus described a preferred embodiment of the invention it can now be seen that the objects of the invention have been fully achieved and it would be understood that changes and modifications may be made which do not depart from the scope thereof as defined in the appended claims.

What is claimed is:

1. A starting system for starting a free piston engine having at least one power piston operatively connected to a hydraulic pump comprising: a source of hydraulic fluid of extreme high pressure, a hydraulic power means energized from said source positioned to move said power piston substantially to a position where it begins its fuel combustive mixture compression stroke, a hydraulic fluid accumulator charged with hydraulic fluid of extreme high pressure from said source, and valve means operable for communicating said accumulator with said pump to energize said pump in a direction for moving said power piston in its compression stroke until combustion of said fuel mixture occurs thereby starting said engine and hydraulic pump.

2. A starting system for starting a free piston engine having at least one pair of power pistons in synchronized opposed relation operatively connected to a reciprocable hydraulic pump means comprising: a source of hydraulic fluid of extreme high pressure, a hydraulic power means energizable from said source positioned to move first one pair of said power pistons substantially to a position where they begin their respective fuel combustive mixture compression stroke, a hydraulic fluid accumulator charged with hydraulic fluid of extreme high pressure from said source, and valve means for communicating thereafter said accumulator with said pump means to energize said pump in a direction for moving said one pair of power pistons in their respective compression stroke until combustion of said fuel mixture occurs thereby starting said engine and hydraulic pump.

3. A starting system for starting a free piston engine having at least one pair of power pistons in synchronized opposed relation operatively connected to reciprocable hydraulic pump means comprising: a source of hydraulic fluid at extreme high pressure, a hydraulic power means energizable from said source positioned to move at least one pair of said power pistons substantially to a position where they begin their respective fuel combustive mixture compression stroke, a hydraulic fluid accumulator charged with hydraulic fluid of extreme high pressure from said source, and automatic sequence valve means positioned to actuate first said hydraulic power means for pre-positioning said one pair of power pistons to the beginning of their respective fuel combustive mixture compressive stroke, then de-actuate said hydraulic power means, and thereafter communicate said accumulator with said pump means to energize said pump in a direction for moving said one pair of power pistons in their respective compression stroke until combustion of said fuel mixture occurs thereby starting said engine and hydraulic pump.

4. A starting system for starting a free piston engine having at least one pair of power pistons with a synchronizing mechanism for maintaining said power pistons in opposed relation, and said power pistons being operatively connected to reciprocable hydraulic pump means, comprising: a source of hydraulic fluid of extreme high pressure, a hydraulic power means energizable from said source positioned to move at least one pair of said power pistons to a position substantially where they begin their respective fuel combustive mixture compression stroke, a toggle device positioned in engageable relation with said synchronizing mechanism, a start cycle valve connected to said toggle device for communicatively connecting said pump means with a hydraulic fluid receiver, said start cycle valve being positioned in engageable relation with said hydraulic power means, a hydraulic accumulator chargeable with hydraulic fluid of extreme high pressure from said source, and automatic sequence valve means operable to actuate first said hydraulic power means for pre-positioning said one pair of power pistons substantially to the beginning of their respective compression stroke and close said start cycle valve with simultaneous cocking of said toggle device, subsequently de-actuating said hydraulic power means and charging said accumulator from said source, and thereafter communicating said accumulator with said pump means to energize said pump means for moving said one pair of power pistons in their respective compression stroke until combustion of said fuel mixture occurs whereby said engine and pump is started and said synchronizing mechanism uncocks said toggle device to open said start cycle valve for communicating said pump means with said hydraulic fluid receiver.

5. A starting system for starting a free piston engine having at least one pair of power pistons in synchronized opposed relation operatively connected to reciprocable hydraulic pump means comprising; a source of extreme high pressure hydraulic fluid, a hydraulic power means energizable from said source positioned to move at least one pair of said power pistons substantially to a position where they begin their respective fuel combustive mixture compression stroke, a hydraulic fluid accumulator chargeable with hydraulic fluid from said source, a hydraulic pressure actuated thermo-compensated valve communicatively connected to said accumulator and said pump means, said valve being actuatable by fluid pressure in said accumulator at a pressure inversely proportional to the ambient temperature, and automatic sequence valve means operable to actuate first said hydraulic power means for pre-positioning said one pair of power pistons substantially to the beginning of their respective compression stroke, then de-actuate said hydraulic power means, thereafter charging said accumulator from said source and when said fluid pressure in said accumulator rises sufficiently to actuate said thermo-compensated valve communicate said accumulator with said pump means to energize said pump means in a direction for moving said one pair of power pistons in their respective compression stroke until combustion of said fuel mixture occurs thereby starting said engine and hydraulic pump.

6. A starting system for starting a free piston engine having first and second pairs of power pistons with a synchronizing mechanism for maintaining the power pistons of each pair in opposed relation and said first pair of power pistons in alternate firing relation with said second pair of power pistons, said engine having a first hydraulic pump operatively connected to said first pair of power pistons and a second hydraulic pump operatively connected to said second pair of power pistons, said starting system comprising; a source of extreme high pressure hydraulic fluid, a hydraulic power means energizable from said source positioned to move said first pair of power pistons to a position substantially where they begin their respective fuel combustive mixture compression stroke, a hydraulic pressure fluid accumulator chargeable with hydraulic fluid from said source, a toggle device positioned in engageable relation with said synchronizing mechanism, a start cycle valve connected to said toggle device for communicatively connecting said first pump with a hydraulic fluid receiver, said toggle device being positioned in abuttingly engageable relation with said hydraulic power means, a hydraulic pressure actuated thermo-compensated valve communicatively connected to said accumulator and said first pump, said valve being actuatable by fluid of said accumulator at a pressure inversely proportional to the ambient temperature, and automatic sequence valve means operable to actuate first said hydraulic power means for pre-positioning said first pair of power pistons substantially at the beginning of their respective compression stroke, then de-actuate said hydraulic power means, subsequently charging said accumulator from said source sufficient to actuate said thermo-compensated valve whereby hydraulic fluid under pressure from said accumulator energizes said first pump in a direction for moving rapidly said first pair of power pistons in their respective compression stroke until combustion of said fuel mixture occurs thereby starting said engine and hydraulic pump and said synchronizing mechanism uncocks said toggle device to open said start cycle valve for communicating said first pump with said hydraulic fluid receiver.

7. An operating control system for operating a free piston engine having at least one power piston operatively connected to a high pressure hydraulic pump, said engine having at least one fuel injector, said injector having a variable throttle, and means responsive to hydraulic pressure for varying the pressure of fuel injected into said engine, said control system comprising; a source of extreme high pressure hydraulic fluid, an adjsutable hydraulic fuel injector pressure modulator communicatively connected to said source and said fuel injector, and a control device for simultaneously varying said throttle and adjusting said pressure modulator whereby fuel is injected into said engine at increased pressure corresponding to increased throttle.

8. An operating control system for operating a free piston engine having a variable throttle and at least one power piston operatively connected to a hydraulic pump, said pump being capable of pumping hydraulic fluid at high pressure, said control system comprising: a high pressure hydraulic fluid accumulator communicatively connectable to the outlet side of said pump, a super-atmospheric low pressure hydraulic fluid accumulator communicatively connected to the inlet side of said pump for preventing cavitation of hydraulic fluid in said pump, a source of super-atmospheric low pressure hydraulic fluid communicatively connected to said low pressure accumulator, a hydraulic variable displacement accumulator communicatively connectable to said pump, said variable displacement accumulator having a volume displacement member slidably movable into said displacement accumulator, the rearward end of said displacement member being operatively connected to a piston of a hydraulic cylinder having forward and rearward hydraulic chambers, said forward chamber being communicatively connected to said high pressure accumulator for urging said displacement member in a direction to increase the fluid volume of said displacement accumulator, a hydraulic fluid adjustable pressure regulator communicatively connected to a source of extreme high pressure hydraulic fluid, said rearward chamber being communicatively connected to said pressure regulator for urging said displacement member in a direction to decrease the fluid volume of said displacement accumulator, and a control device for adjusting said pressure regulator whereby hydraulic fluid is displaced from said displacement accumulator to said high pressure accumulator when the fluid pressure in said high pressure accumulator is lowered below a predetermined pressure set by said pressure regulator.

9. An operating control system for operating a free piston engine having at least one power piston operatively connected to a hydraulic pump, said engine having at least one fuel injector, said injector having a variable throttle and means responsive to hydraulic pressure for varying the pressure of fuel injected into said engine, said pump being capable of pumping hydraulic fluid at high pressure, said control system comprising; a source of extreme high pressure hydraulic fluid, an adjustable hydraulic fuel injector pressure modulator communicatively connected to said source and said fuel injector for modulating the pressure of fuel injected into said engine, a high pressure hydraulic fluid accumulator communicatively connectable to the outlet side of said pump, a super-atmospheric low pressure hydraulic fluid accumulator communicatively connected to the inlet side of said pump for preventing cavitation of hydraulic fluid in said pump, a source of super-atmospheric low pressure hydraulic fluid communicatively connected to said low pressure accumulator, a hydraulic variable displacement accumulator communicatively connected to said pump, said variable displacement accumulator having a volume displacement member slidably movable into said displacement accumulator, the rearward end of said displacement member being operatively connected to a piston of a hydraulic cylinder having forward and rearward hydraulic chambers, said forward chamber being communicatively connected to said high pressure accumulator for urging said displacement member in a direction to increase the fluid volume of said displacement accumulator, a hydraulic fluid adjustable pressure regulator communicatively connected to said source of extreme high pressure hydraulic fluid, said rearward chamber being communicatively connected to said pressure regulator for urging said displacement member in a direction to decrease the fluid volume of said displacement accumulator, and a control device operable to move said throttle and simultaneously adjust said pressure modulator and said pressure regulator whereby an increase in throttle correspondingly increases the fuel injection pressure and the fluid pressure in said rearward chamber thereby diverting hydraulic fluid from said displacement accumulator to said high pressure accumulator when the fluid pressure in said high pressure accumulator is below the predetermined pressure set by said pressure regulator while said engine is increasing its speed corresponding to said throttle setting.

10. In a control system for operating a free piston engine having at least one power piston operatively connected to a hydraulic pump, said pump being capable of pumping hydraulic fluid at high pressure, a fluid pressure absorbing means comprising: a high pressure hydraulic fluid accumulator communicatively connected to the outlet side of a check valve, the inlet side of said check valve being communicatively connected to the outlet side of said pump, a hydraulic displacement accumulator communicatively connected to the outlet side of said pump and the inlet side of said check valve, said displacement accumulator being sufficiently expandable at high pressure to receive the entire output of said pump during the pumping stroke thereof when the back pressure from said high pressure accumulator is sufficient to maintain said check valve closed whereby hydraulic fluid discharged during the pumping stroke of said pump flows from said pump into said displacement accumulator and during the intake stroke of said pump fluid flows from said displacement accumulator to said pump thereby absorbing resiliently the displacement of said pump.

11. In a control system for operating a free piston engine having at least one power piston operatively connected to a hydraulic pump means, said engine having at least one fuel injector, said system comprising: cam means drivenly connected to said power piston positioned in engageable relation with the operating plunger of said fuel injector for actuating said injector, a source of fluid pressure, a fuel injector de-actuating device mounted adjacent to said fuel injector, said de-actuating device comprising a hydraulic ram, link means connected to said ram, said link means being engageable with said plunger, said ram when energized from said source moves in one direction for engaging said plunger with said cam means in actuating relation to deliver said fuel to said engine and alternately when said ram is de-energized moves in the other direction for disengaging said plunger from said cam means to terminate delivery of said fuel to said engine.

12. An integrated system for starting and operating a free piston engine having a variable throttle and at least one power piston operatively connected to a hydraulic pump, said hydraulic pump being capable of pumping hydraulic fluid at high pressure comprising, in combination, a source of extreme high pressure hydraulic fluid, a hydraulic power means energized from said source positioned to move said power piston substantially to a position where it begins its fuel combustive mixture compression stroke, a hydraulic fluid accumulator charged with extreme high pressure hydraulic fluid from said source, valve means for communicating said accumulator with said pump to energize said pump in a direction for moving said power piston in its compression stroke until combustion of said fuel mixture occurs to start said engine, a high pressure hydraulic fluid accumulator communicatively connectable to the outlet side of said pump, a super-atmospheric low pressure hydraulic fluid accumulator communicatively connected to the inlet side of said pump for inhibiting cavitation of hydraulic fluid in said pump, a source of super-atmospheric low pressure supply of hydraulic fluid communicatively connected to said low pressure accumulator, and a control device for selectively varying the said throttle thereby controlling the speed of said engine and rate of flow of hydraulic fluid pumped from said low pressure accumulator to said high pressure accumulator.

13. An integrated system for starting and operating a free piston engine hydraulic pump capable of pumping hydraulic fluid at high pressure and having at least one power piston, said engine hydraulic pump having at least one fuel injector with variable throttle therefor, said injector having means responsive to hydraulic pressure for varying the pressure of fuel injected into said engine hydraulic pump comprising, in combination; a source of extreme high pressure hydraulic fluid, a hydraulic power means energizable from said source positioned to move said power piston substantially to a position where it begins its fuel combustive mixture compression stroke, a hydraulic fluid accumulator charged with extreme high pressure hydraulic fluid from said source, valve means operable for communicating said accumulator with said pump to energize said pump in a direction for moving said power piston in its compression stroke until combustion of said fuel mixture occurs to start said engine pump, an adjustable hydraulic fuel injector pressure modulator communicatively connected to said source and said fuel injector, and a control device for simultaneously varying said throttle selectively and adjusting said pressure modulator whereby fuel is injected into said engine hydraulic pump at increased pressure corresponding to increased throttle.

14. An integrated system for starting and operating a free piston engine hydraulic pump capable of pumping hydraulic fluid at high pressure and having at least one power piston comprising, in combination; a source of extreme high pressure hydraulic fluid, a hydraulic power mean energizable from said source positioned to move said power piston substantially to a position where it begins its fuel combustive mixture compression stroke, a high pressure hydraulic fluid accumulator communicatively connectable to the outlet side of said pump, a super-atmospheric low pressure hydraulic fluid accumulator communicatively connected to the inlet side of said pump for inhibiting cavitation of hydraulic fluid in said pump, a source of super-atmospheric low pressure hydraulic fluid communicatively connected to said low pressure accumulator, a hydraulic variable displacement accumulator communicatively connectable to said pump, said displacement accumulator having a volume displacement member slidably movable into said displacement accumulator, the rearward end of said displacement member being operatively connected to a piston of a hydraulic cylinder having forward and rearward hydraulic chambers, said forward chamber being communicatively connected to said high pressure accumulator for urging said displacement member in a direction to increase the fluid volume of said displacement accumulator, a hydraulic fluid adjustable pressure regulator communicatively connected to said source of extreme high pressure hydraulic fluid, said rearward chamber being communicatively connected to said pressure regulator for urging said displacement member in a direction to decrease the fluid volume of said displacement accumulator, a first valve means operable for communicatively connecting said displacement accumulator with said source of extreme high pressure hydraulic fluid and closing fluid communication between said pump and said high pressure accumulator, a second valve means operable for communicatively connecting said displacement accumulator with said pump to energize said pump in a direction for moving said power piston in its compression stroke until combustion of said fuel mixture occurs to start said engine hydraulic pump, a third valve means operable for communicatively connecting said pump with said high pressure accumulator when said engine hydraulic pump is operating, and a control device for adjusting said pressure regulator whereby hydraulic fluid is displaced from said displacement accumulator to said high pressure accumulator when the fluid pressure in said high pressure accumulator is lowered below a predetermined pressure set by said pressure regulator.

15. An integrated system for starting and operating a free piston engine hydraulic pump capable of pumping hydraulic fluid at high pressure and having at least one power piston, said engine hydraulic pump having at least one fuel injector with variable throttle therefor, and means responsive to hydraulic pressure for varying the pressure of fuel injected into said engine hydraulic pump, said system comprising, in combination: a source of extreme high pressure, a hydraulic power means energizeable from said source positioned to move said power piston substantially to a position where it begins its fuel combustive mixture compression stroke, an adjustable hydraulic fuel injector pressure modulator communicatively connected to said source and said fuel injector for modulating the pressure of fuel injected into said engine hydraulic pump, a high pressure hydraulic fluid accumulator communicatively connectable to the outlet side of said pump, a superatmospheric low pressure hydraulic fluid accumulator communicatively connected to the inlet side of said pump for inhibiting cavitation of hydraulic fluid in said pump, a source of super-atmospheric low pressure hydraulic fluid communicatively connected to said low pressure accumulator, a hydraulic variable displacement accumulator communicatively connectable to said pump, said displacement accumulator having a volume displacement member slidably movable into said displacement accumulator, the rearward end of said displacement member being operatively connected to a piston of a hydraulic cylinder having forward and rearward hydraulic chambers, said forward chamber being communicatively connected to said high pressure accumulator for urging said displacement member in a direction to increase the fluid volume of said displacement accumulator, a hydraulic fluid adjustable pressure regulator communicatively connected to said source of extreme high pressure hydraulic fluid, said rearward chamber being communicatively connected to said pressure regulator for urging said displacement member in a direction to decrease the fluid volume of said displacement accumulator, a first valve means operable for communicatively connecting said displacement accumulator with said source of extreme high pressure hydraulic fluid and closing said fluid communication between said pump and said high pressure accumulator, a second valve means operable for communicating said displacement accumulator with said pump to energize said pump in a direction for moving said power piston in its compression stroke until combustion of said fuel mixture occurs to start said engine hydraulic pump, a third valve means operable for communicatively connecting said pump with said high pressure accumulator when said engine hydraulic pump is operating, and a control device positioned to move said throttle and simultaneously adjust said pressure modulator and said pressure regulator whereby an increase in throttle correspondingly increases the fuel injection pressure and the fluid pressure in said rearward chamber thereby diverting hydraulic fluid from said displacement accumulator to said high pressure accumulator when the fluid pressure in said high pressure accumulator is below the predetermined pressure set by said pressure regulator while said engine pump is increasing its speed corresponding to said throttle setting.

16. An integrated system for starting and operating a free piston engine having at least one power piston operatively connected to a hydraulic pump, said pump being capable of pumping hydraulic fluid at high pressure, said system comprising, in combination: a source of extreme high pressure hydraulic fluid, a hydraulic power means energizeable from said source positioned to move said power piston substantially to a position where it begins its fuel combustion mixture compression stroke, a high pressure hydraulic fluid accumulator communicatively connectable to the outlet side of a check valve, the inlet side of said check valve being communicatively connectable to the outlet side of said pump, a hydraulic displacement accumulator communicatively connectable to the outlet side of said pump and inlet side of said check valve, a first valve means operable for communicatively connecting said displacement accumulator with said source of extreme high pressure hydraulic fluid and closing said fluid communication between said pump and said high pressure accumulator, a second valve means operable for communicating said displacement accumulator with said pump to energize said pump in a direction for moving said power piston in its compression stroke until combustion of said fuel mixture occurs to start said engine, a third valve means operable for communicating said pump with said high pressure accumulator when said engine hydraulic pump is operating, said displacement accumulator being sufficiently expandable at said high pressure to receive the entire output of said pump during the pumping stroke thereof when the back pressure from said high pressure accumulator is sufficient to maintain said check valve closed whereby hydraulic fluid discharged during the pumping stroke of said pump flows from said pump into said displacement accumulator and during the intake stroke of said pump fluid flows from said displacement accumulator to said pump.

17. An integrated system for starting and operating a free piston engine having at least one power piston operatively connected to an hydraulic pump and at least one fuel injector, said system comprising: cam means drivenly connected to said power piston positioned in engageable relation with the operating plunger of said injector for actuating said injector in timed relation with respect to said power piston, a source of extreme high pressure hydraulic fluid, a hydraulic power means energizeable from said source positioned to move said power piston substantially to a position wherein it begins its fuel combustive mixture compression stroke, a hydraulic fluid accumulator charged from said source, valve means operable for communicating said accumulator with said pump to energize said pump in a direction for moving said power piston in its compression stroke until combustion of said fuel mixture occurs to start said engine, and means for stopping said engine by a fuel injector de-actuating device, said de-actuating device comprising a hydraulic ram operatively engageable with said plunger of said fuel injector whereby energizing of said ram from said source moves said ram into engagement with said plunger in a direction for disengaging said plunger from said cam means thereby de-actuating said fuel injector to terminate fuel flow to said engine.

18. An integrated system for starting and operating a free piston engine having a variable throttle and at least one pair of power pistons in synchronized opposed relation operatively connected to reciprocable hydraulic pump means comprising, in combination: a source of extreme high pressure hydraulic fluid, a hydraulic power means energizeable from said source positioned to move first said one pair of said power pistons substantially to a position where they begin their respective fuel combustive mixture compression stroke, a hydraulic fluid displacement accumulator charged with extreme high pressure hydraulic fluid from said source, a first valve means operable for communicating thereafter said displacement accumulator with said pump to energize said pump in a direction for moving said one pair of power pistons in their respective compression stroke until combustion of said fuel mixture occurs to start said engine, a high pressure hydraulic fluid accumulator communicatively connectable to the outlet side of said pump, a super-atmospheric low pressure hydraulic fluid accumulator communicatively connected to the inlet side of said pump for inhibiting cavitation of hydraulic fluid in said pump, a source of super-atmospheric low pressure supply of hydraulic fluid communicatively connected to said low pressure accumulator, a second valve means operable to communicate said high pressure accumulator with the outlet side of said pump when said engine is operating, and a control device positioned to vary selectively said throttle thereby controlling the speed of said engine and rate of flow of hydraulic fluid pumped from said low pressure accumulator to said high pressure accumulator.

19. An integrated system for starting and operating a free piston engine having a variable throttle and at least one pair of power pistons in synchronized opposed relation operatively connected to reciprocable hydraulic pump means comprising, in combination: a source of extreme high pressure hydraulic fluid, a hydraulic power mechanism energizeable from said source positioned to move at least one pair of said power pistons substantially to a position where they begin their respective fuel combustive mixture compression stroke, a hydraulic fluid displacement accumulator charged with extreme high pressure hydraulic fluid from said source, automatic sequence valve means operable to actuate first said hydraulic power mechanism, then de-actuate said hydraulic power mechanism, thereafter communicate said accumulator with said pump to energize said pump in a direction to move said one pair of power pistons in their respective compression stroke until combustion of said fuel mixture occurs to start said engine, a high pressure hydraulic fluid accumulator communicatively connectable to the outlet side of said pump, a super-atmospheric low pressure hydraulic fluid accumulator connected to the inlet side of said pump for inhibiting cavitation of hydraulic fluid in said pump, a source of super-atmospheric low pressure supply of hydraulic fluid commuicatively connected to said low pressure accumulator, a second valve means operable to communicate said high pressure accumulator with the outlet side of said pump when said engine is operating, and a control device positioned to vary selectively said throttle thereby controlling the speed of said engine and rate of flow of hydraulic fluid pumped from said low pressure accumulator to said high pressure accumulator.

20. An integrated system for starting and operating a free piston engine having a variable throttle and at least one pair of power pistons with a synchronizing mechanism for maintaining said power pistons in opposed relation, said power pistons being operatively connected to reciprocable pump means capable of pumping hydraulic fluid at high pressure comprising, in combination: a source of extreme pressure hydraulic fluid, a hydraulic power means energizeable from said source positioned to move at least one pair of power pistons to a position substantially where they begin their respective fuel combustive mixture compression stroke, a toggle device positioned in engageable relation with said synchronizing mechanism, a start cycle valve connected to said toggle device for communicatively connecting said pump with a hydraulic fluid receiver, said start cycle valve being positioned in engageable relation with said hydraulic power means, a hydraulic fluid displacement accumulator chargeable with hydraulic fluid of extreme high pressure from said source, automatic sequence valve means operable to actuate first said hydraulic power means for pre-positioning said one pair of power pistons substantially at the beginning of their respective compression stroke and close said start cycle valve with simultaneous cocking of said toggle device, subsequently de-actuating said hydraulic power means and charging said displacement accumulator from said source, thereafter communicating said accumulator with said pump to energize said pump for moving said one pair of power pistons in their respective compression stroke until combustion of said fuel mixture occurs to start said engine and said synchronizing mechanism uncocks said toggle device to open said start cycle valve for communicating said pump with said hydraulic fluid receiver, a super-atmospheric low pressure hydraulic fluid accumulator connected to the inlet side of said pump for inhibiting cavitation of hydraulic fluid in said pump, a source of super-atmospheric low pressure supply of hydraulic fluid communicatively connected to said low pressure accumulator, and a control device positioned to vary selectively said throttle thereby controlling the speed of said engine and rate of flow of hydraulic fluid pumped from said low pressure accumulator to said hydraulic fluid receiver.

21. An integrated system for starting and operating a free piston engine having a variable throttle and at least one pair of power pistons in synchronized opposed relation operatively connected to reciprocable pump means comprising, in combination: a source of extreme high pressure hydraulic fluid, a hydraulic power means energizeable from said source positioned to move at least one pair of said power pistons substantially to a position where they begin their respective fuel combustive mixture compression stroke, a hydraulic fluid displacement accumulator chargeable with extreme high pressure hydraulic fluid from said source, a hydraulic pressure actuated thermo-compensated valve communicatively connected to said accumulator and said pump, said valve being actuatable by fluid in said accumulator at a pressure inversely proportional to the ambient temperature, automatic sequence valve means operable to actuate first said hydraulic power means for pre-positioning said one pair of power pistons substantially to the beginning of their respective compression stroke, then de-actuate said hydraulic power means and charging said accumulator from said source, and when said fluid pressure in said accumulator rises sufficiently to actuate said thermo-compensated valve communicate said accumulator with said pump to energize said pump in a direction for moving said one pair of power pistons in their respective compression stroke until combustion of said fuel mixture occurs to start said engine, a high pressure hydraulic fluid accumulator communicatively connectable to the outlet side of said pump, a super-atmospheric low pressure hydraulic fluid accumulator connected to the inlet side of said pump for inhibiting cavitation of hydraulic fluid in said pump, a source of super-atmospheric low pressure supply of hydraulic fluid communicatively connected to said low pressure accumulator, a second valve means operable to communicate said high pressure accumulator with the outlet side of said pump when said engine hydraulic pump is operating, and a control device positioned to vary selectively said throttle thereby controlling the speed of said engine and rate of flow of hydraulic fluid pumped from said low pressure accumulator to said high pressure accumulator.

22. An integrated system for starting and operating a free piston engine having first and second pairs of power pistons with a synchronizing mechanism for maintaining the power pistons of each pair in opposed relation, said first pair of power pistons being in alternate firing relation with said second pair of power pistons, said engine having a variable throttle and a first hydraulic pump operatively connected to said first pair of power pistons and a second hydraulic pump operatively connected to said second pair of power pistons, said system comprising, in combination: a source of extreme high pressure hydraulic fluid, a hydraulic power means energizeable from said source positioned to move said first pair of power pistons substantially to a position where they begin their respective fuel combustive mixture compression stroke, a hydraulic fluid pressure accumulator chargeable with hydraulic fluid from said source, a toggle device positioned in engageable relation with said synchronizing mechanism, a start cycle valve connected to said toggle device for communicatively connecting said first pump with hydraulic fluid receiver, said toggle device being positioned in abuttingly engageable relation with said hydraulic power means, a hydraulic pressure actuated thermo-compensated valve communicatively connected to said accumulator and said first pump, said thermo-compensated valve being actuatable by fluid of said accumulator at a pressure inversely proportional to the ambient temperature, automatically operable sequence valve means operable to actuate first said hydraulic power means for pre-positioning said first pair of power pistons substantially to the beginning of their respective compression stroke, then de-actuate said hydraulic power means, subsequently charging said accumulator sufficiently to actuate said thermo-compensated valve to energize said first pump in a direction for moving said first power pistons in their respective compression stroke until combustion of said fuel mixture occurs to start said engine and said synchronizing mechanism uncocks said toggle device to open said start cycle valve for communicating said first pump with said hydraulic fluid receiver, a super-atmospheric low pressure hydraulic fluid accumulator connected to the inlet side of said pumps for inhibiting cavitation of hydraulic fluid in said pumps, a source of super-atmospheric low pressure supply of hydraulic fluid communicatively connected to said low pressure accumulator, and a control device positioned to vary selectively said throttle thereby controlling the speed of said engine and rate of flow of hydraulic fluid pumped from said low pressure accumulator to said receiver.

References Cited in the file of this patent

UNITED STATES PATENTS

| | | |
|---|---|---|
| 2,731,793 | Lewis | Jan. 24, 1956 |
| 2,978,986 | Carder et al. | Apr. 11, 1961 |
| 2,990,680 | Huber | July 4, 1961 |

FOREIGN PATENTS

| | | |
|---|---|---|
| 1,180,612 | France | Jan. 5, 1959 |